US012427500B2

(12) United States Patent
Mullangi et al.

(10) Patent No.: US 12,427,500 B2
(45) Date of Patent: Sep. 30, 2025

(54) SIMPLE METAL-ORGANIC FRAMEWORK FOR THE SELECTIVE ADSORPTION OF CARBON DIOXIDE FROM FLUE GAS

(71) Applicants: National University of Singapore, Singapore (SG); Agency for Science, Technology and Research, Singapore (SG)

(72) Inventors: Dinesh Mullangi, Singapore (SG); Zeyu Deng, Singapore (SG); Yuxiang Wang, Singapore (SG); John Wang, Singapore (SG); Pieremanuele Canepa, Singapore (SG); Dan Zhao, Singapore (SG); Anthony Kevin Cheetham, Singapore (SG); Fengxia Wei, Singapore (SG)

(73) Assignees: National University of Singapore, Singapore (SG); Agency for Science, Technology and Research, Singapore (SG)

( * ) Notice: Subject to any disclaimer, the term of this patent is extended or adjusted under 35 U.S.C. 154(b) by 0 days.

(21) Appl. No.: 18/568,156

(22) PCT Filed: Jun. 6, 2022

(86) PCT No.: PCT/SG2022/050383
§ 371 (c)(1),
(2) Date: Dec. 7, 2023

(87) PCT Pub. No.: WO2022/260592
PCT Pub. Date: Dec. 15, 2022

(65) Prior Publication Data
US 2024/0278207 A1 Aug. 22, 2024

(30) Foreign Application Priority Data
Jun. 7, 2021 (SG) .......................... 10202106057Y

(51) Int. Cl.
*B01J 20/22* (2006.01)
*B01D 53/04* (2006.01)
(Continued)

(52) U.S. Cl.
CPC ............ *B01J 20/226* (2013.01); *B01D 53/04* (2013.01); *B01J 20/28061* (2013.01);
(Continued)

(58) Field of Classification Search
CPC ............... B01J 20/226; B01J 20/28061; B01J 20/28064; B01J 20/3483; B01J 20/3491; B01D 53/04; C07F 5/061; C07F 15/02
(Continued)

(56) References Cited

U.S. PATENT DOCUMENTS 2,289,286 A 7/1942 Mazabraud

FOREIGN PATENT DOCUMENTS

| CN | 111450804 A | 7/2020 |
|---|---|---|
| KR | 20050052929 A | 6/2005 |
| WO | 2008062034 A1 | 5/2008 |

OTHER PUBLICATIONS

International Preliminary Report on Patentability issued in corresponding International Application No. PCT/SG2022/050383, mailed on Dec. 21, 2023 (8 pages).
(Continued)

*Primary Examiner* — Anita Nassiri-Motlagh
(74) *Attorney, Agent, or Firm* — Osha Bergman Watanabe & Burton LLP

(57) ABSTRACT

Discloses herein is an activated metal-organic framework of formula as defined in the application, and the metal organic framework has a BET surface area of from 250 to 1,000 $m^2/g$ as obtained from a 298 K $CO_2$ sorption isotherm. In a particular embodiment, the activated metal-organic frame-
(Continued)

work is aluminium formate (Al(HCOO)$_3$) or vanadium formate (V(HCOO)$_3$).

22 Claims, 43 Drawing Sheets

(51) Int. Cl.
    *B01J 20/28* (2006.01)
    *B01J 20/34* (2006.01)
    *C07F 5/06* (2006.01)
    *C07F 15/02* (2006.01)

(52) U.S. Cl.
    CPC ..... *B01J 20/28064* (2013.01); *B01J 20/3483* (2013.01); *B01J 20/3491* (2013.01); *C07F 5/061* (2013.01); *C07F 15/02* (2013.01); *B01D 2257/104* (2013.01); *B01D 2257/504* (2013.01)

(58) Field of Classification Search
    USPC .......................................................... 502/56
    See application file for complete search history.

(56) References Cited

OTHER PUBLICATIONS

Y. Tian et al. "CO2 Template Synthesis of Metal Formates with a ReO3 Net" Inorganic Chemistry, vol. 46, No. 5, pp. 1612-1616; Jan. 31, 2007 (5 pages).
V. Paredes-García et al. "Structural and magnetic characterization of the tridimensional network [Fe(HCO2)3]nnHCO2H" New Journal of Chemistry, vol. 37, No. 7, pp. 2120-2127; Mar. 15, 2013 (9 pages).
J. Su et al. "New Series of Indium Formates: Hydrothermal Synthesis, Structure and Coordination Modes" Inorganic Chemistry, vol. 46, No. 20, pp. 8403-8409; Aug. 29, 2007 (7 pages).
International Search Report issued in International Application No. PCT/SG2022/050383, mailed Jan. 13, 2023 (6 pages).
Written Opinion issued in International Application No. PCT/SG2022/050383; Dated Jan. 13, 2023 (6 pages).
Peng Li et al.; "Using Predefined M3 ( 3 -O) Clusters as Building Blocks for an Isostructural Series of Metal-Organic Frameworks"; Applied Materials & Interfaces, vol. 9, No. 28, pp. 23957-23966; Jul. 5, 2017 (10 pages).
Peng Li et al.; "Using Predefined M3 ( 3 -O) Clusters as Building Blocks for an Isostructural Series of Metal-Organic Frameworks"; Applied Materials & Interfaces, vol. 9, No. 28, Supporting Information; Jul. 5, 2017 (49 pages).
Evans H. A. et al.; "Perovskite-related ReO3-type structures"; Nature Reviews Materials, Nature Publishing Group UK, London, vol. 5, No. 3, pp. 196-213; Jan. 22, 2020 (18 pages).
Seifert H.J.; "On the existence of a vanadium (IV) formate"; Journal of Inorganic and Nuclear Chemistry, vol. 27, No. 6, pp. 1269-1270, Jun. 1, 1965 (2 pages).
Extended European Search Report issued in counterpart European Patent Application No. 22820668.6 mailed on Feb. 17, 2024 (16 pages).
Dybtsev et al.; "Microporous Manganese Formate: A Simple Metal-Organic Porous Material with High Framework Stability and Highly Selective Gas Sorption Properties"; JACS Communication, vol. 126, pp. 32-33; 2003 (2 pages).
Dutcher et al.; "Amine-Based CO2 Capture Technology Development from the Beginning of 2013—A Review"; ACS Applied Materials & Interfaces, vol. 7, No. 4, pp. 2137-2148; 2015 (12 pages).
Lee et al.; "A review on solid adsorbents for carbon dioxide capture"; Journal of Industrial and Engineering Chemistry, vol. 23, pp. 1-11; 2015 (11 pages).

Li et al.; "Capture of CO2 from high humidity flue gas by vacuum swing adsorption with zeolite 13X"; Adsorption, vol. 14, pp. 415-422; 2008 (8 pages).
Oschatz et al.; "A search for selectivity to enable CO2 capture with porous adsorbents"; Energy & Environmental Science, vol. 11, pp. 57-70; 2018 (14 pages).
Ding et al.; "Carbon capture and conversion using metal-organic frameworks and MOF-based materials"; Chem. Soc. Rev., vol. 48, pp. 2783-2828; 2019 (46 pages).
Trickett et al.; "The chemistry of metal-organic frameworks for CO2 capture, regeneration and conversion"; Nature Reviews Materials, vol. 2, article 17045, 2017 (16 pages).
Yang, et al.; "CO2 capture and conversion using Mg-MOF-74 prepared by a sonochemical method"; Energy & Environmental Science, vol. 5, pp. 6465-6473; 2012 (9 pages).
McDonald et al.; "Cooperative insertion of CO2 in diamine-appended metal-organic frameworks"; Nature, vol. 519, No. 7543, 2015 (16 pages).
Hu et al.; "A Highly Stable Metal-Organic Framework with Optimum Aperture Size for CO2 Capture"; AIChE Journal, vol. 63, No. 9, pp. 4103-4114; 2017 (12 pages).
British Petroleum; "Statistical Review of World Energy," retrieved from https://www.bp.com/content/dam/bp/business-sites/en/global/corporate/pdfs/energy-economics/statistical205review/bp-stats-review-2020-full-report.pdf; 2020 (68 pages).
World Metorlogical Organization; "State of the Global Climate 2020"; retrieved from https://public.wmo.int/en/our-mandate/climate/wmo-statement-state-of-global-climate; 2020 (56 pages).
Siegelman et al.; "Challenges and opportunities for adsorption-based CO2 capture from natural gas combined cycle emissions."; Energy & Environmental Science, vol. 12, pp. 2161-2173; 2019 (13 pages).
Mason et al.; "Application of a high-throughput analyzer in evaluating solid adsorbents for post-combustion carbon capture via multicomponent adsorption of CO2, N2, and H2O"; Journal of the American Chemical Society; vol. 137, pp. 4787-4803; 2015 (17 pages).
Nugent et al.; "Porous materials with optimal adsorption thermodynamics and kinetics for CO2 separation"; Nature, vol. 495, pp. 80-84; 2013 (5 pages).
Liang et al.; "A tailor-made interpenetrated MOF with exceptional carbon-capture performance from flue gas."; Chem 5, pp. 950-963; 2019 (15 pages).
Deutz et al., "Life-cycle assessment of an industrial direct air capture process based on temperature-vacuum swing adsorption"; Nature Energy, vol. 6, pp. 1-11; 2021 (11 pages).
Vaidhyanathan et al.; "An amine-functionalized metal organic framework for preferential CO2 adsorption at low pressures"; Chem. Comm., vol. 35, pp. 5230-5232; 2009 (3 pages).
Vaidhyanathan et al.; "Direct observation and quantification of CO2 binding within an amine-functionalized nanoporous solid."; Science, vol. 330, pp. 650-653; 2010 (4 pages).
Spek, A. L.; "Single-crystal structure validation with the program PLATON."; Journal of Applied Crystallography, vol. 36, pp. 7-13; 2003 (7 pages).
Nijem et al.; "Tuning the gate opening pressure of metal-organic frameworks (MOFs) for the selective separation of hydrocarbons"; Journal of the American Chemical Society, vol. 134, pp. 15201-15204; 2012 (4 pages).
Perdew et al.; "Generalized gradient approximation made simple."; Physical Review Letter, vol. 77, No. 18, pp. 3865-3868; 1996 (4 pages).
Ehrlich, et al.; "System-dependent dispersion coefficients for the DFT-D3 treatment of adsorption processes on ionic surfaces."; Chem. Phys. Chem., vol. 12, pp. 3414-3420; 2011 (7 pages).
Ismail et al.; "Gas Separation Membranes: Polymeric and Inorganic"; Springer, ISBN 3319010956; 2015 (340 pages).
Chen et al.; "Highly efficient visible-light-driven CO2 reduction to formate by a new anthracene-based zirconium MOF via dual catalytic routes."; Journal of Materials Chemistry A, vol. 4, pp. 2657-2662; 2016 (6 pages).

(56) References Cited

OTHER PUBLICATIONS

Cadot et al.; "A water-based and high space-time yield synthetic route to MOF Ni2(dhtp) and its linker 2,5-dihydroxyterephthalic acid."; J Journal of Materials Chemistry A, vol. 2, No. 42, pp. 17757-17763; 2014 (8 pages).
Wang et al.; "Metal-organic frameworks with reduced hydrophilicity for postcombustion CO2 capture from wet flue gas."; ACS Sustainable Chemistry Engineering, vol. 6, pp. 11904-11912; 2018 (9 pages).
Sheldrick, G.M.; "SHELXT-Integrated space-group and crystal-structure determination."; Acta Cryst., vol. 71, No. 259, pp. 3-8; 2015 (6 pages).
Coelho, A.A.; "TOPAS and TOPAS-Academic: an optimization program integrating computer algebra 261 and crystallographic objects written in C++."; Journal of Applied Crystallography, vol. 51, pp. 210-218; 2018 (9 pages).
Pawley, G.S.; "Unit-cell refinement from powder diffraction scans."; Journal of Applied Crystallography, vol. 14, pp. 357-361; 1981 (5 pages).
Kresse et al.; "Efficient iterative schemes for ab initio total-energy calculations using a plane-wave basis set."; Physical Review B; vol. 54, No. 16, pp. 11 169-11 186; 1996 (18 pages).
Kresse Kresse et al.; "Efficiency of ab-initio total energy calculations for metals and semiconductors using a plane-wave basis set."; Computational Materials Science 6, pp. 15-50; 1996 (36 pages).
Bloechl, P.E.; "Projector augmented-wave method."; Physical Review B, vol. 50, No. 24, pp. 17 953-17 979; 1994 (27 pages).
Kresse et al.; "Norm-conserving and ultrasoft pseudopotentials for first-row and transition elements."; Journal of Physics: Condensed Matter, vol. 6, pp. 8245-8257; 1994 (14 pages).
Grimme et al.; "A consistent and accurate ab initio parametrization of density functional dispersion correction (DFT-D) for the 94 elements H-Pu."; Journal of Chemical Physics, vol. 132, 154104; 2010 (20 pages).
Pack et al.; ""Special points for Brillouin-zone integrations"—a reply. "; Physical Review B, vol. 16, No. 4, pp. 1748-1749; 1977 (2 pages).
Myers et al.; "Thermodynamics of mixed gas adsorption."; A.I.Ch. E. Journal; vol. 11, No. 1, pp. 121-127; 1965 (7 pages).
Togo et al.; "First principles phonon calculations in materials science."; Scripta Materialia, vol. 108, pp. 1-5; 2015 (5 pages).
Lin et al.; "A scalable metal-organic framework as a durable physisorbent for carbon dioxide capture."; Science, vol. 374, pp. 1464-1469; 2021 (6 pages).
Leperi et al.; "Optimization of Two-Stage Pressure/Vacuum Swing Adsorption with Variable Dehydration Level for Postcombustion Carbon Capture." Industrial & Engineering Chemistry Research, vol. 55, pp. 3338-3350 2016 (13 pages).
Hasan et al.; "Modeling, Simulation, and Optimization of Postcombustion CO2 Capture for Variable Feed Concentration and Flow Rate. 2. Pressure Swing Adsorption and Vacuum Swing Adsorption Processes."; Industrial & Engineering Chemistry Research, vol. 51, No. 48, pp. 15665-15682; 2012 (23 pages).
Tan et al.; "Mechanical properties of hybrid inorganic-organic framework materials: establishing fundamental structure-property relationships."; Chem. Soc. Rev., vol. 40, pp. 1059-1080; 2011 (23 pages).
Deng et al.; "Exploring the properties of lead-free hybrid double perovskites using a combined computational-experimental approach."; Journal of Materials Chemistry A, vol. 4, pp. 12025-12029; 2016 (5 pages).
Rajendran et al.; "Correction procedures for extra-column effects in dynamic col. breakthrough experiments."; Chemical Engineering Science; vol. 63, pp. 2696-2706; 2008 (11 page).
Simon et al.; "pyIAST: Ideal adsorbed solution theory (IAST) Python package."; Computer Physics Communication, vol. 200, pp. 364-380; 2016 (17 pages).

Ajenifuja et al.; "A New Equilibrium Shortcut Temperature Swing Adsorption Model for Fast Adsorbent Screening."; Industrial & Engineering Chemistry Research, vol. 59, pp. 3485-3497; 2020 (13 pages).
Maninder et al.; "Adsorbent Screening for Postcombustion CO2 Capture: A Method Relating Equilibrium Isotherm Characteristics to an Optimum Vacuum Swing Adsorption Process Performance."; Industrial & Engineering Chemistry Research, vol. 55, pp. 2447-2460; 2016 (14 pages).
Compendium of Carbon Capture Technology; U.S. Dept. of Energy; 2020 (818 pages).
Chen et al.; "Microwave-assisted rapid synthesis of well-shaped MOF-74 (Ni) for CO2 efficient capture."; Inorganic Chemistry, vol. 58, pp. 2717-2728; 2019 (12 pages).
Xiang et al.; "Microporous metal-organic framework with potential for carbon dioxide capture at ambient conditions."; Nature Communications, vol. 3, pp. 1-9; 2012 (9 pages).
Britt, et al.; "Highly efficient separation of carbon dioxide by a metal-organic framework replete with open metal sites."; Proc. Nat. Acad. Sci. U.S.A.; vol. 106, No. 49, pp. 20637-20640; 2009 (4 pages).
Kumar et al.; "Direct air capture of CO2 by physisorbent materials."; Angew. Chem. Int. Ed., vol. 54, pp. 14372-14377; 2015 (6 pages).
Mason et al.; "Evaluating metal-organic frameworks for post-combustion carbon dioxide capture via temperature swing adsorption."; Energy & Environmental Science, vol. 4, pp. 3030-3040; 2011 (11 pages).
Shi et al.; "Robust metal-triazolate frameworks for CO2 capture from flue gas."; Journal of the American Chemical Society, vol. 142, pp. 2750-2754; 2020 (5 pages).
Nandi et al.; "Robust metal-triazolate frameworks for CO2 capture from flue gas."; Journal of the American Chemical Society, vol. 142, pp. 2750-2754; 2020 (5 pages).
Qazcini et al.; "MUF-16: A robust metal-organic framework for pre-and post-combustion carbon dioxide capture."; Applied Materials & Interfaces, vol. 13, pp. 12141-12148; 2021 (8 pages).
Masala et al.; "New insights into UTSA-16."; Phys. Chem. Chem. Phys., vol. 18, pp. 220-227; 2016 (8 pages).
Grande et al.; "Multiscale investigation of adsorption properties of novel 3D printed UTSA-16 structures."; Chemical Engineering Journal, vol. 402, No. 126166; 2020 (9 pages).
Bhatt et al.; "A fine-tuned fluorinated MOF addresses the needs for trace CO2 removal and air capture using physisorption."; Journal of the American Chemical Society, vol. 138, pp. 9301-9307; 2016 (7 pages).
Shekhah et al.; "Made-to-order metal-organic frameworks for trace carbon dioxide removal and air capture." Nature Communication, vol. 5, pp. 1-7; 2014 (7 pages).
Chen et al.; "Tuning pore size in square lattice coordination networks for size selective sieving of CO2."; Angew. Chem. Int. Ed., vol. 55, pp. 10268-10272; 2016 (5 pages).
Huang et al.; "Two dimensional covalent organic frameworks for carbon dioxide capture through channel wall functionalization."; Angew. Chem. Int. Ed., vol. 54, pp. 2986-2990; 2015 (5 pages).
Stegbauer et al.; "Tunable water and CO2 sorption properties in isostructural azine-based covalent organic frameworks through polarity engineering."; Chemistry of Materials, vol. 27, pp. 7874-7881; 2015 (8 pages).
Wilkins et al.; "Measurement of competitive CO2 and H2O adsorption on zeolite 13X for post-combustion CO2 capture."; Adsorption; vol. 26, pp. 765-777; 2020 (15 pages).
Zhou et al.; "Self-assembled iron-containing mordenite monolith for carbon dioxide sieving."; Science, vol. 373, pp. 315-320; 2021 (6 pages).
Datta et al.; "CO2 capture from humid flue gases and humid atmosphere using a microporous coppersilicate."; Science; vol. 350, Issue 6258, pp. 302-306; 2015 (5 pages).
Liao et al.; "Putting an ultrahigh concentration of amine groups into a metal-organic framework for CO2 capture at low pressures."; Chemical Science, vol. 7, pp. 6528-6533; 2016 (6 pages).
Liao et al.; "Monodentate hydroxide as a super strong yet reversible active site for CO 2 capture from high-humidity flue gas."; Energy & Environmental Science, vol. 8, pp. 1011-1016; 2015 (6 pages).

(56) References Cited

OTHER PUBLICATIONS

McDonald et al.; "Cooperative insertion of CO2 in diamine-appended metal-organic frameworks."; Nature, vol. 519, pp. 303-308; 2015 (16 pages).

McDonald et al.; "Enhanced carbon dioxide capture upon incorporation of N, N -dimethylethylenediamine in the metal-organic framework CuBTTri."; Chemical Science, vol. 2, pp. 2022-2028; 2011 (7 pages).

Kim et al.; "Cooperative carbon capture and steam regeneration with tetraamine-appended metal-organic frameworks."; Science, vol. 369, pp. 392-396; 2020 (5 pages).

Fauth et al.; "Investigation of porous silica supported mixed-amine sorbents for post-combustion CO2 capture."; Energy & Fuels, vol. 26, pp. 2483-2496; 2012 (14 pages).

Jung-Hoon et al.; "Enhancement of CO2 binding and mechanical properties upon diamine functionalization of M2 (dobpdc) metal-organic frameworks."; Chemical Science, vol. 9, pp. 5197-5206; 2018 (10 pages).

Bahr et al.; "Mechanical properties of cubic zinc carboxylate IRMOF-1 metal-organic framework crystals."; Physical Review B, vol. 76, No. 184106; 2007 (7 pages).

Tan et al.; "Exceptionally Low Shear Modulus in a Prototypical Imidazole-Based Metal-Organic Framework."; Physical Review Letters, vol. 108, No. 095502; 2012 (6 pages).

Wu et al.; "Exceptional Mechanical Stability of Highly Porous Zirconium Metal-Organic Framework UiO-66 and Its Important Implications."; Journal of Physical Chemistry Letters; vol. 4, pp. 925-930; 2013 (6 pages).

Ortiz et al.; "Anisotropic Elastic Properties of Flexible Metal-Organic Frameworks: How Soft are Soft Porous Crystals?"; Physical Review Letters, vol. 109, No. 195502; 2012 (5 pages).

Nandi et al.; "Ultralow Parasitic Energy for Postcombustion CO2 Capture Realized in a Nickel Isonicotinate Metal-Organic Framework with Excellent Moisture Stability"; Journal of the American Chemical Society, vol. 139, pp. 1734-1737; 2017 (4 pages).

Guan et al.; "Chemically stable polyarylether-based covalent organic frameworks"; Nature Chemistry, vol. 11, pp. 587-594; 2019 (8 pages).

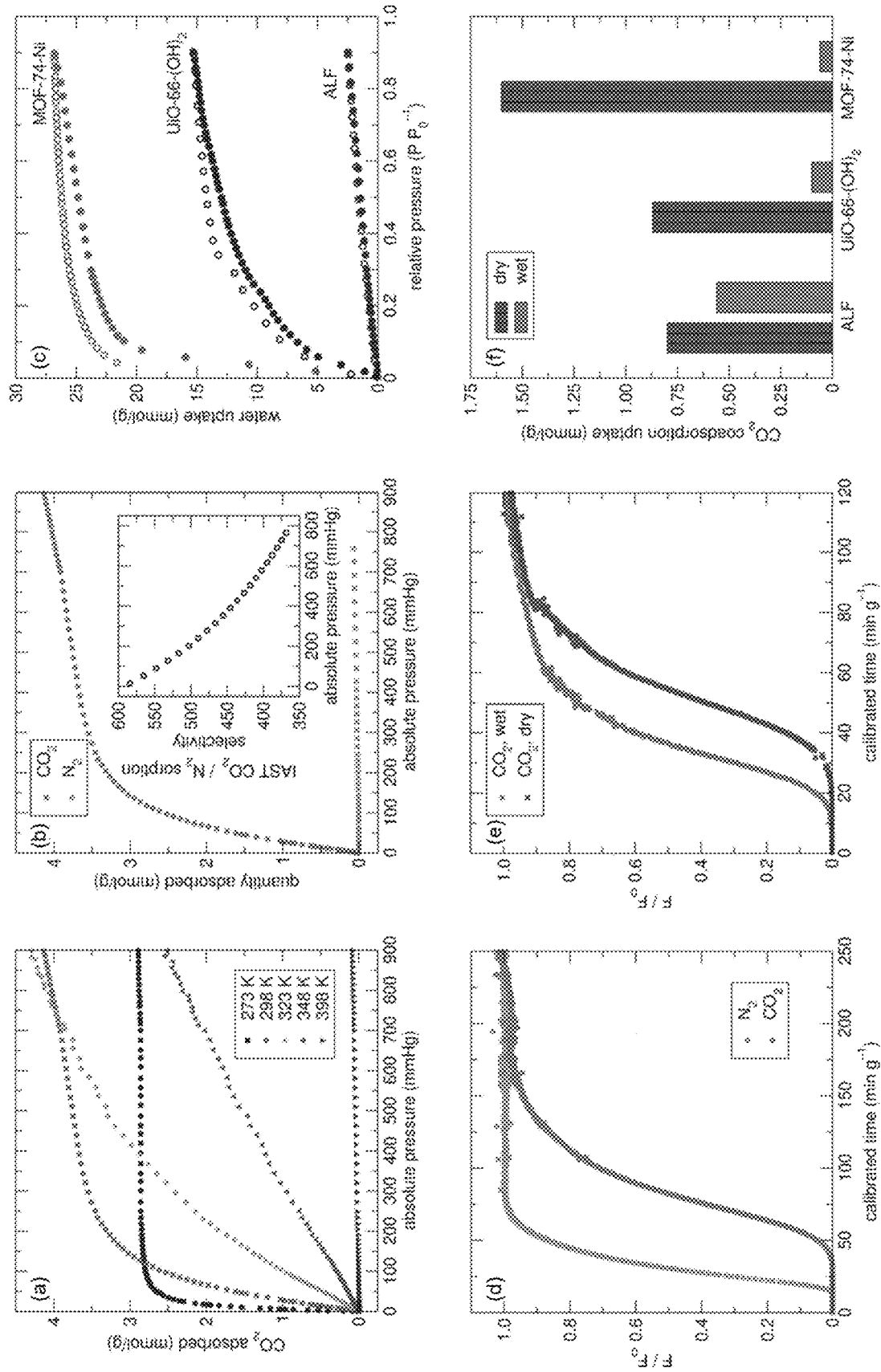
FIG. 11a-f

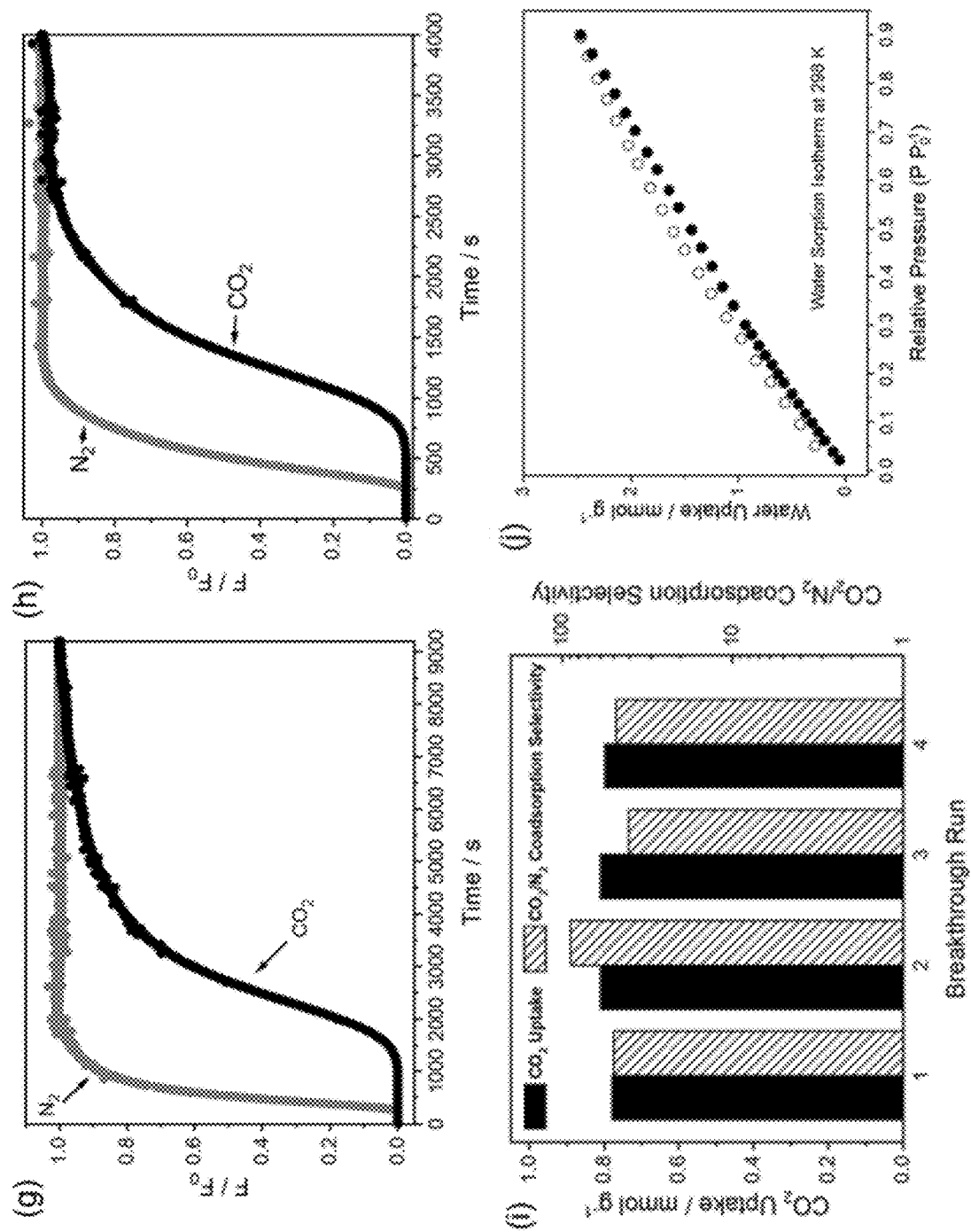
FIG. 11g-j

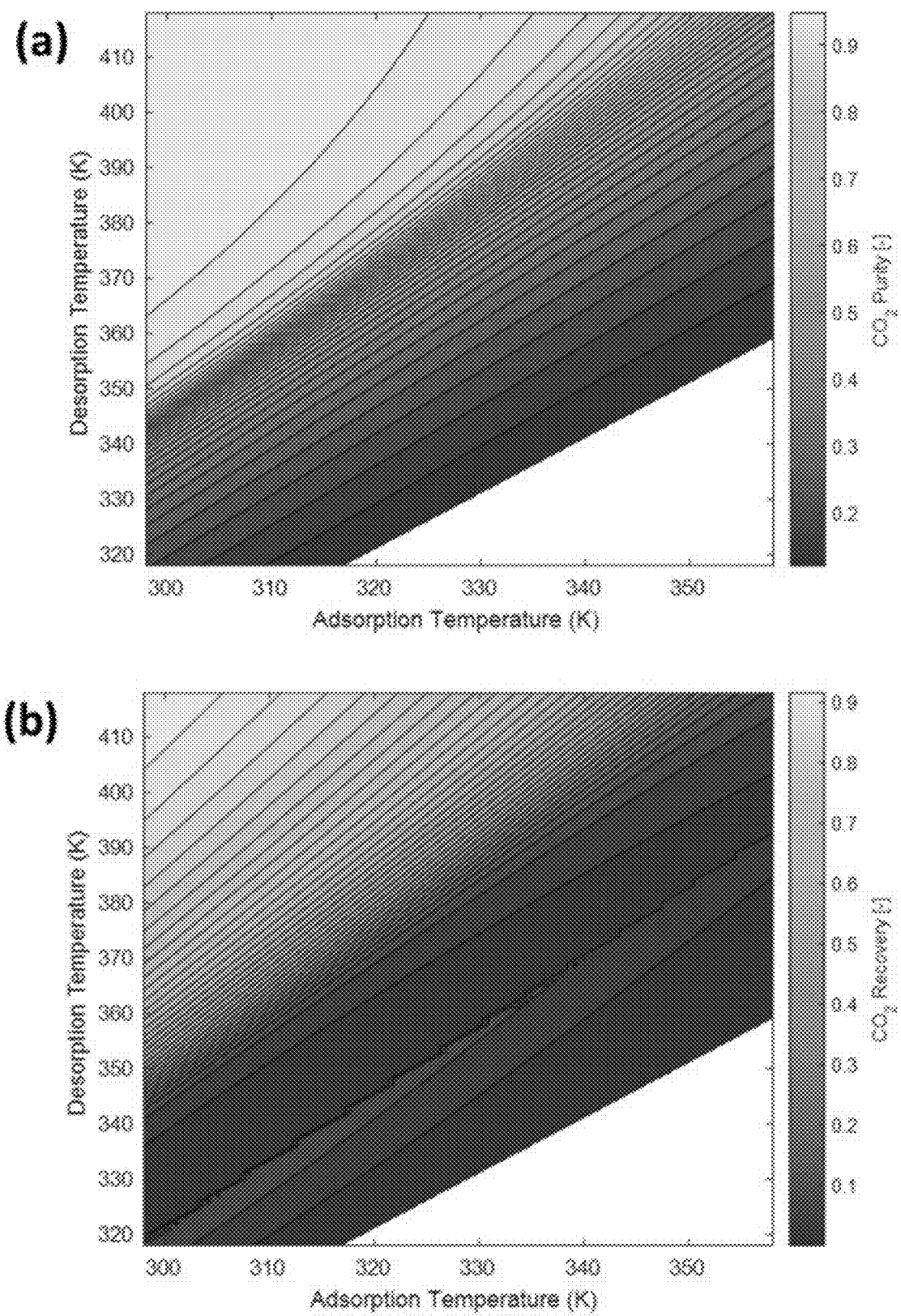
FIG. 37a-b

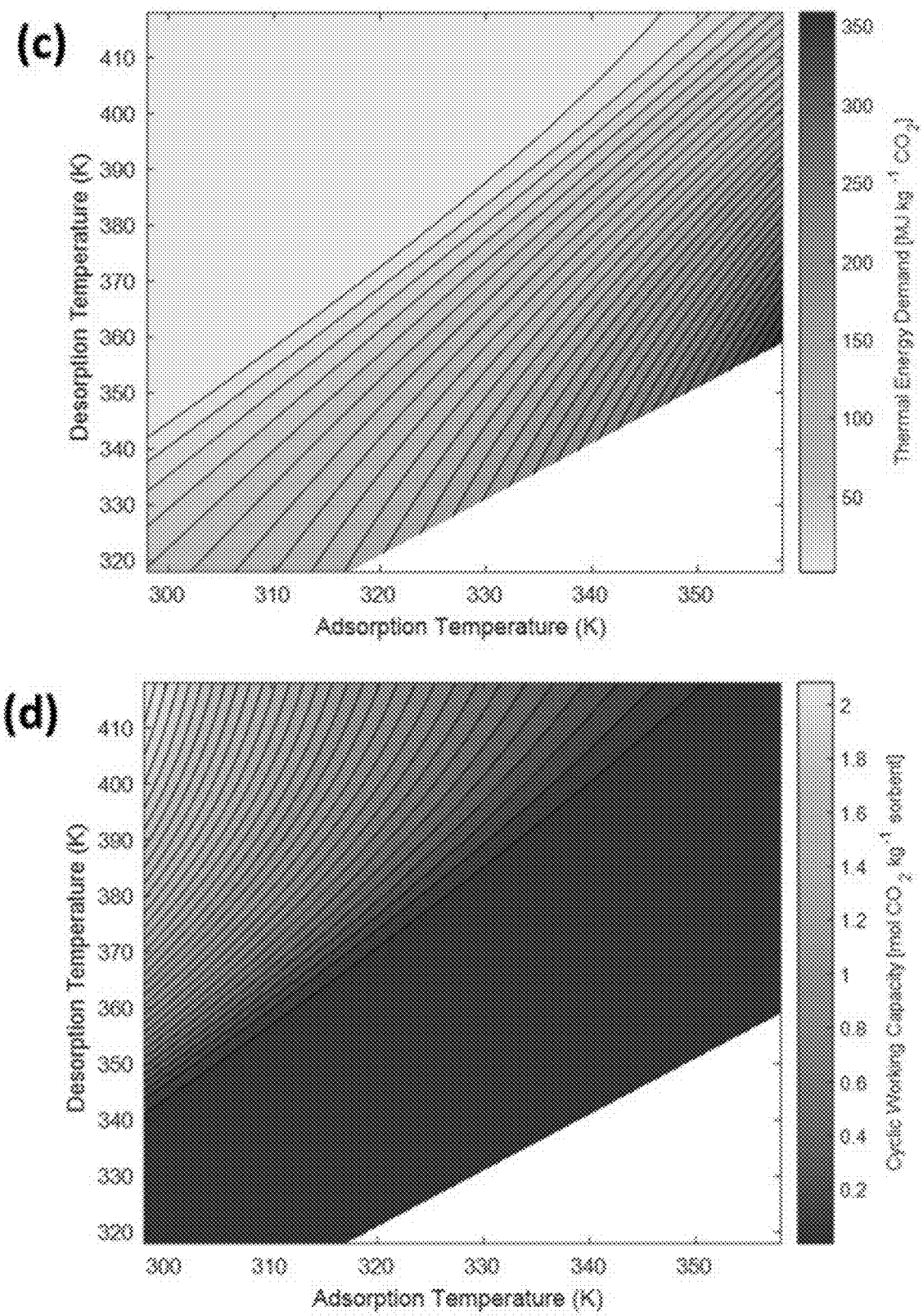
FIG. 37c-d

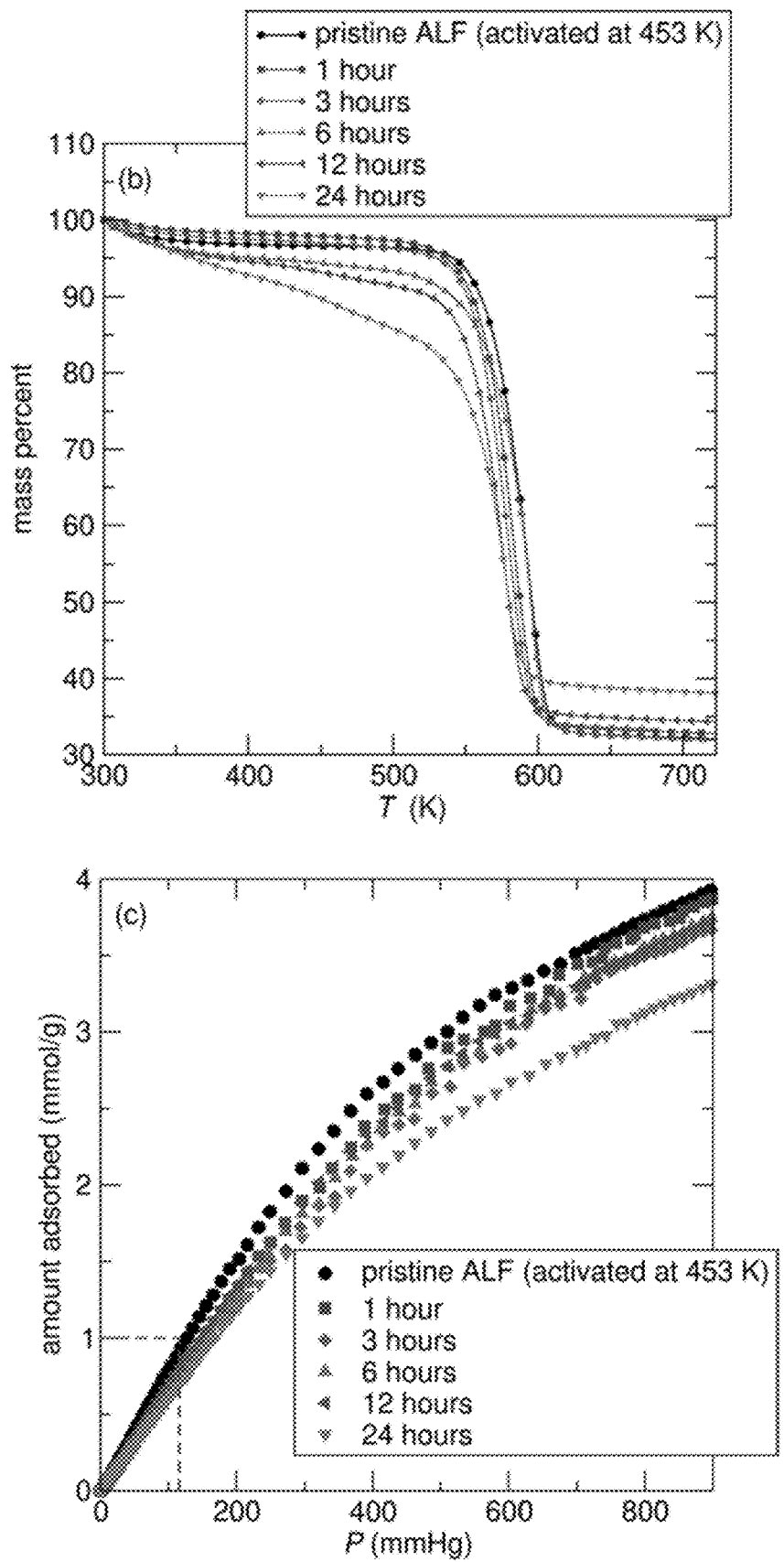
FIG. 47b-c

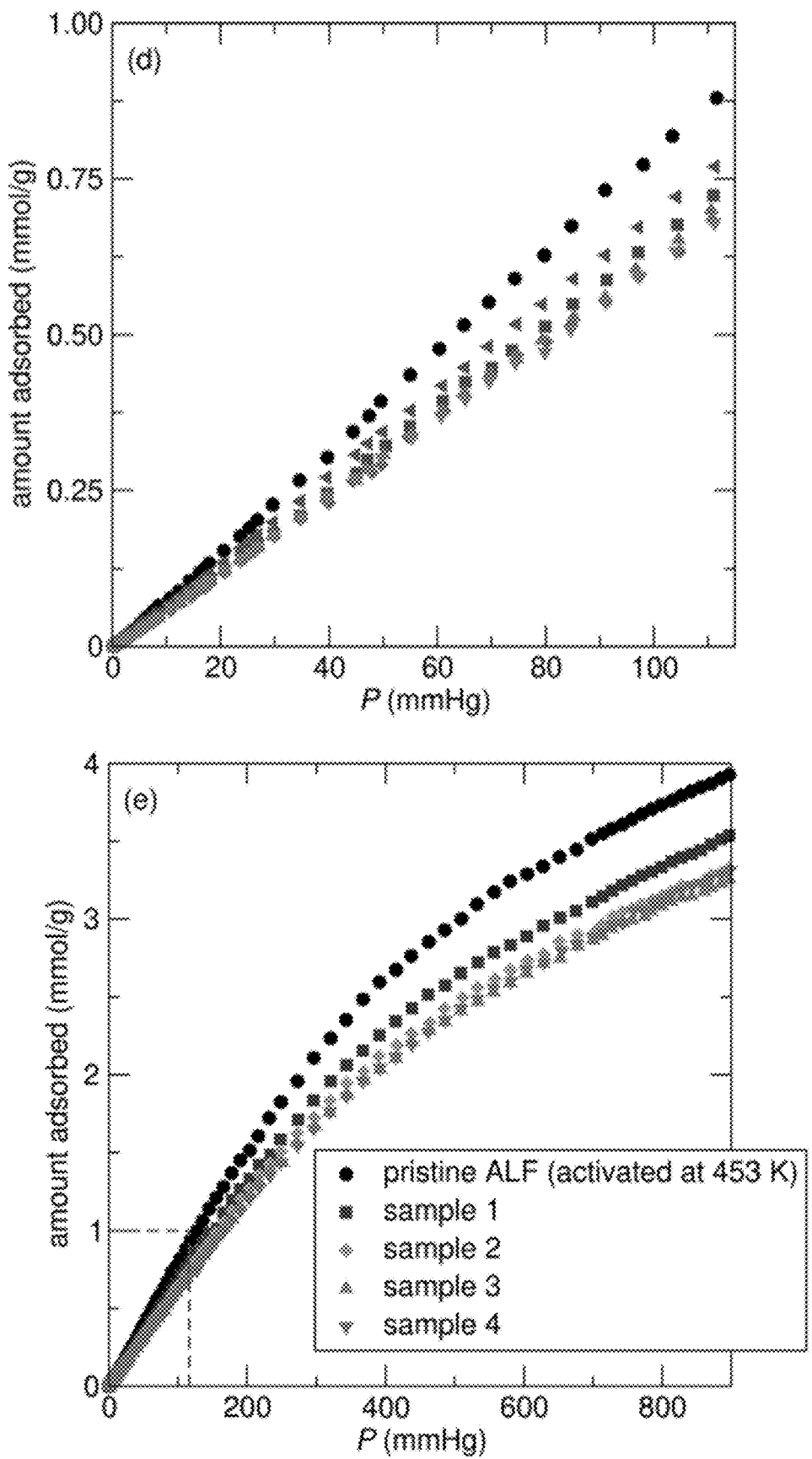
FIG. 47d-e

SIMPLE METAL-ORGANIC FRAMEWORK FOR THE SELECTIVE ADSORPTION OF CARBON DIOXIDE FROM FLUE GAS

FIELD OF INVENTION

The invention relates to a simple metal-organic framework for the selective adsorption of $CO_2$ from flue gas. The current invention also relates to methods of adsorbing $CO_2$ and/or $O_2$ from a gas with the metal-organic framework, releasing $CO_2$ and/or $O_2$ from the metal-organic framework, and obtaining the activated metal-organic framework.

BACKGROUND

The listing or discussion of a prior-published document in this specification should not necessarily be taken as an acknowledgement that the document is part of the state of the art or is common general knowledge.

As of 2020, more than 80 percent of the global energy supply is powered by fossil fuel combustion technologies. These combustion methods emit large quantities of greenhouse gases, in particular $CO_2$, leading to global warming, ocean acidification, sea-level rises, and other serious environmental issues. To reduce the environmental impact of fossil fuel utilization, there is an urgent need for efficient $CO_2$ capture and storage technologies. Conventional chemical sorbents based on aqueous amine solutions have a considerable capacity for post-combustion $CO_2$ capture, but their thermal degradation, corrosion, oxidative reactions, and usually energy-intensive regeneration processes are significant disadvantages. By contrast, porous solid sorbents that capture $CO_2$ via physisorption require less energy for regeneration and are showing great potential for cost-effective $CO_2$ capture (M. Oschatz & M. Antonietti, Energy Environ. Sci. 2018, 11, 57-70). However, traditional solid sorbents, such as zeolites and porous carbon-based materials also have considerable limitations. In particular, zeolites have inadequate $CO_2$ uptake capacity in humid gas streams and poor stability in aqueous environments while porous polymer and carbonaceous materials have low adsorption capacities and poor $CO_2/N_2$ selectivities (R. L. Siegelman et al., Energy Environ. Sci. 2019, 12, 2161-2173).

Metal-organic frameworks (MOFs), with their high surface areas, tuneable pore sizes, surface functionality, and structural diversity, offer several advantages as the next-generation solid adsorbent materials for $CO_2$ capture (M. Ding et al., Chem. Soc. Rev. 2019, 48, 2783-2828; and J. A. Mason et al., J. Am. Chem. Soc. 2015, 137, 4787-4803). There has been a significant effort to identify MOFs that are capable of the selective capture of $CO_2$ from post-combustion sources, which typically contain $CO_2$ (8-16%), $O_2$ (3-4%), and $H_2O$ (5-7%) balanced by $N_2$. Several MOFs have shown substantial gravimetric $CO_2$ uptake capacities for dried flue gas streams, which are normally expressed in terms of mmol of $CO_2$ per gram of sorbent. However, for practical applications in fixed-bed reactors, a high volumetric capacity, expressed in $mmol/cm^3$, is more relevant, and only a handful of MOFs meet the fixed-bed industrial requirements. Among the leading MOF sorbents, Mg-MOF-74, based on the ligand 2,5-dihydroxyterephthalate (dhtp), displayed 7.4 $mmol/cm^3$ in volumetric capacity and a leading gravimetric capacity of 8.04 mmol/g (1 bar, 298 K) (D.-A. Yang et al., Energy Environ. Sci. 2012, 5, 6465). In addition, porous materials with open metals sites and/or Lewis basic sites, micropores (4-6 Å) and excess polar functionalities (e.g., OH, $NH_2$, pyridyl, and SH) also showed considerable $CO_2$ adsorption capacities (T. M. McDonald et al., Nature 2015, 519, 7543). These materials would require a drying step prior to $CO_2$ capture to be practical, adding extra cost to the overall process. Other MOFs perform quite well in wet flue gas streams. For example, the SIFSIX family of materials showed impressive performance under realistic flue gas conditions (P. Nugent et al., Nature 2013, 495, 80-84; and W. Liang et al., Chem 2019, 5, 950-963) but they contain relatively expensive organic linkers, and even one of the most practical systems reported to date contains relatively expensive triazole ligands (R. Vaidhyanathan et al., Chem. Comm. 2009, 35, 5230-5232; R. Vaidhyanathan et al., Science 2010, 330, 650-653; and J.-B. Lin et al., Science 2021, 374, 1464-1469). Therefore, it remains extremely challenging to find MOF materials that can separate and capture $CO_2$ from combustion point sources in a cost-effective and scalable manner (S. Deutz & A. Bardow, Nat. Energy 2021, 6, 1-11). Furthermore, except for introducing chemisorption binding sites, such as alkyl amines into the frameworks, the methodologies for achieving efficient water-resistant $CO_2$ capture with MOFs remain under-explored.

Therefore, there exists an urgent need to discover new and cost-effective MOFs for selective and water-resistant $CO_2$ capture.

SUMMARY OF INVENTION

Aspects and embodiments of the invention are discussed in the following numbered clauses.

1. An activated metal-organic framework of formula I:

$$X_{1-x}Y_x(Z)_3 \quad \text{I}$$

where:
X is a metal in the +3 oxidation state;
Y is one or more metals in the +3 oxidation state, provided that each of the metals that represent X are different to each of the one or metals that represent Y;
x is from 0 to 0.9999, wherein
Z is selected from the group consisting of: $NO_2^-$ and, more particularly, $HCOO^-$, $R^1COO^-$, $H_2PO_2^-$,

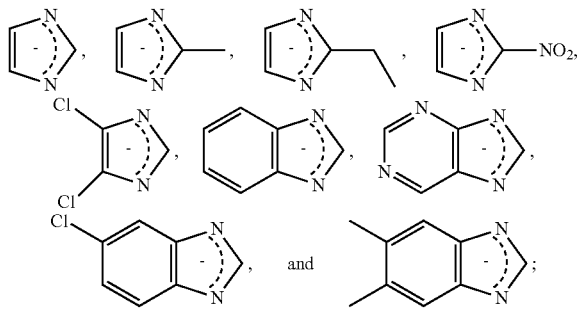

$R^1$ is $C_1$ to $C_6$ alkyl; and
the metal-organic framework has a BET surface area of from 250 to 1,000 $m^2/g$ as obtained from a 298 K $CO_2$ sorption isotherm.

2. The metal-organic framework of formula I according to Clause 1, wherein the BET surface area is from 500 to 600 $m^2/g$, such as from 514 to 599 $m^2/g$, such as from 582 to 599 $m^2/g$.

3. The metal-organic framework of formula I according to Clause 1 or Clause 2, wherein the metal-organic framework has a set of unit-cell parameters where a=b=c=from 11.303 to 11.894 Å, $\alpha=\beta=\gamma=90°$, Volume=from 1562 to 1600 Å$^3$, space group: I m-3.
4. The metal-organic framework of formula I according to any one of the preceding clauses, wherein x is from 0 to 0.99, such as from 0.25 to 0.85.
5. The metal-organic framework of formula I according to any one of the preceding clauses, wherein X is selected from Al, Fe, Mn, Y, Sc, Ga, In, Ti, Fe, Mn, V, Cr, Co, Tl, Bi, Ru, Os, Re, Ir, Rh, Ce, La, Pr, Nd, Sm, Eu, Gd, Tb, Dy, Ho, Er, Tm, Yb and Lu.
6. The metal-organic framework of formula I according to Clause 5, wherein X is Al.
7. The metal-organic framework of formula I according to any one of the preceding clauses, wherein Y, when present is selected from one or more of the group consisting of Al, Fe, Mn, Y, Sc, Ga, In, Ti, Fe, Mn, V, Cr, Co, Tl, Bi, Ru, Os, Re, Ir, Rh, Ce, La, Pr, Nd, Sm, Eu, Gd, Tb, Dy, Ho, Er, Tm, Yb and Lu, optionally wherein:
(a) Y, when present, is selected from one or more of the group consisting of Al, Tl, Fe, Ga, In, Mn, V and Cr;
(b) Y, when present, is selected from one or more of the group consisting of Fe, Ga, In, Mn, V and Cr;
(c) Y, when present, is selected from the group consisting of Al, Tl, Fe, Ga, In, Mn, V and Cr; or
(d) Y, when present, is selected from the group consisting of Fe, Ga, In, Mn, V and Cr.
8. The metal-organic framework of formula I according to Clause 7, wherein Y, when present, is Fe.
9. The metal-organic framework of formula I according to any one of the preceding clauses, wherein Z is selected from the group consisting of: $NO_2^-$ and, more particularly, $HCOO^-$, $R^1COO^-$ and $H_2PO_2^-$.
10. The metal-organic framework of formula I according to Clause 9, wherein Z is $HCOO^-$.
11. The metal-organic framework of formula I according to any one of the preceding clauses, wherein the metal-organic framework displays a $CO_2$ adsorption value of from 3 to 6 (e.g., from about 4 to about 5) mmol/g at 298 K and under 1 atmosphere of $CO_2$.
12. The metal-organic framework of formula I according to any one of the preceding clauses, wherein the metal-organic framework displays a $CO_2$ adsorption value of from 2 to 3 (e.g., about 2.3) mmol/g and from 90 to 150 (e.g., about 100) selectivity over $N_2$ at 298 K and under 1 atmosphere of total pressure provided by a gas stream of 15% $CO_2$ and 85% $N_2$ vol:vol.
13. The metal-organic framework of formula I according to any one of the preceding clauses, wherein the metal-organic framework displays an $O_2$ adsorption value of from 0.5 to 4 (e.g., from about 1 to about 3) mmol/g at 298 K and under 1 atmosphere of $O_2$.
14. The metal-organic framework of formula I according to any one of the preceding clauses, wherein it is selected from:
(a) $Al(HCOO)_3$;
(b) $Al_{0.75}Fe_{0.25}(HCOO)_3$;
(c) $Al_{0.5}Fe_{0.5}(HCOO)_3$;
(d) $Al_{0.25}Fe_{0.75}(HCOO)_3$;
(e) $Al_{0.15}Fe_{0.85}(HCOO)_3$,
(f) $V(HCOO)_3$; and
(g) $V_{0.3}Al_{0.7}(HCOO)_3$, optionally wherein the metal-organic framework of formula I according to any one of the preceding clauses, wherein it is selected from:
(a) $Al(HCOO)_3$;
(b) $Al_{0.75}Fe_{0.25}(HCOO)_3$;
(c) $Al_{0.5}Fe_{0.5}(HCOO)_3$;
(d) $Al_{0.25}Fe_{0.75}(HCOO)_3$;
(e) $Al_{0.15}Fe_{0.85}(HCOO)_3$.
15. A method of adsorbing $CO_2$ and/or $O_2$ from a gas, comprising subjecting a metal-organic framework of formula I according to any one of Clauses 1 to 14 to a flow of a gas comprising one or both of $CO_2$ and $O_2$, optionally wherein the gas further comprises nitrogen and water vapour.
16. The method according to claim 15, wherein the gas further comprises nitrogen and water vapour.
17. The method according to claim 15 or claim 16, wherein the gas has a relative humidity of from less than or equal to 25% to 90%.
18. The method according to claim 17, wherein the gas has a relative humidity of less than or equal to 25%.
19. A method of releasing $CO_2$ and/or $O_2$ from a metal-organic framework of formula I according to any one of Clauses 1 to 14 to which $CO_2$ and/or $O_2$ has been adsorbed, the process comprising:
(a) providing a metal-organic framework of formula I to which $CO_2$ and/or $O_2$ has been adsorbed; and
(b) activating it by subjecting it to:
(i) a temperature of from 90 to 160° C. (e.g., from 100 to 150° C., such as 120° C.) under a reduced pressure for a period of time (e.g. from 1 to 2 hours); or
(ii) a temperature of from 170 to 250° C. (e.g., from 175 to 185° C., such as about 180° C.) under 1 atmosphere pressure for a period of time (e.g. from 1 to 2 hours).
20. A method of obtaining an activated metal-organic framework of formula I according to any one of Clauses 1 to 14, the method comprising the steps of:
(a) providing an unactivated metal-organic framework of formula I; and
(b) activating it by subjecting it to:
(i) a temperature of from 90 to 160° C. (e.g., from 100 to 150° C., such as 120° C.) under a reduced pressure for a period of time (e.g. from 1 to 2 hours); or
(ii) a temperature of from 170 to 250° C. (e.g., from 175 to 185° C., such as about 180° C.) under 1 atmosphere pressure for a period of time (e.g., from 1 to 2 hours).
for a period of time, whereby the BET surface area of the metal-organic framework of formula I is increased to a value of from 500 to 600 m$^2$/g as obtained from a 298 K $CO_2$ sorption isotherm following step (b).

DRAWINGS

FIG. 1 depicts the variable temperature X-ray diffraction (XRD) of the as-made $Al(HCOO)_3$ upon heating in air. It was observed that the intensity of the first peak sizably increased upon $CO_2$ loss between 425 K and ≈523 K, and eventual degradation of the compound between 533 K and 543 K, which is in line with observations from thermogravimetric analysis (TGA).

FIG. 2 depicts the powder X-ray diffraction (PXRD) patterns (taken at 300 K), illustrating the chemical resistance of the as-made $Al(HCOO)_3$ in various (a) acid/base, and (b) boiled solvent media after exposure. This data was normalized to the peak near 2θ angle of 40° to account for differing sample amounts in each diffraction pattern. The as-made pattern is included for comparison in both panels. It is noted that after exposure to these media, the structural integrity of the as-made Al(HCOO)$_3$ was largely maintained. The aspect ratios between panels (a) and (b) are different, but the as-made diffraction pattern used for comparison is the same for both panels.

FIG. 3 depicts the PXRD patterns (taken at 300 K), illustrating the chemical resistance of activated Al(HCOO)$_3$ (ALF) in various (a) acid/base (12 h of exposure, except for NaOH), and (b) boiled solvent media (7 days of exposure). This data was normalized to the peak near 2θ angle of 40° to account for differing sample amounts in each diffraction pattern. The activated pattern is included for comparison in both panels. It is noted that after exposure to these media, the structural integrity of ALF was largely maintained. The aspect ratios between panels (a) and (b) are different, but the as-made diffraction pattern used for comparison is the same for both panels. In certain patterns, there is formation of very small peaks next to the main peak near 2θ angle of 15°; these are from an unknown side phase. If ALF is boiled in water, it will gradually dissolve. However, the dissolved compound can be isolated and recycled in a similar process to that shown in FIG. 45.

FIG. 4 depicts the TGA of as-made Al(HCOO)$_3$ and ALF performed under a N$_2$ atmosphere. The degradation product in both samples was alumina, evident from the approximately 30% mass weight leftover upon degradation. [4 Al(HCOO)$_3$+3O$_2$→4CO$_2$+6H$_2$O+2Al$_2$O$_3$]

FIG. 5 depicts the experimental and theoretical results on the structure of ALF with and without CO$_2$. (a) The structure of ALF at 300 K determined from neutron powder diffraction (NPD). Space group=Im$\bar{3}$; a=11.3905(1); V=1477.85 (5); (b) Structure of ALF illustrating the two types of interpenetrating large cavity (LC)-small cavity (SC)-LC (circles) and SC-SC-SC (squares) channels within ALF; (c and d) Position energy of CO$_2$ and N$_2$ as the molecules are translated in the SC (upper boxes) and LC (lower boxes) of ALF. In (c) and (d), positive energies represent energetically unfavourable positions, and the crosses serve as guides for the eye. The absolute values of the position energies are different in (c) and (d); (e) SC, illustrating hydrogen bonding with formate ligands and CO$_2$. Error value is 1; and (f) LC, illustrating lack of hydrogen bonding between the formate ligands and the disordered CO$_2$.

FIG. 6 depicts the structure of ALF at 14 K annotated with values of the atom-atom distances (in Å) along the SC only and S/LC channels. Values in brackets indicate 1σ.

FIG. 7 depicts the structure of ALF at 300 K annotated with values of the atom-atom distances (in Å) along the SC only and S/LC channels. It can be seen that the size limiting distance along the small pore only channel is between hydrogen atoms [4.103(19) Å]. For the small/large pore channels, the smallest distance is between oxygen atoms of the formate ligands [4.561(7) Å]. This suggests that the favoured pathway of gas adsorption is most likely through the small/large pore channel. Values in brackets indicate 1σ.

Figure 10:
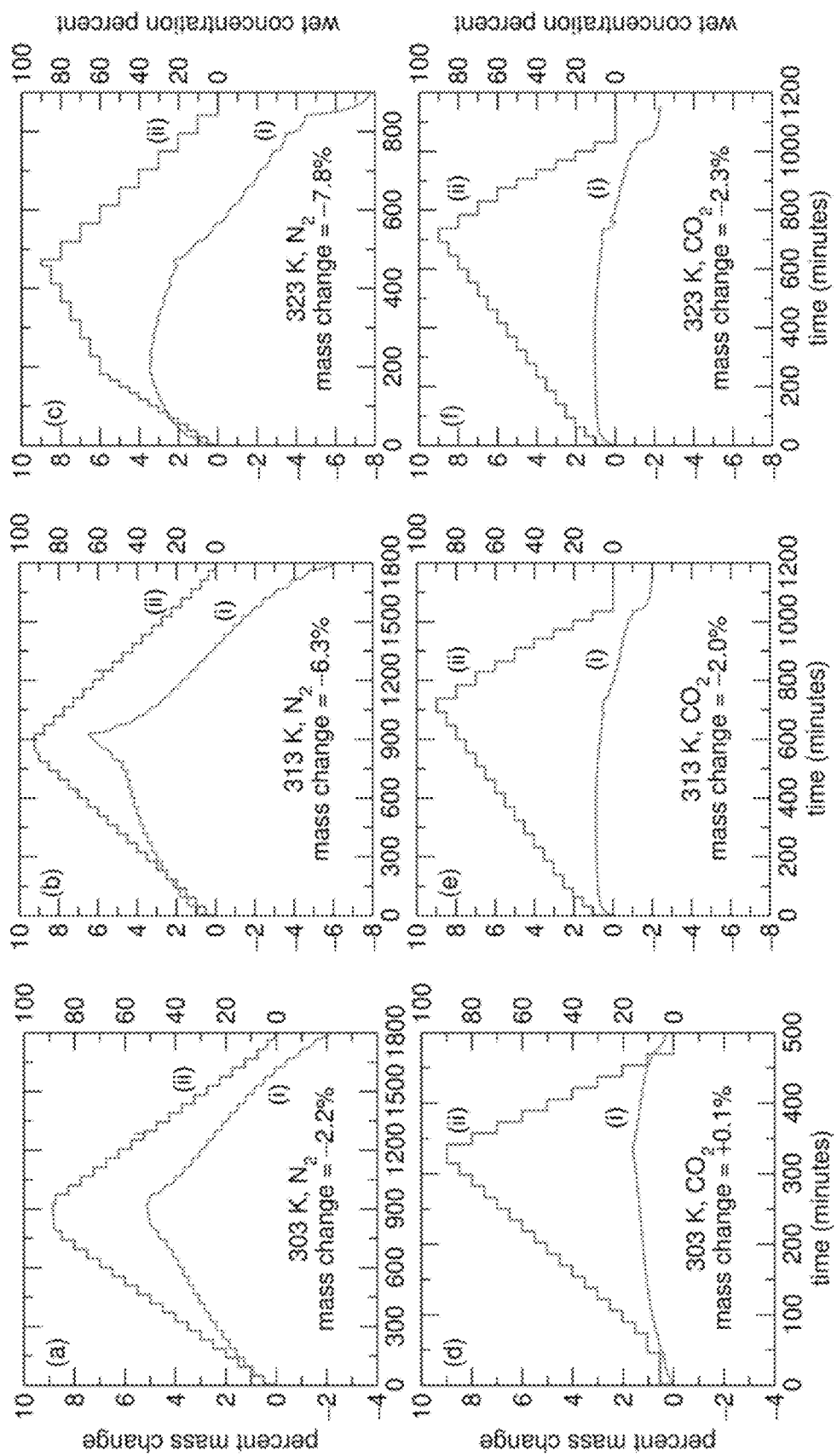

FIG. 10 depicts the dynamic vapor sorption (DVS) measurements at 303 K, 313 K, or 323 K, on ALF of H$_2$O in (a-c) N$_2$ or (d-f) CO$_2$ carrier gas. The water content is varied by combining a flow of dry carrier gas with a second flow of carrier gas bubbled through a H$_2$O reservoir held at the measurement temperature. The left ordinate (i) tracks the mass change normalized by the initial weight at the start of the humidity ramp, which approximates the "dry weight". The right ordinate (ii), denoted as "wet concentration", is the relative flow of wetted carrier gas normalized by the total flow of dry and wet carrier gas, with units of percent.

Figure 11K:
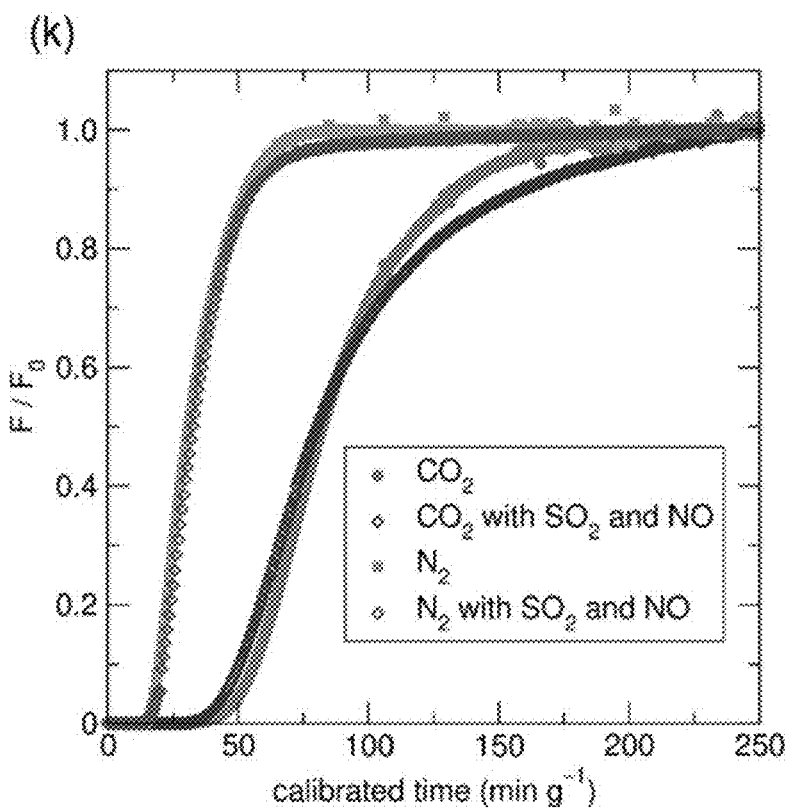
Figure 12:
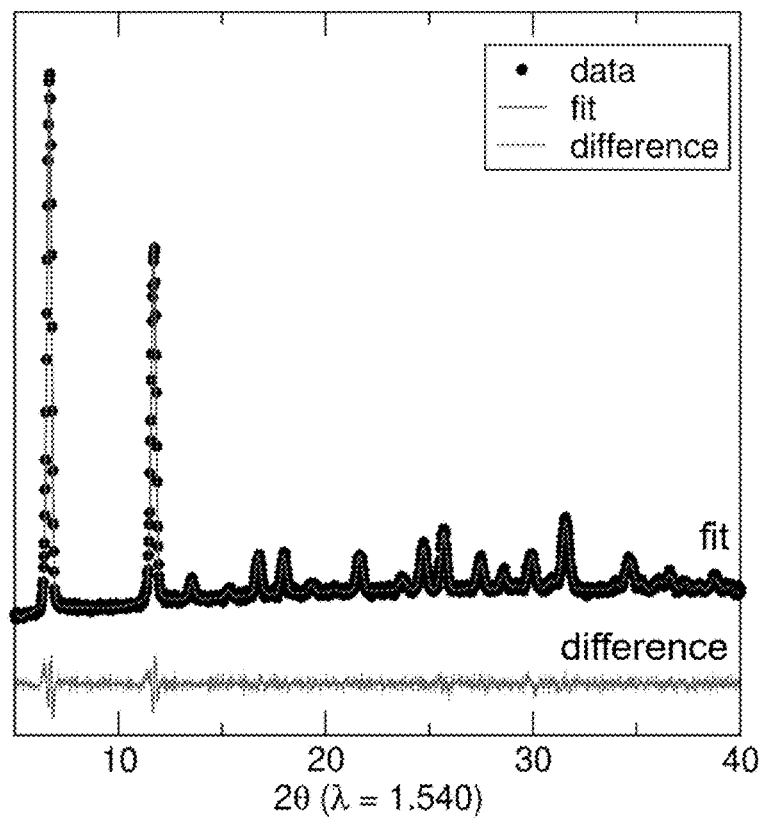
Figure 13:
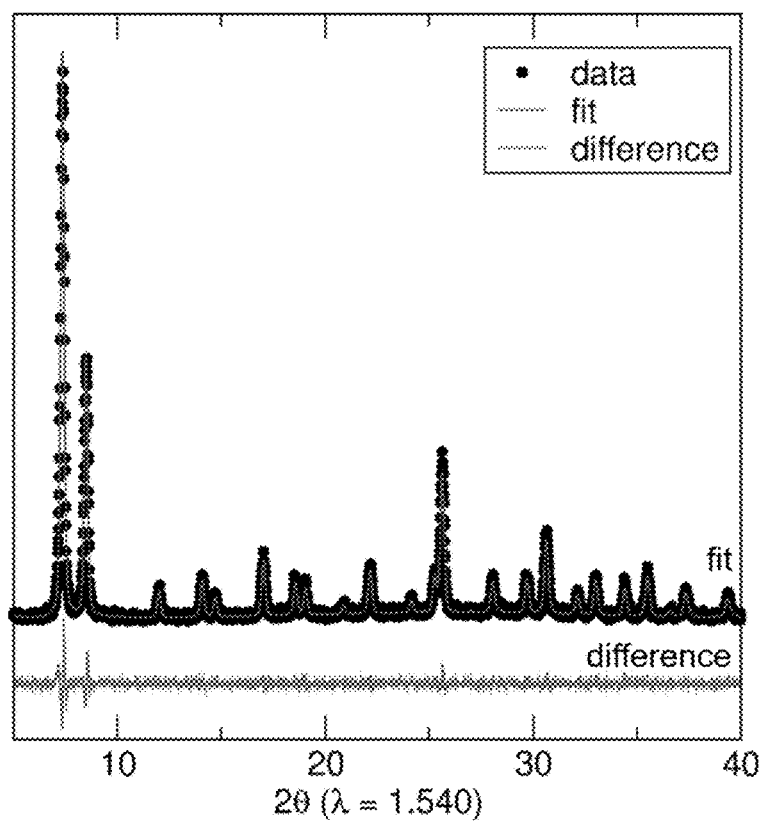
Figure 14:
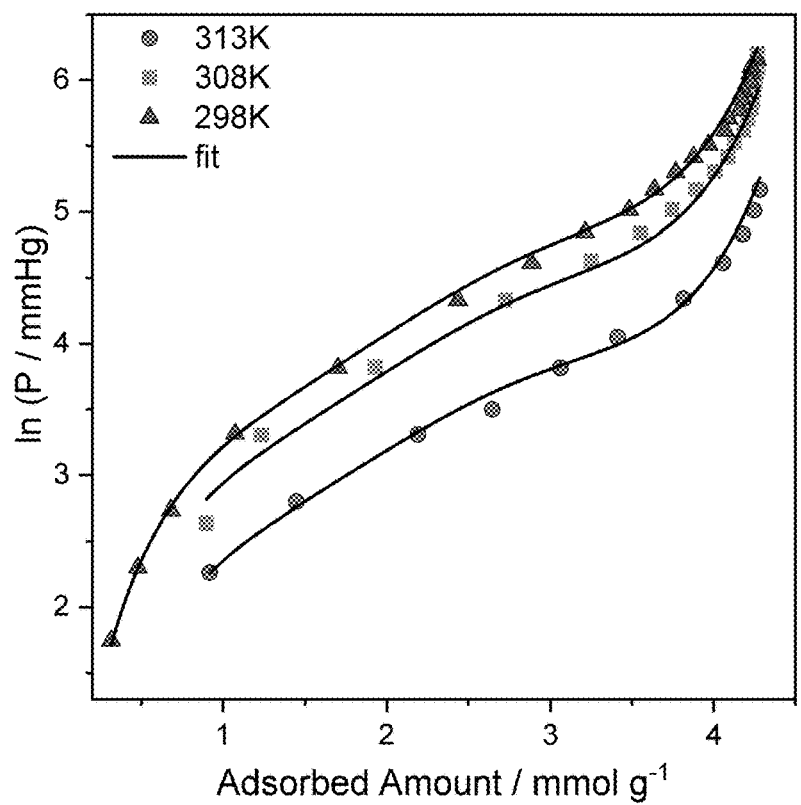

FIG. 11 depicts the isotherm and breakthrough adsorption data. (a) CO$_2$ adsorption isotherms at various temperatures; (b) Comparison of the CO$_2$ and N$_2$ adsorption isotherms at 298 K. The inset shows the CO$_2$/N$_2$ sorption selectivity (based on ideal adsorbed solution theory (IAST) for a 15/85 mixture of CO$_2$/N$_2$ at 298 K (323 K in FIG. 44); (c) Comparison of the H$_2$O vapor sorption isotherms of ALF, MOF-74-Ni, and UiO-66-(OH)$_2$ at 298 K; (d) Breakthrough curves (uncalibrated) of a 15/85 CO$_2$/N$_2$ mixed gas through an ALF-packed column at 323 K. The CO$_2$ uptake and CO$_2$/N$_2$ selectivity from these curves were 0.80(1) mmol/g and 75(21), respectively; (e) Comparison of the CO$_2$ breakthrough curves through a dry and H$_2$O-saturated-ALF packed column at 323 K. The curves are calibrated after a point-by-point correction; (f) A summary of the CO$_2$ dynamic capacity of the MOF-packed columns under dry and H$_2$O-presaturated conditions at 323 K. ALF had a ≈70% retention of performance versus ≈15% for UiO-66-(OH)$_2$ and ≈10% for MOF-74-Ni. Refinements of the MOF-74-Ni and the UiO-66-(OH)$_2$ are shown in FIG. 12-13. Virial fits for the CO$_2$ isotherms collected are shown in FIG. 14. Langmuir fits and pore size distributions can be found in FIGS. 15 and 16; (g-h) Breakthrough curves of the adsorption column of ALF using dry 15/85 CO$_2$/N$_2$ mixtures at (g) 298 K, and (h) 323 K; (i) The coadsorption CO$_2$ uptake capacity and CO$_2$/N$_2$ sorption selectivity of ALF derived from breakthrough experiments of 15/85 CO$_2$/N$_2$ mixed gas at 423 K; and (j) Water sorption isotherms of ALF at 298 K; and (k) Breakthrough curves of 15/85 CO$_2$/N$_2$ mixed gas with and without SO$_2$ (50 ppm) and NO (50 ppm) through an ALF-packed column at 323 K.

FIG. 12 depicts the Pawley fit of a bench PXRD spectrum of MOF-74-Ni. Space group R-3, refined lattice parameters a=b=25.871(3), c=6.680(2).

FIG. 13 depicts the Pawley fit of a bench PXRD spectrum of UiO-66-OH$_2$. Space group F-43m, refined lattice parameters a=b=c=20.8521(8).

FIG. 14 depicts the virial fits for the CO$_2$ isotherms collected at 298 K, 308 K, and 313 K.

Figure 15:
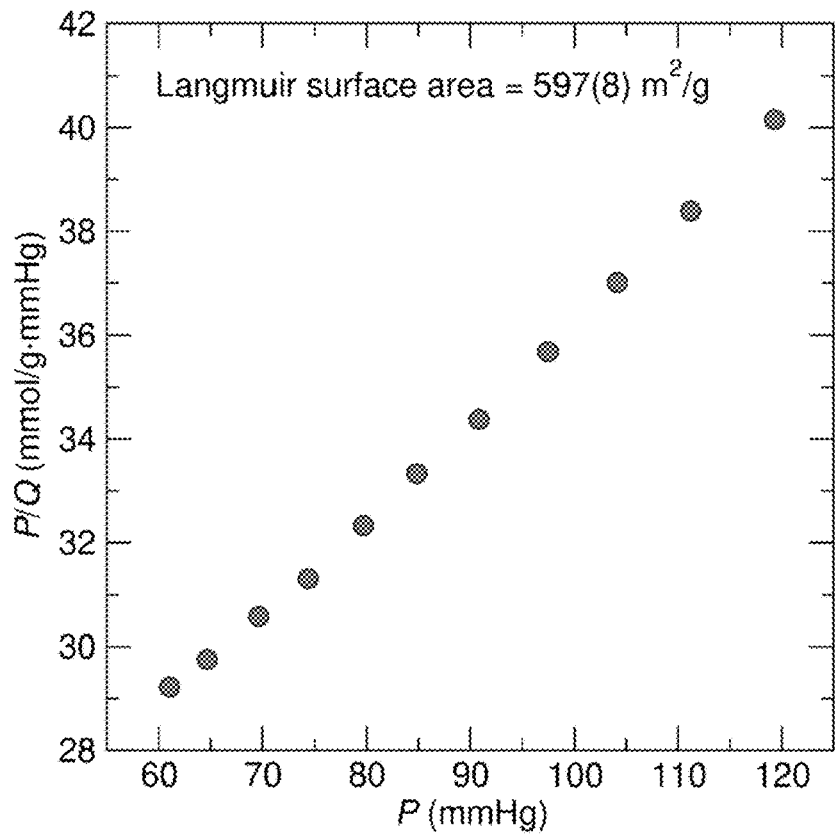

FIG. 15 depicts the Langmuir fits obtained from 298 K CO$_2$ isotherms of ALF. The value in parenthesis denotes 1σ.

Figure 16:
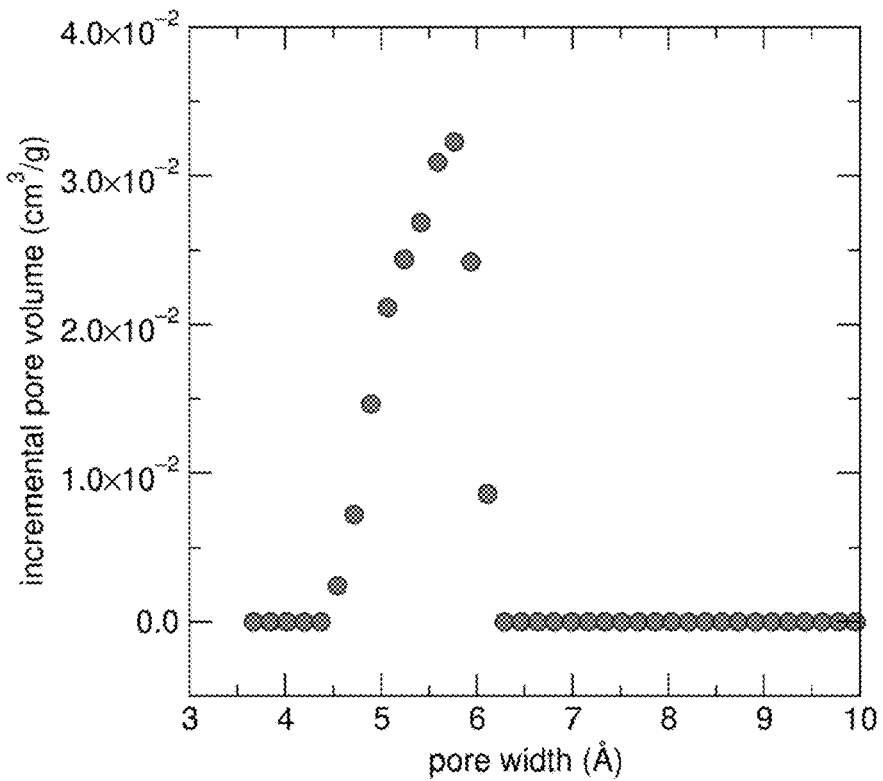

FIG. 16 depicts the pore size distribution of ALF after activation at 150° C. (423 K), obtained by fitting the CO$_2$ model to the 298 K CO$_2$ adsorption isotherms.

Figure 17:
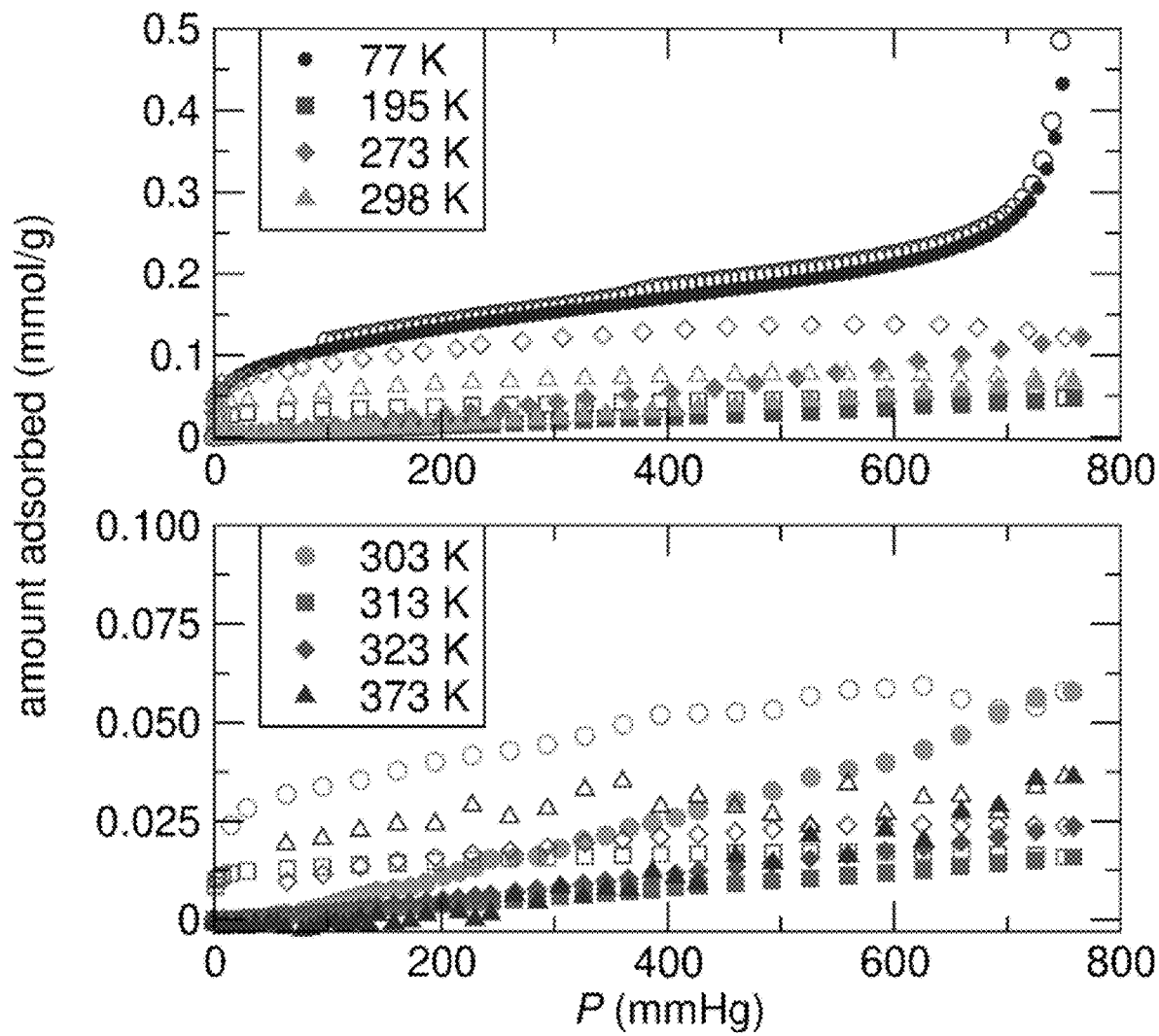

FIG. 17 depicts the variable temperature N$_2$ sorption isotherms of ALF (closed shapes are the adsorption data, and open shapes are the desorption data).

Figure 18:
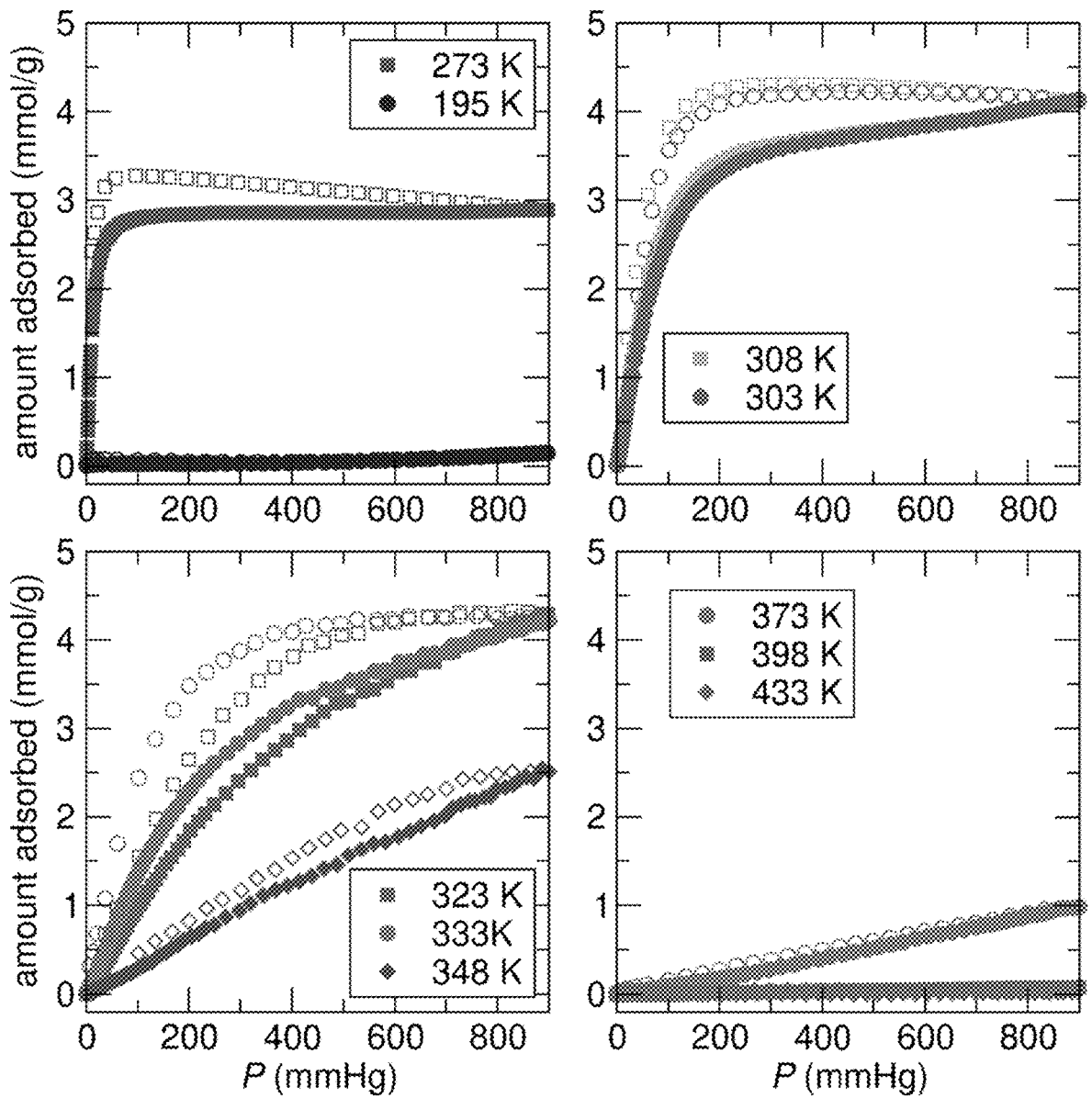

FIG. 18 depicts the variable temperature CO$_2$ sorption isotherms of ALF (closed shapes are the adsorption data, and open shapes are the desorption data).

Figure 19A:
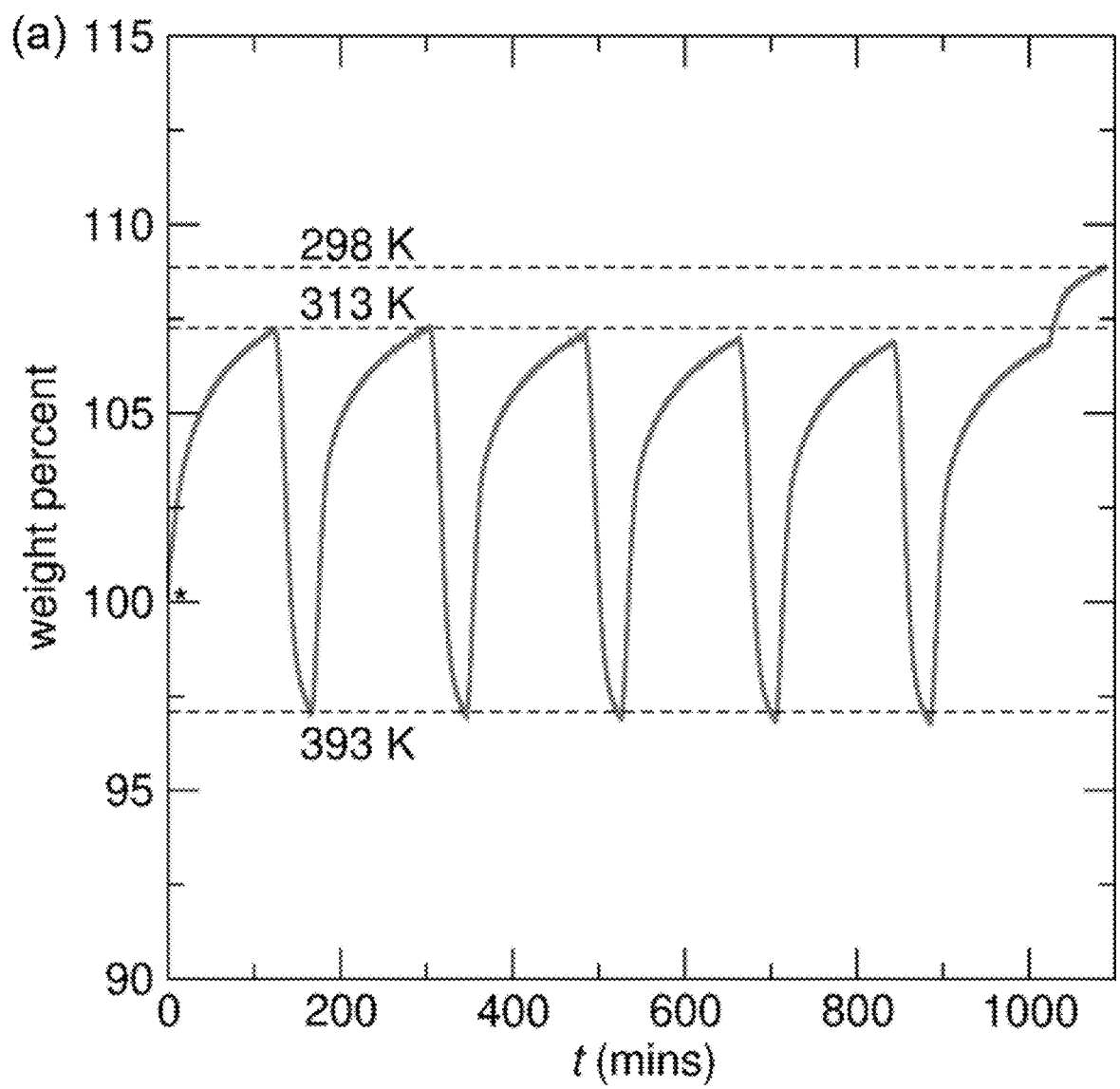
Figure 19B:
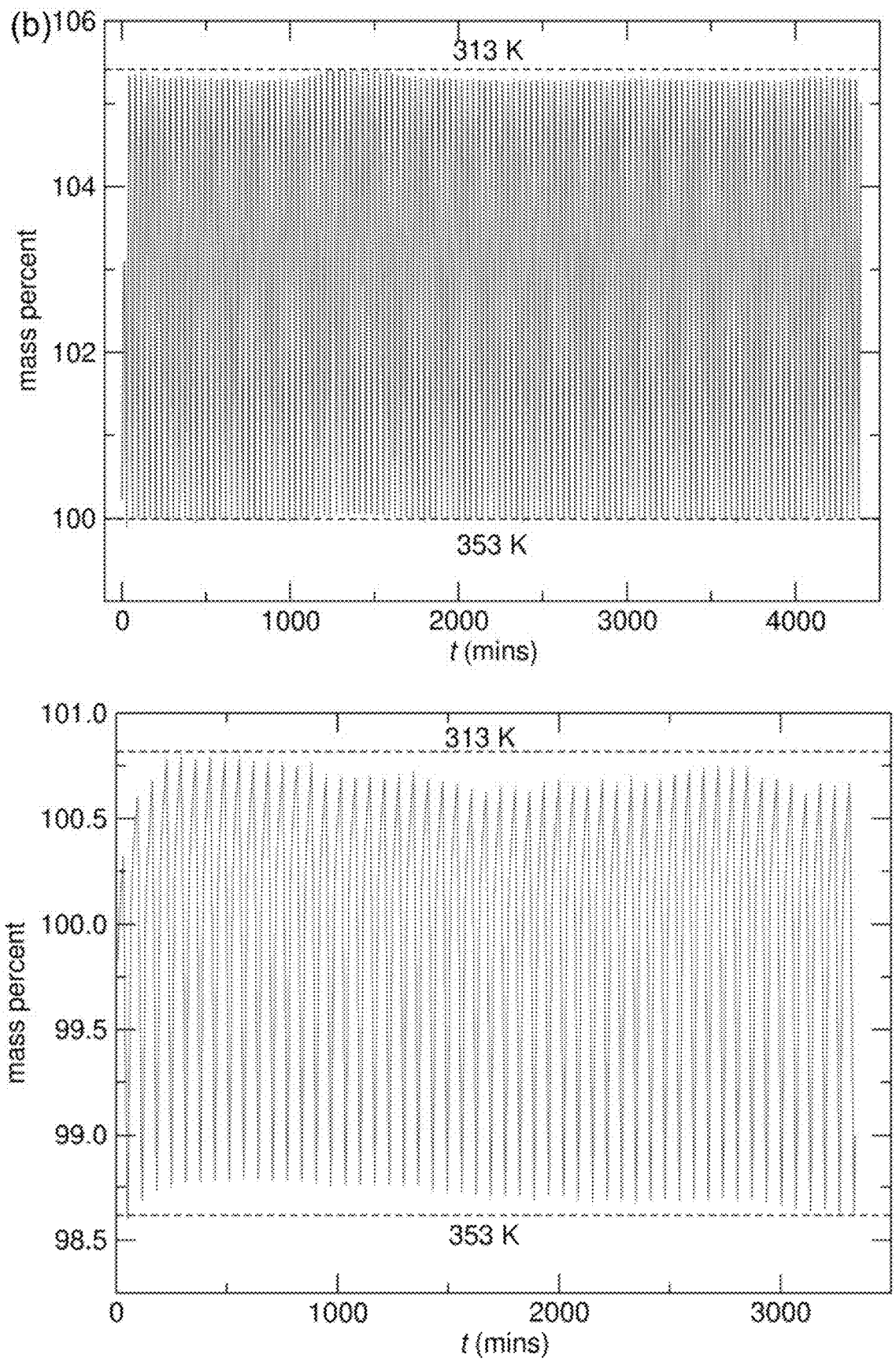

FIG. 19 depicts (a) the in-situ CO$_2$ TGA cycling studies on activated ALF under CO$_2$ at different temperatures. The * denotes the start temperature of 298 K at 0 min and 100 weight percent; and (b) (top panel) in situ TGA cycling studies on ALF under dry CO$_2$ atmosphere. This graph shows 130 cycles where degassing occurs at 353 K and CO$_2$ adsorption takes place on cooling to 313 K. Each cycle was approximately 30 minutes. (Bottom panel) In situ TGA cycling studies on ALF under 3% humid 15/85 CO$_2$/N$_2$ atmosphere for 50 cycles. Each cycle was approximately 60 min long.

Figure 20:
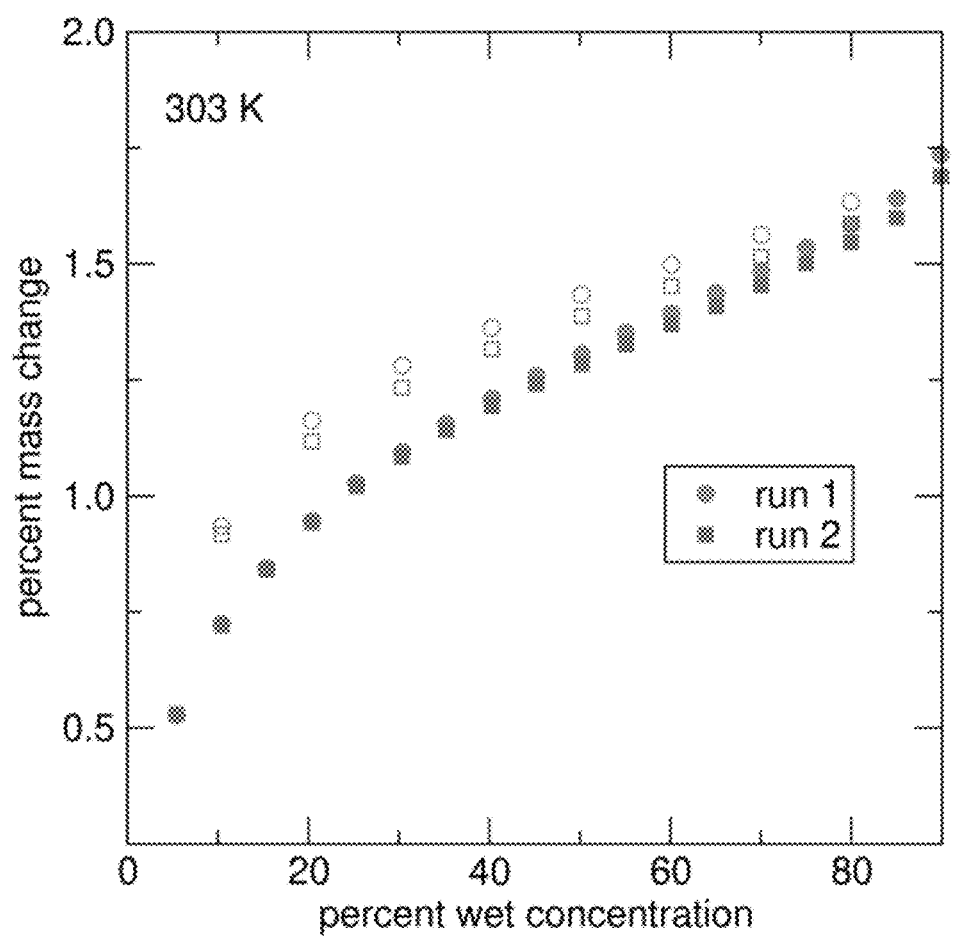

FIG. 20 depicts the isotherms of the first and second $CO_2$ carrier gas DVS experiments done at 303 K. percent wet concentration is defined in the DVS experimental section of this document.

Figure 21:
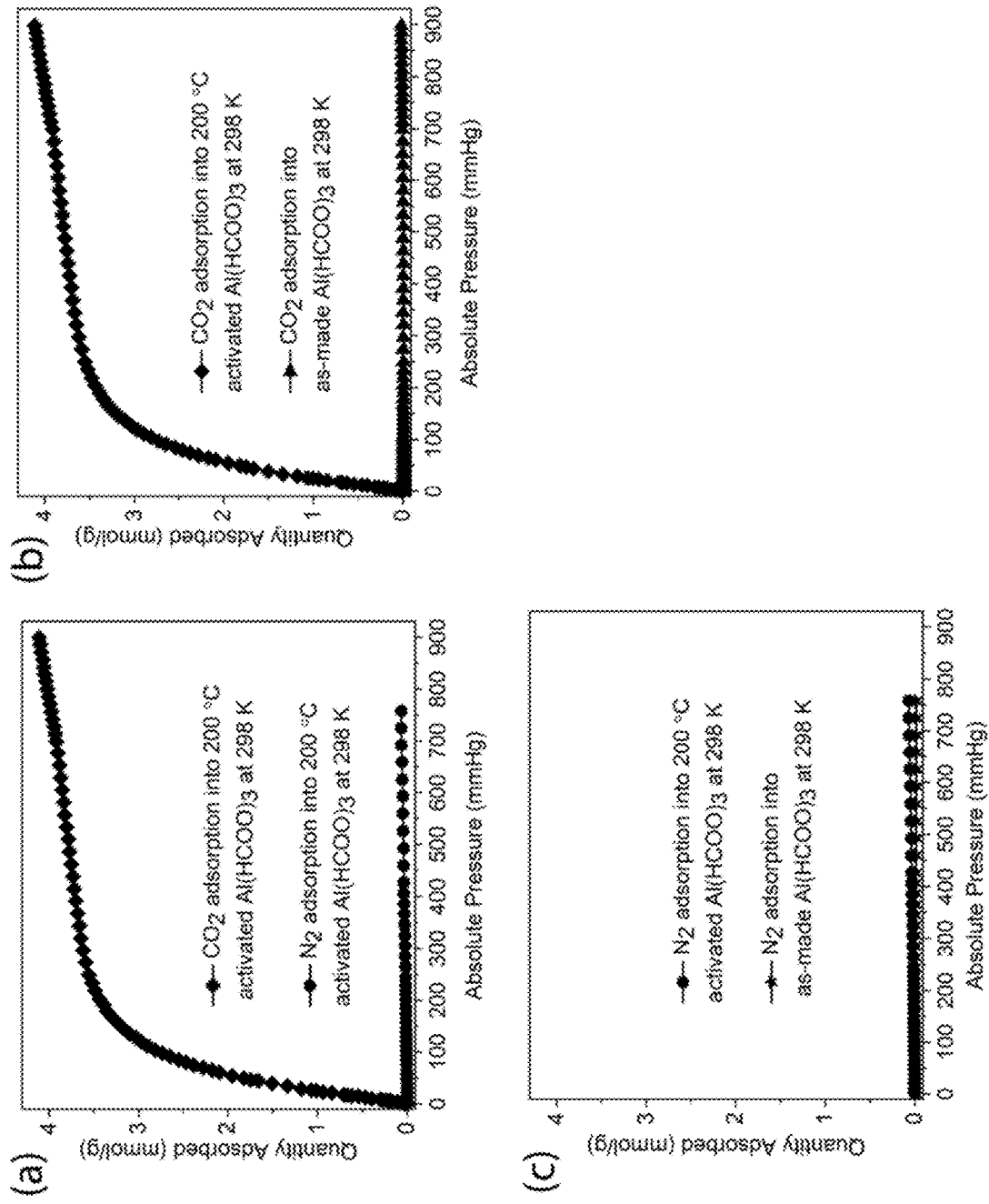

FIG. 21 depicts (a) comparison of the adsorption of $CO_2$ and $N_2$ into ALF at room temperature; (b) $CO_2$ adsorption into the as-made $Al(HCOOH)_3$ at room temperature compared with adsorption into the activated material; and (c) $N_2$ adsorption into the as-made $Al(HCOOH)_3$ at room temperature compared with adsorption into the activated material.

Figure 22:
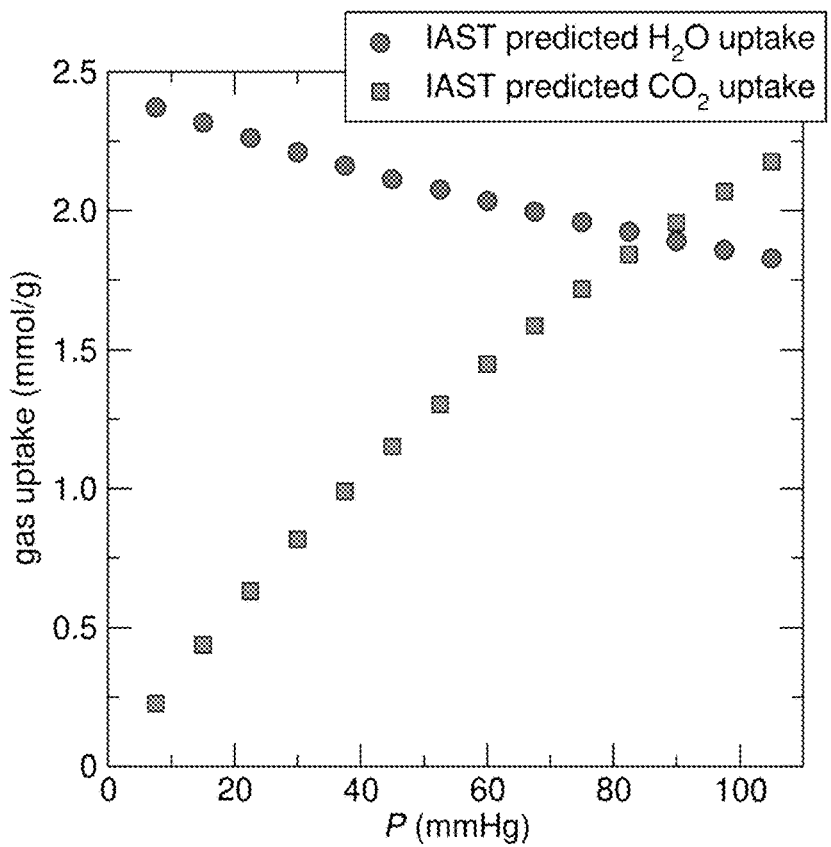

FIG. 22 depicts the IAST-predicted uptakes of $CO_2$ and $H_2O$ in ALF at 298 K for a $CO_2/H_2O$ binary system with varying $CO_2$ partial pressures and a fixed relative humidity of 91%.

Figure 23:
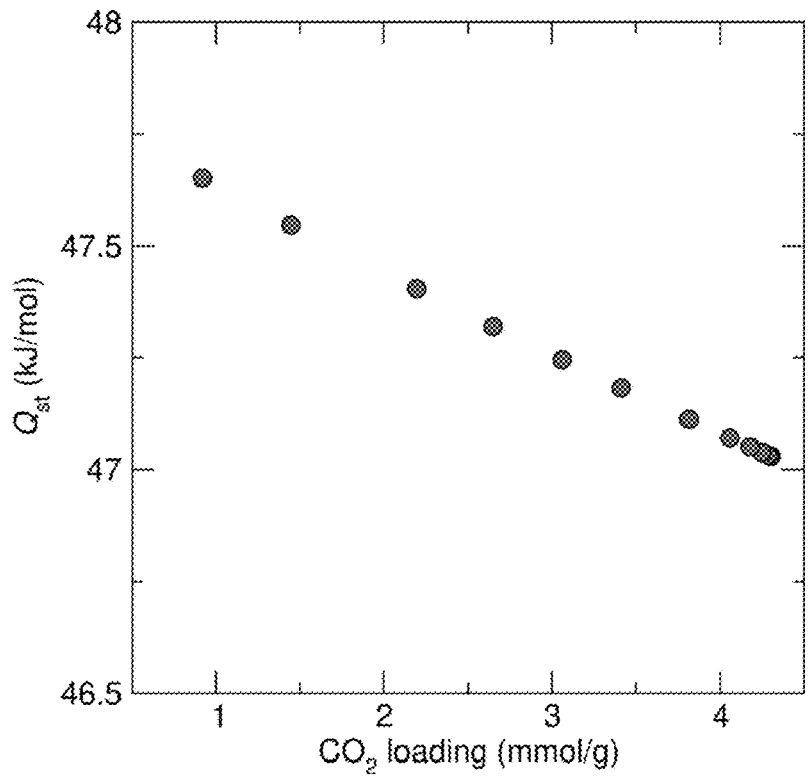

FIG. 23 depicts the isosteric heat of adsorption (Qst) for $CO_2$, which was estimated by applying the Clausius-Clapeyron relation using the $CO_2$ desorption isotherms measured at 298 K, 308 K, and 313 K.

Figure 24:
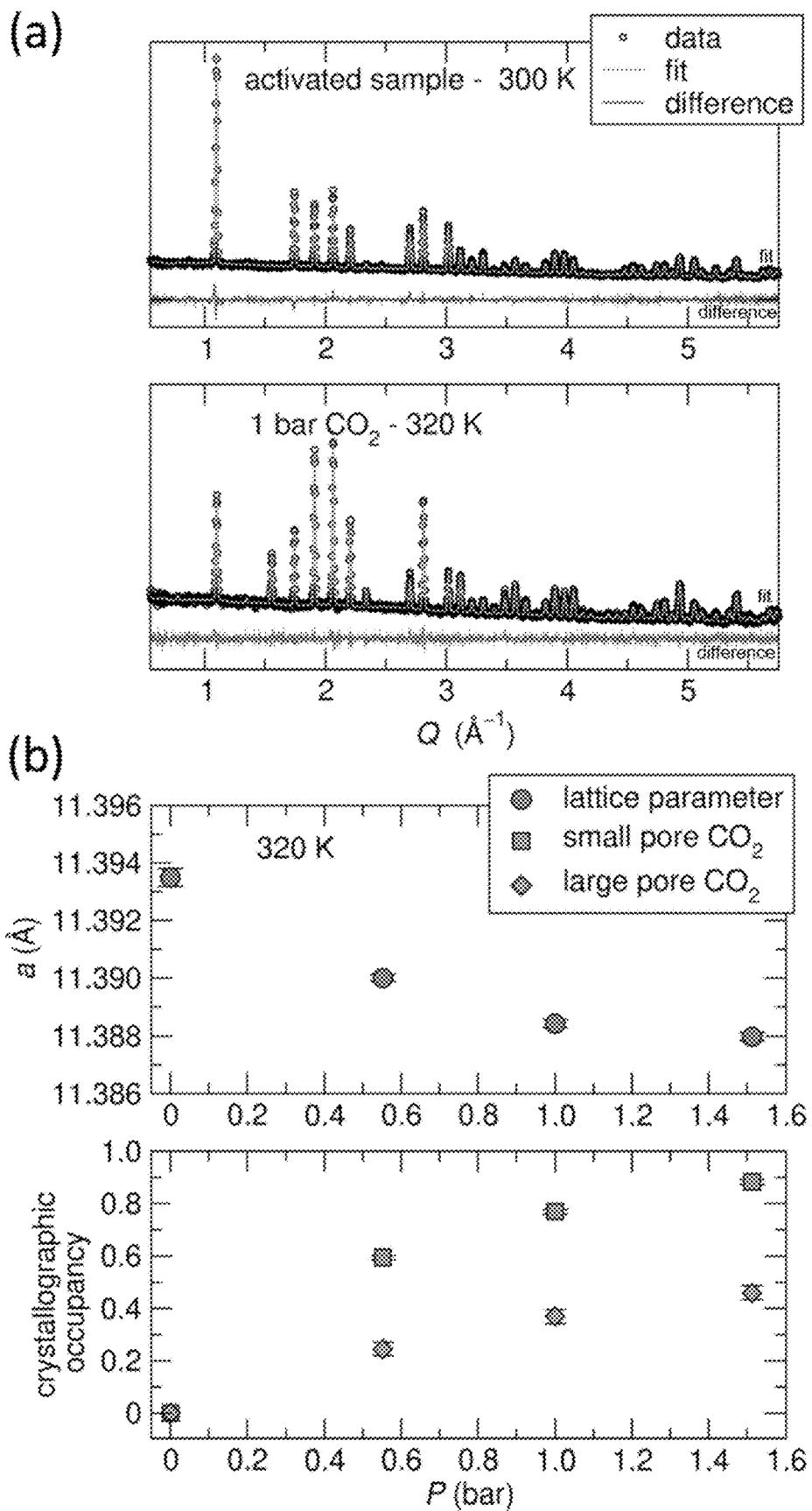
Figure 25:
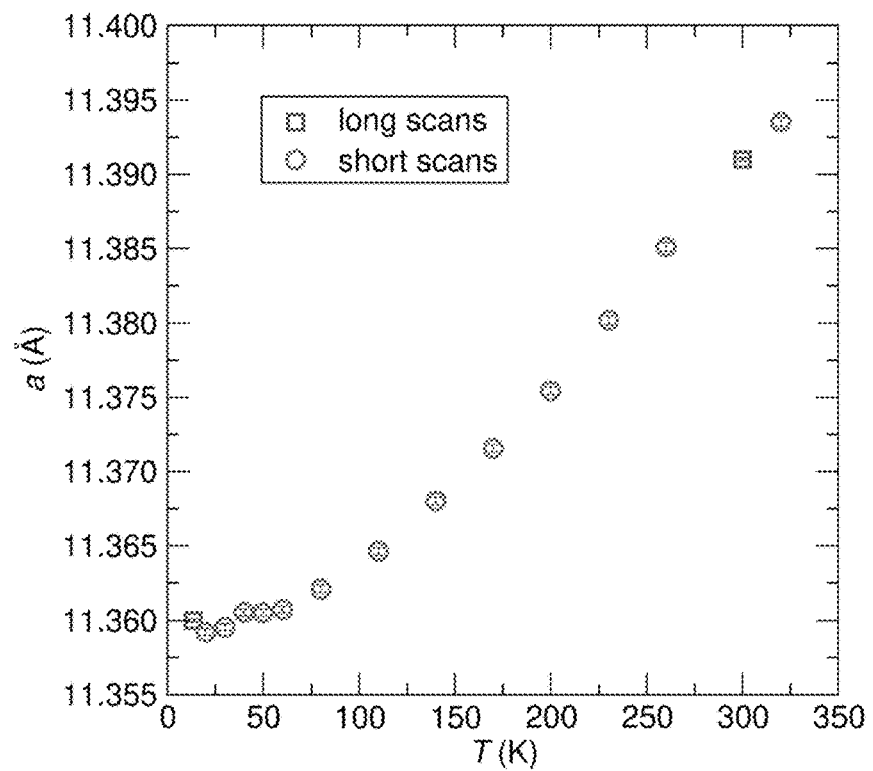
Figure 26:
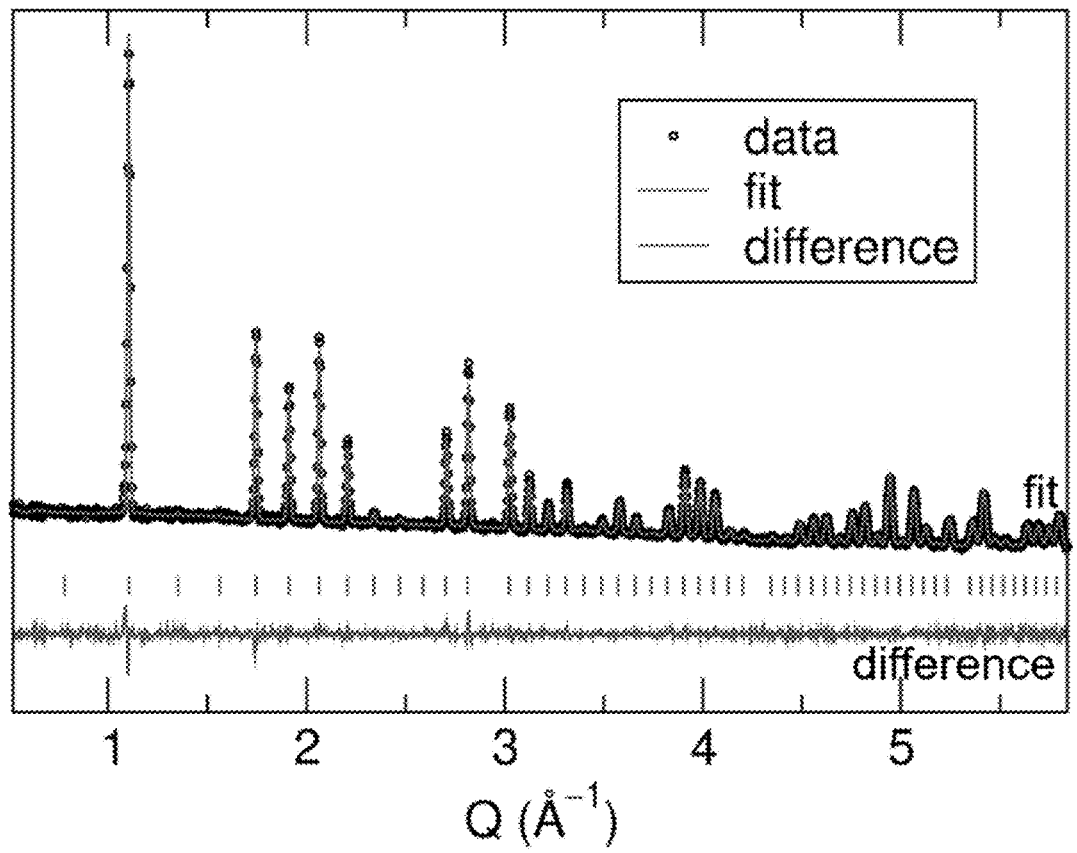
Figure 27:
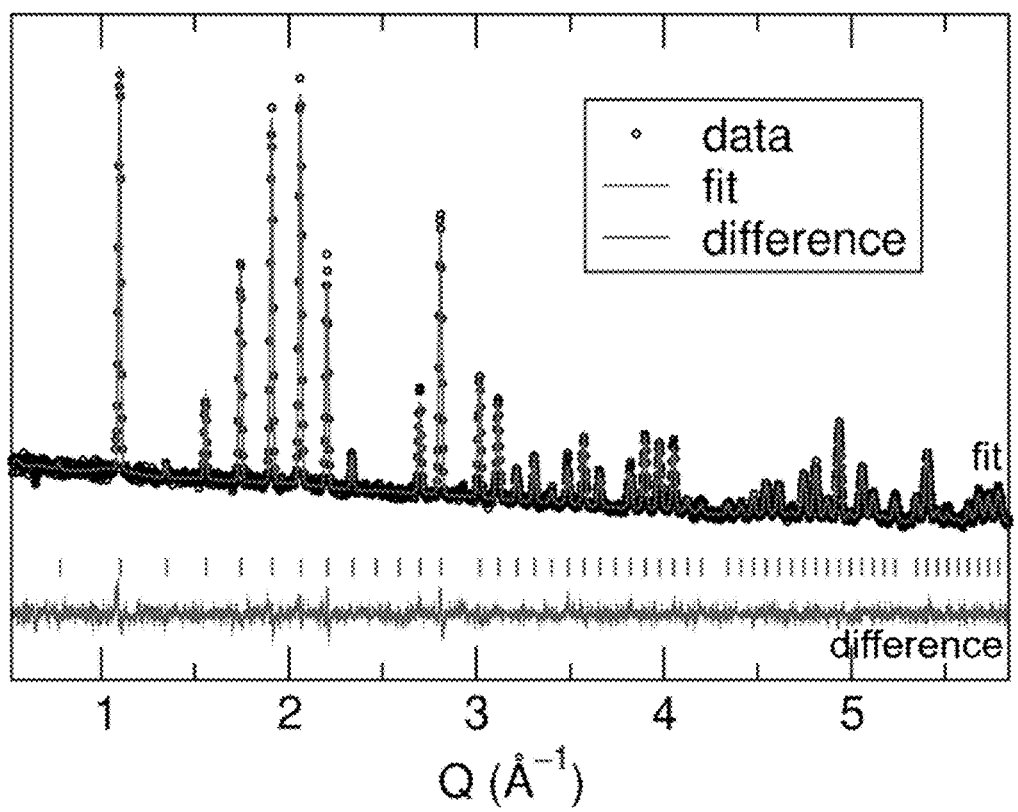
Figure 28:
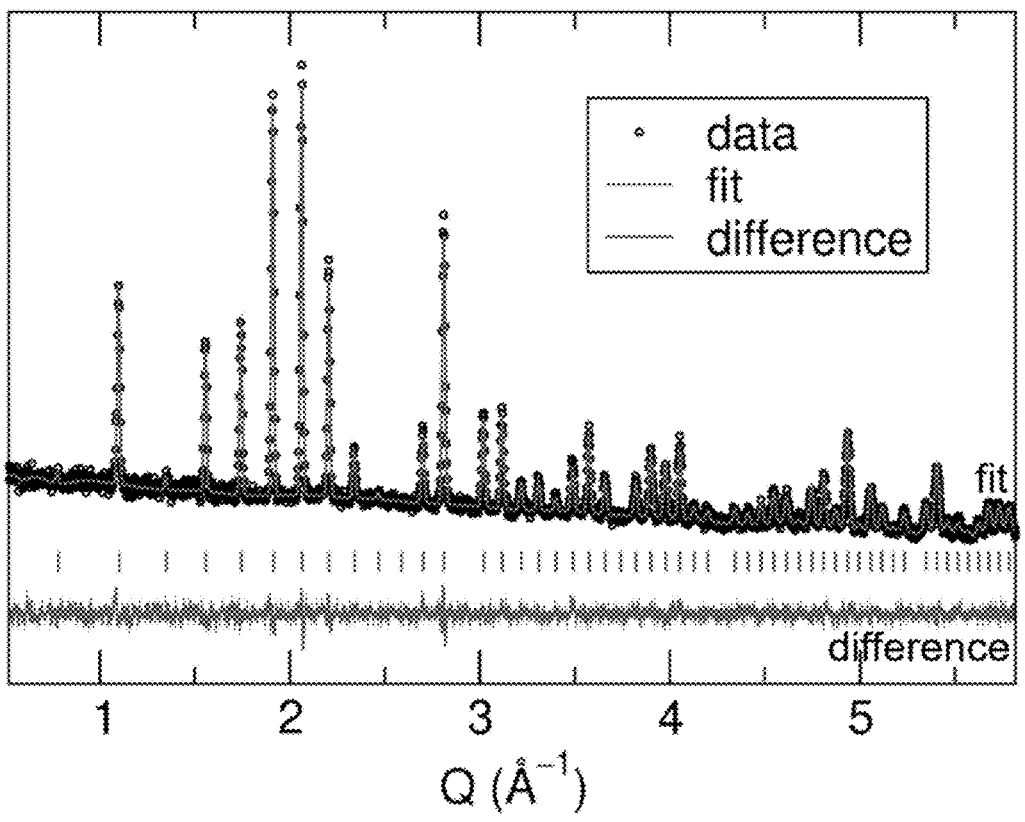

FIG. 24 depicts the NPD results from experiments on ALF. [NCNR, BT1, $\lambda$=2.079 Å]. (a) Top panel: Rietveld refinement fit of ALF at 300 K; a=11.39051(12), $R_{wp}$=2.74%, $R_p$=2.19%. Bottom panel: Rietveld refinement fit of ALF exposed to 1 bar of $CO_2$ at 320 K; $R_{wp}$=3.35%, $R_p$=3.43. The scan time for the activated sample data was twice that of the $CO_2$ exposed data. The change in the lattice parameter of the activated sample versus temperature is shown in FIG. 25. Refinements of other data set are shown in FIG. 26-28; and (b) Top panel: Lattice parameters obtained from Rietveld refinements as a function of $CO_2$ dosing pressure for ALF at 320 K. Bottom panel: $CO_2$ crystallographic occupancies obtained from Rietveld refinements as a function of the $CO_2$ dosing pressure for ALF at 320 K. Error bars in graphs denote 1σ.

FIG. 25 depicts the cubic unit cell parameter change of ALF as a function of temperature determined with NPD. Error bars denote 1σ.

FIG. 26 depicts the Rietveld refinement of NPD data for ALF at 14 K [NCNR, BT-1, $\lambda$=2.079 Å], Space group: Im$\bar{3}$(204), a=11.36001(9) Å, V=1466.01(4) Å$^3$. Goodness-of-fit parameters: $R_{wp}$=2.71%; $R_p$=2.14%. Values in parentheses indicate 1σ.

FIG. 27 depicts the Rietveld refinement of NPD data of ALF at 420 mmHg $CO_2$ at 320 K [NCNR, BT-1, $\lambda$=2.079 Å], Space group: Im$\bar{3}$(204), a=11.3900(1) Å, V=1477.67(5) Å$^3$. Goodness-of-fit parameters: $R_{wp}$=2.92%; $R_p$=2.33%. Values in parentheses indicate 1σ.

FIG. 28 depicts the Rietveld refinement of NPD data of ALF at 1150 mmHg $CO_2$ at 320 K [NCNR, BT-1, $\lambda$=2.079 Å], Space group: Im$\bar{3}$(204), a=11.38798(13) Å, V=1476.86 (5) Å$^3$. Goodness-of-fit parameters: $R_{wp}$=3.46%; $R_p$=2.79%. Values in parentheses indicate 1σ.

Figure 29:
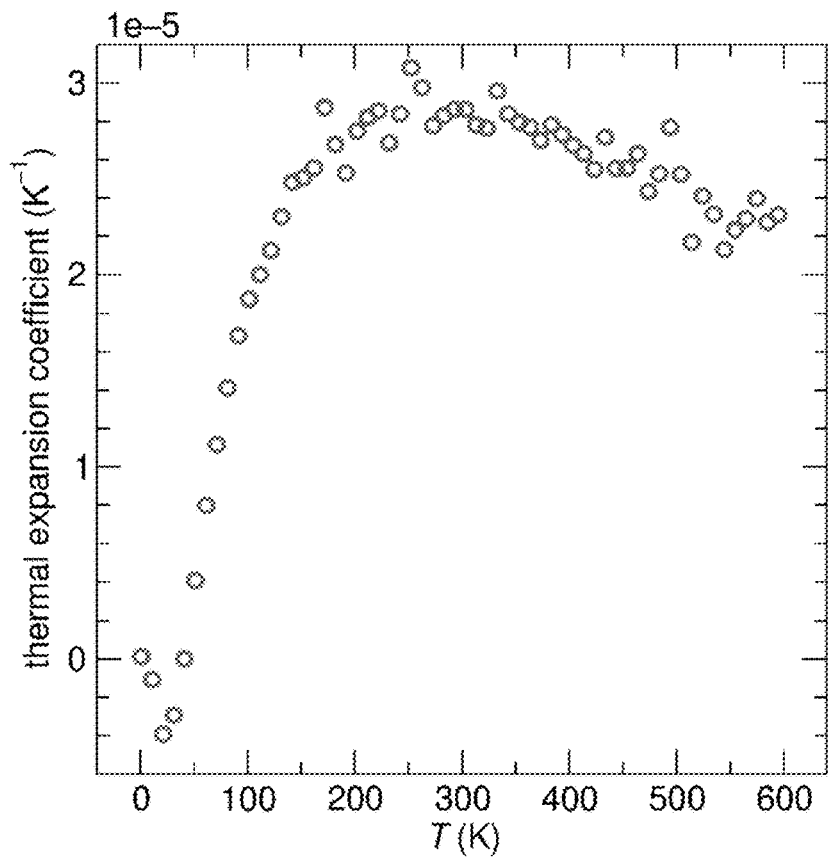

FIG. 29 depicts the density functional theory (DFT) calculated thermal expansion coefficient (in K$^{-1}$) as a function of temperature (in K). The y axis is on the order of 1E$^{-5}$.

Figure 30:
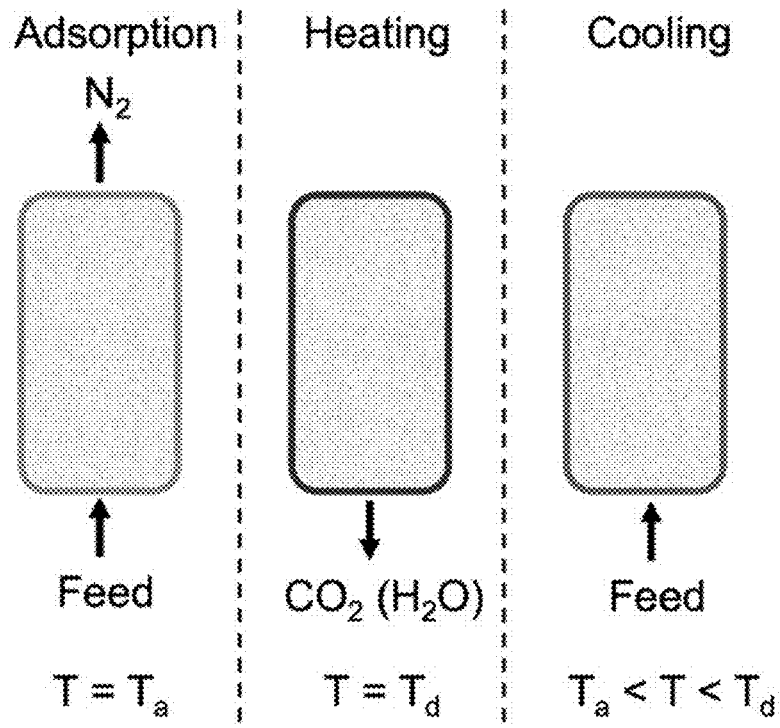

FIG. 30 depicts a scheme of the three-step TSA cycle used in the shortcut model.

Figure 31:
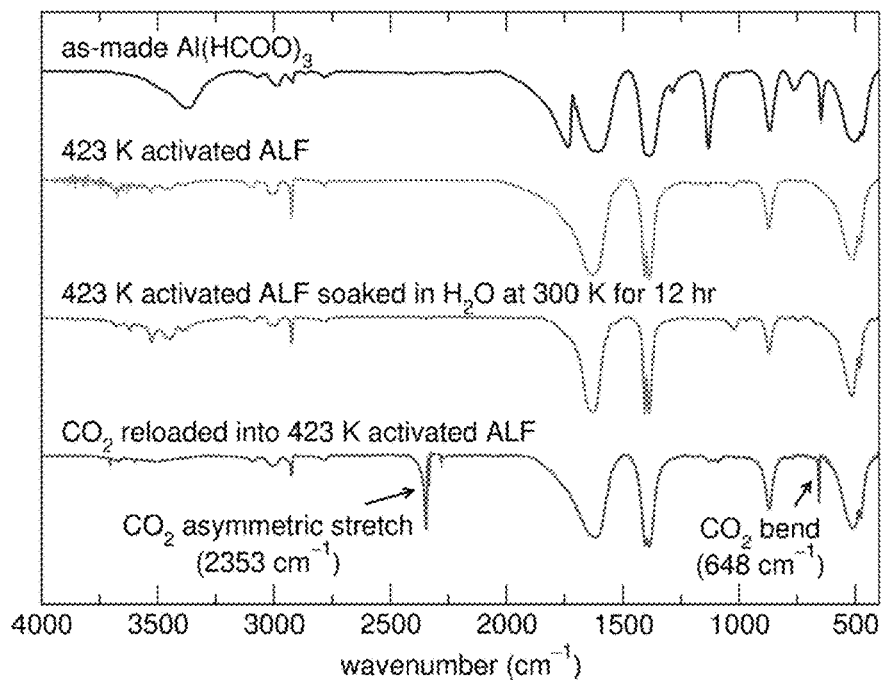

FIG. 31 depicts the Fourier transform infrared (FT-IR) spectra of as-made $Al(HCOO)_3$, 423 K ALF, $H_2O$ soaked ALF, and $CO_2$ reloaded ALF.

Figure 32:
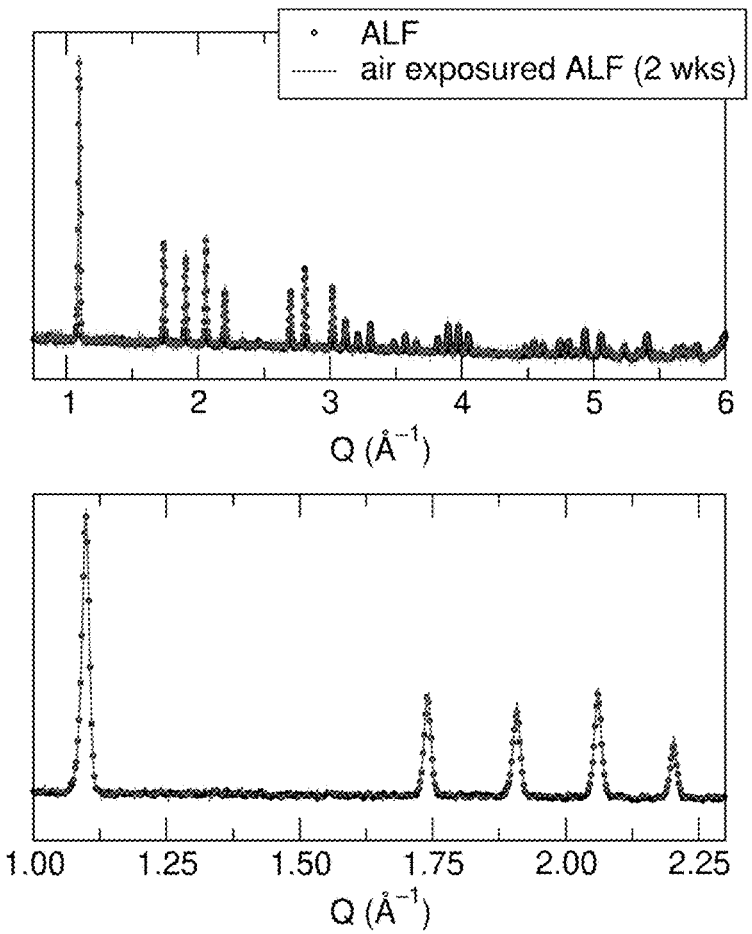

FIG. 32 depicts the comparison between ALF and 2-week-air exposed ALF diffraction patterns at 300 K [NCNR, BT-1, $\lambda$=2.079 Å]. Top panel: total patterns. Bottom panel: a zoomed-in view of the same patterns at the most affected Bragg reflections upon adsorption. The air exposed pattern was scaled to be of comparable intensity as it was measured for slightly less time relative to the ALF pattern. This lack of change between the samples indicates that there is no water adsorption or formation of an amorphous phase of $Al(HCOO)_3$, as the background of the NPD pattern would be highly sensitive to this change.

Figure 33:
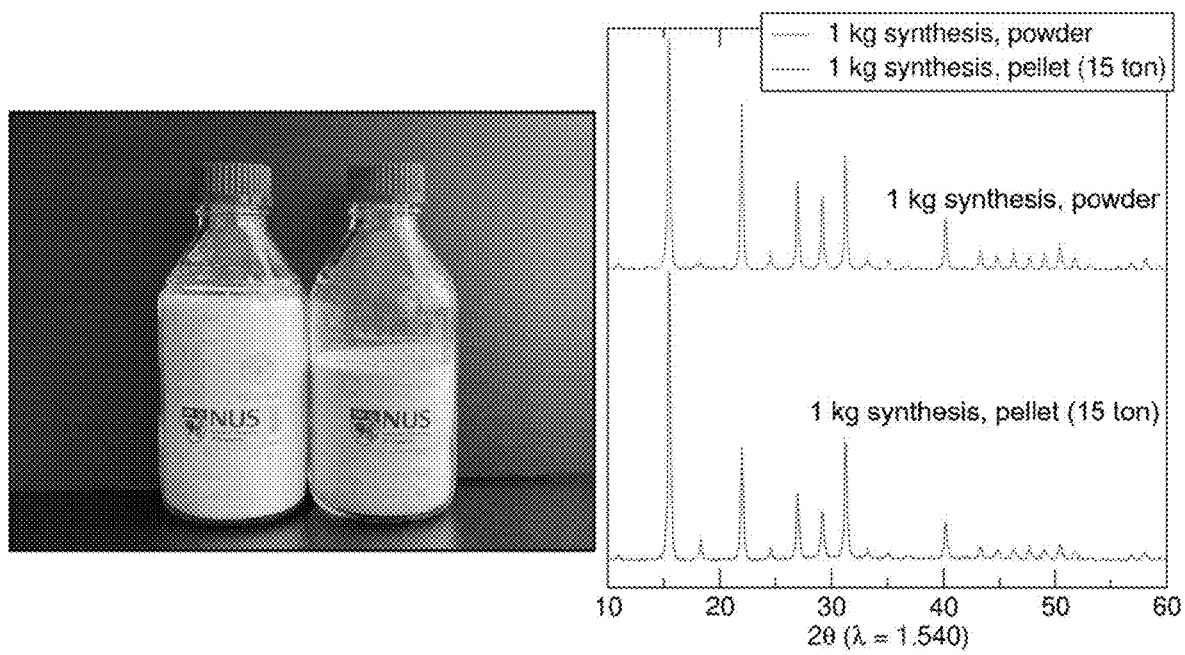

FIG. 33 depicts the summary of 1 kg sample of ALF, including a picture of the amount prepared, powder X-ray diffraction of 1 kg sample and 1 kg sample pelletized at 15 tons. There is a small $Al(OH)_3$ impurity in the powder (peak at ~17° 2θ) arising from the difficulty stirring such large quantities at the laboratory scale.

Figure 34:
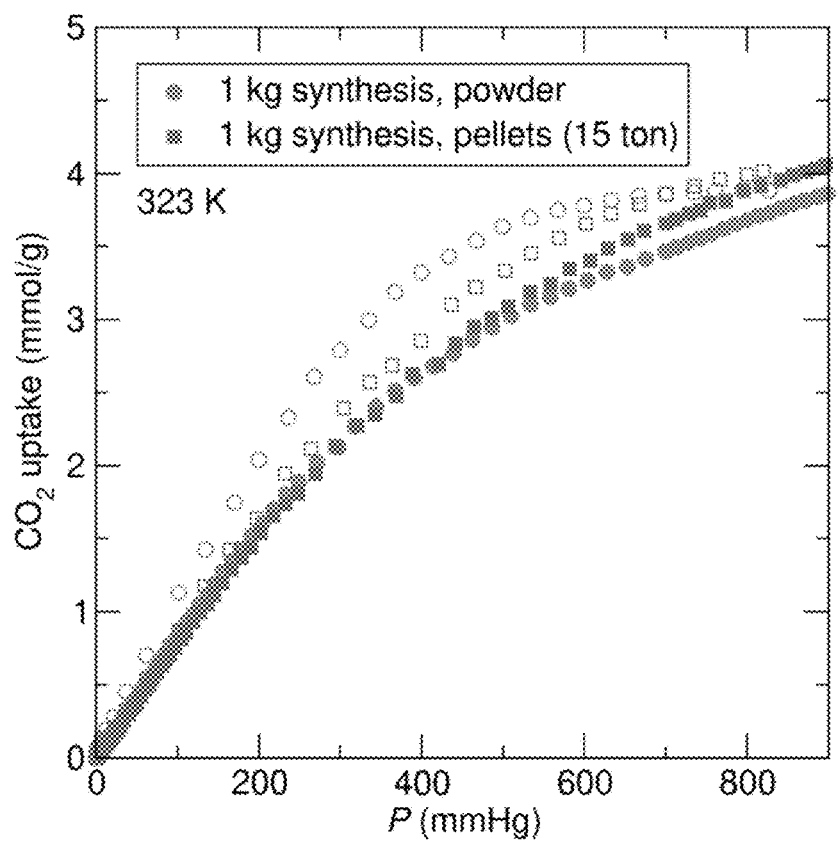

FIG. 34 depicts the isotherm measurements of 1 kg synthesis samples, including one pelletized at 15 tons. The pelletized sample has a decreased hysteresis between adsorption and desorption isotherms.

Figure 35:
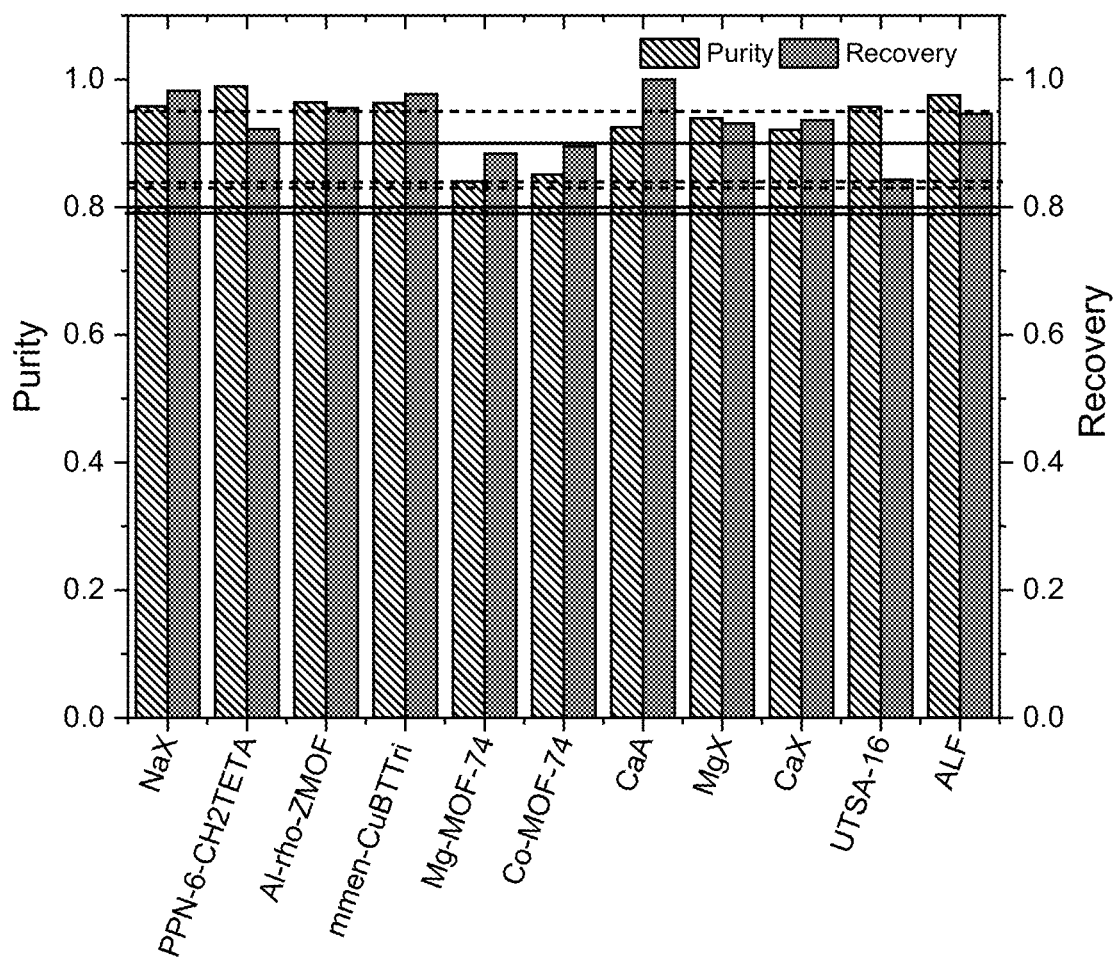

FIG. 35 depicts the purity and recovery of sorbents that pass the purity (83%, double dashed line) and recovery (80%, double solid line) performance threshold of the 3-step temperature-swing adsorption (TSA) process. Higher purity (95%) and recovery (90%) requirement are highlighted by single dashed and single solid lines, respectively.

Figure 36:
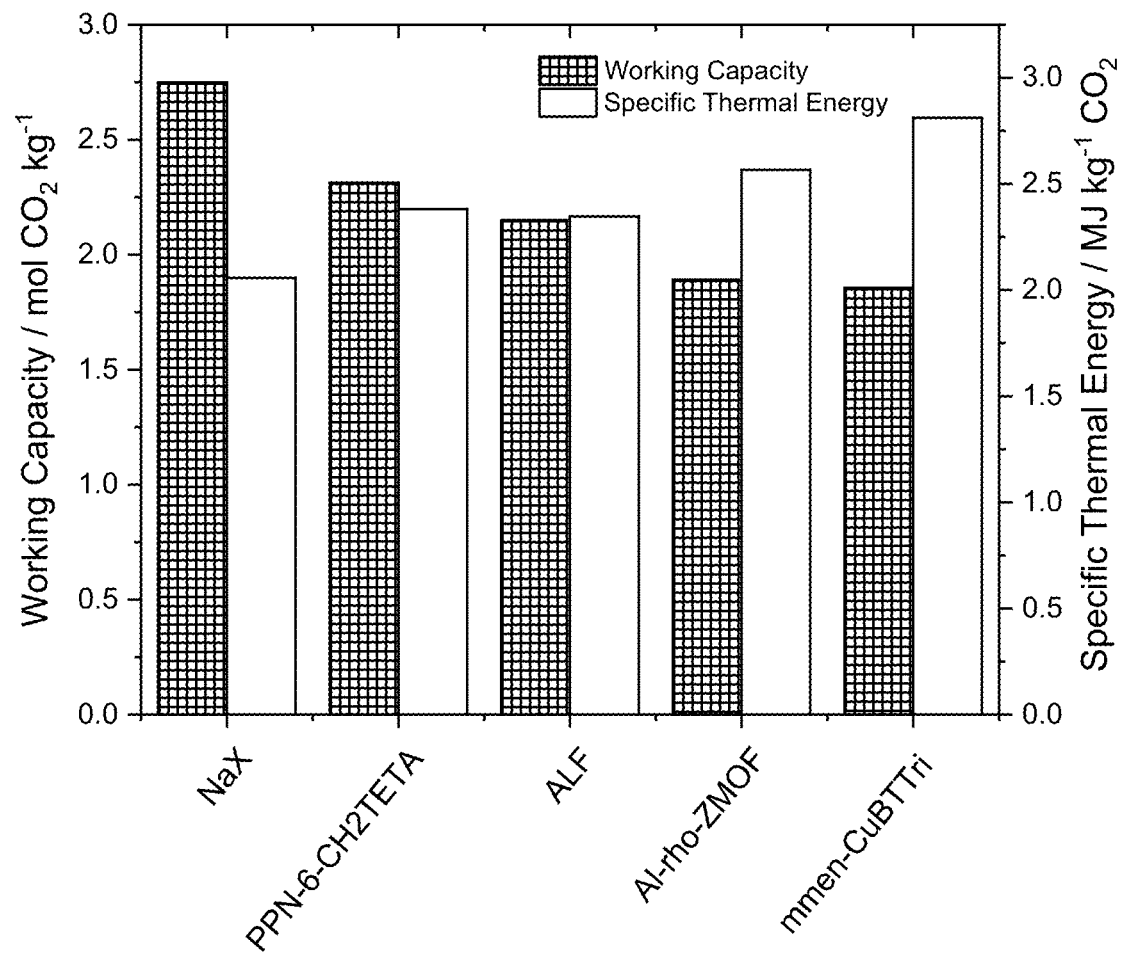

FIG. 36 depicts the working capacity and specific thermal energy of sorbents that pass the 95% purity and 90% recovery performance threshold of the 3-step TSA process.

FIG. 37 depicts the contour maps showing the effect of adsorption temperature ($T_a$) and desorption temperature ($T_d$) on the performance of ALF: (a) purity, (b) recovery, (c) specific thermal energy demand, and (d) working capacity.

Figure 38:
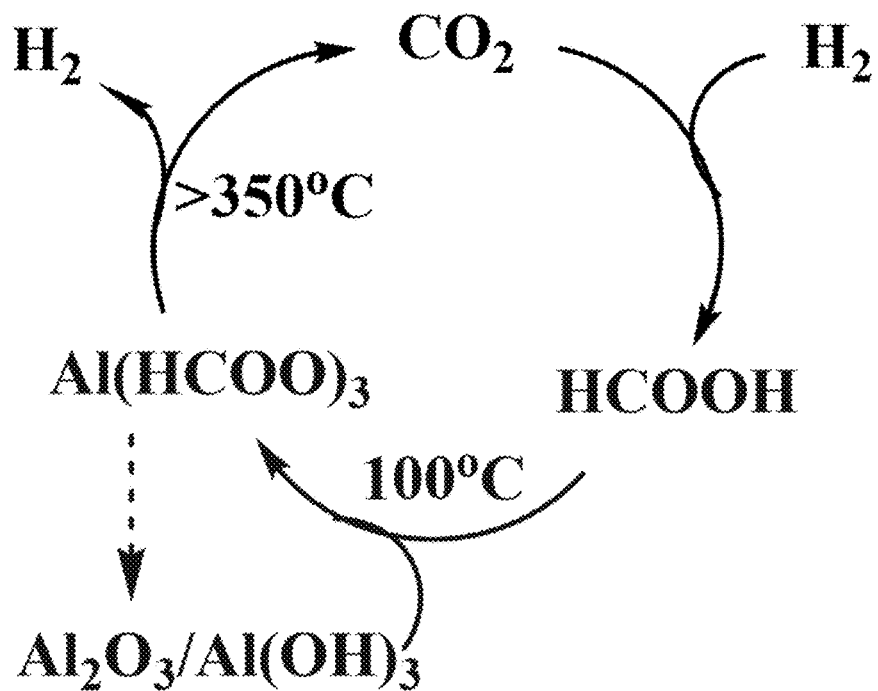

FIG. 38 depicts the schematic representation of the carbon cycle via ALF synthesis.

Figure 39A:
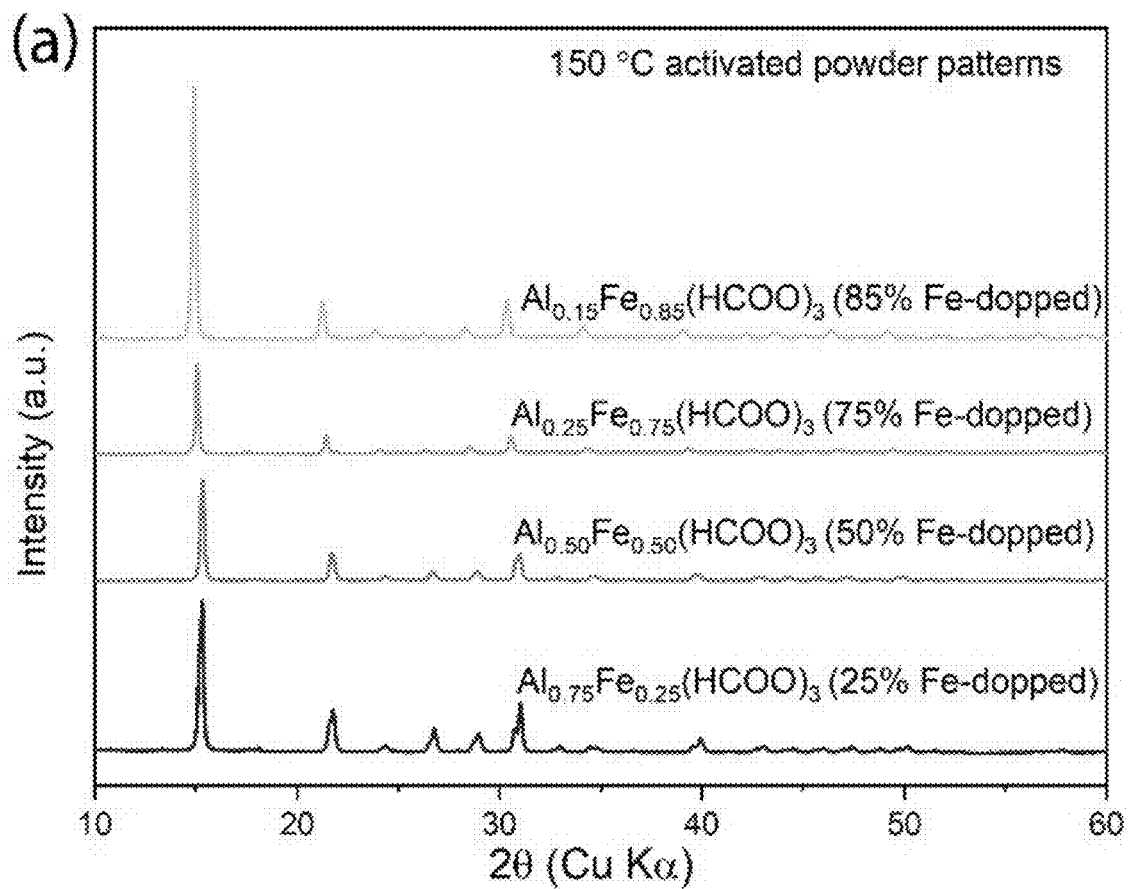
Figure 39B:
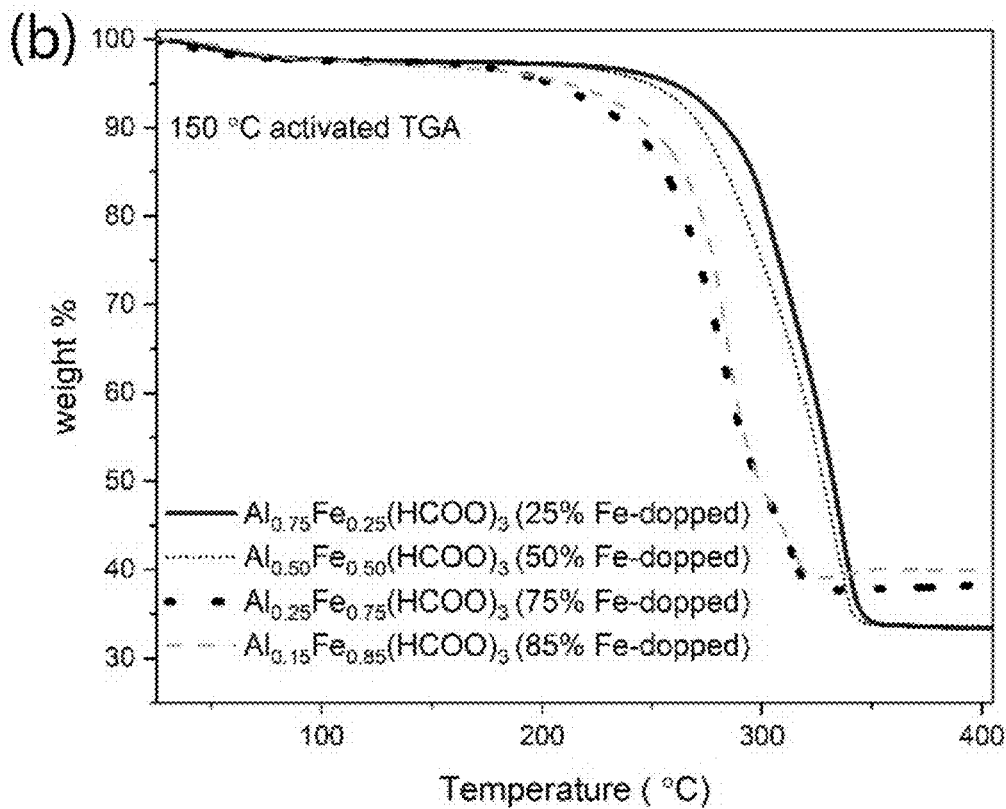

FIG. 39 depicts (a) PXRD patterns of Fe-doped activated MOFs ($Al_{1-x}Fe_x(COOH)_3$); and (b) TGA of Fe-doped activated MOFs ($Al_{1-x}Fe_x(COOH)_3$).

Figure 40A:
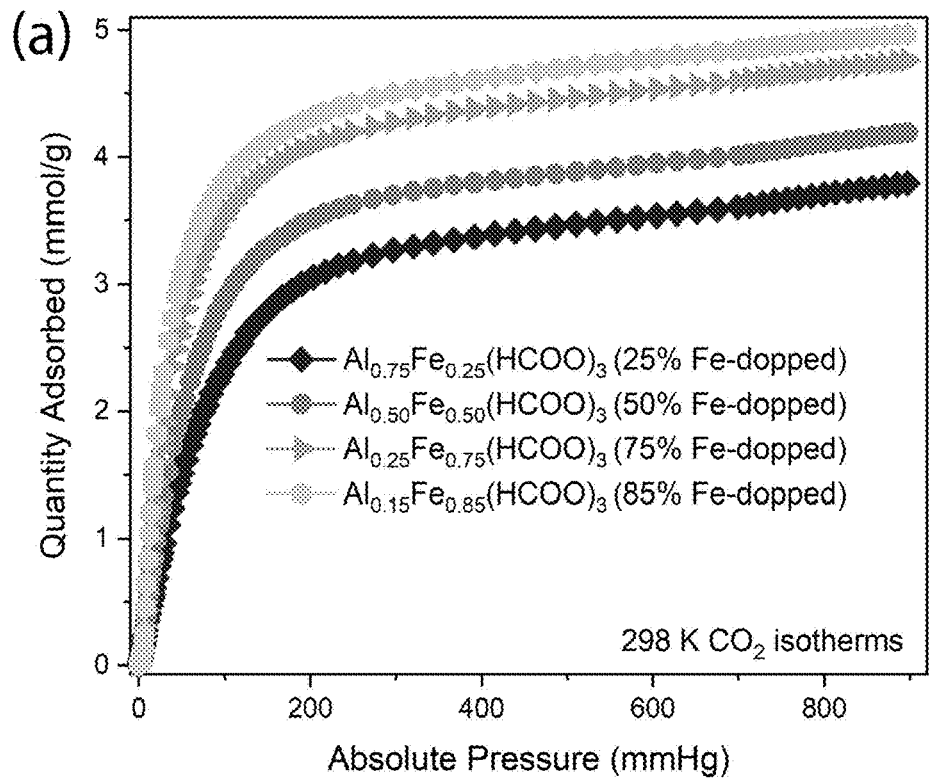
Figure 40B:
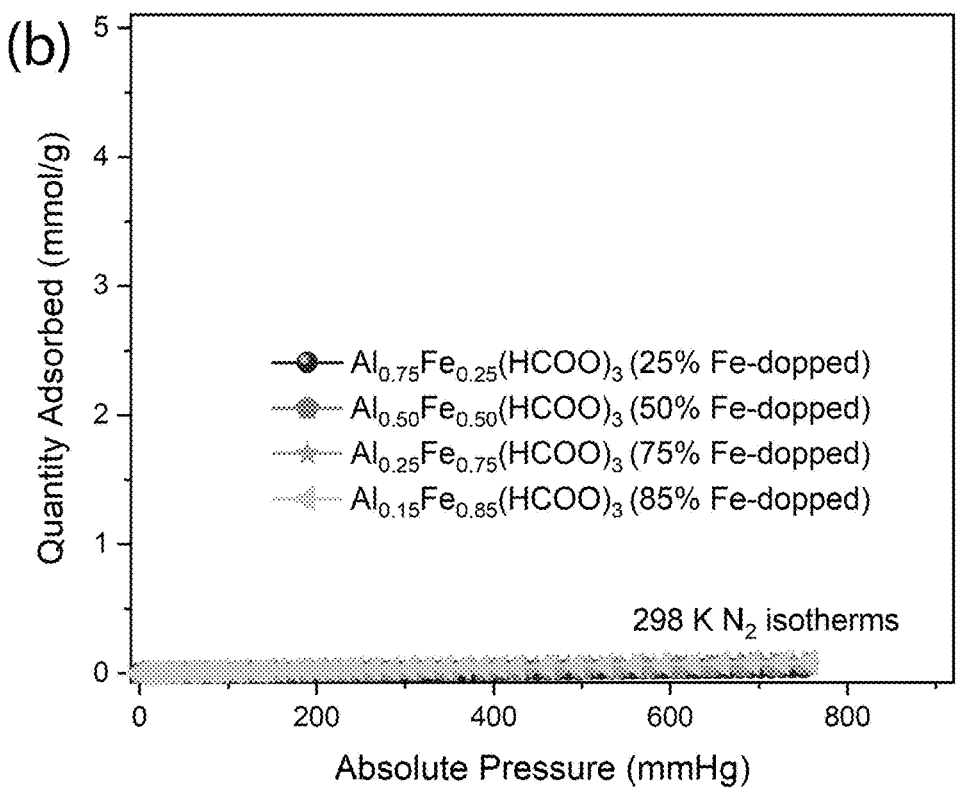

FIG. 40 depicts (a) $CO_2$ adsorption isotherms of Fe-doped activated MOFs ($Al_{1-x}Fe_x(COOH)_3$) measured at 298 K; and (b) $N_2$ adsorption isotherms of Fe-doped activated MOFs ($Al_{1-x}Fe_x(COOH)_3$) measured at 298 K.

Figure 41A:
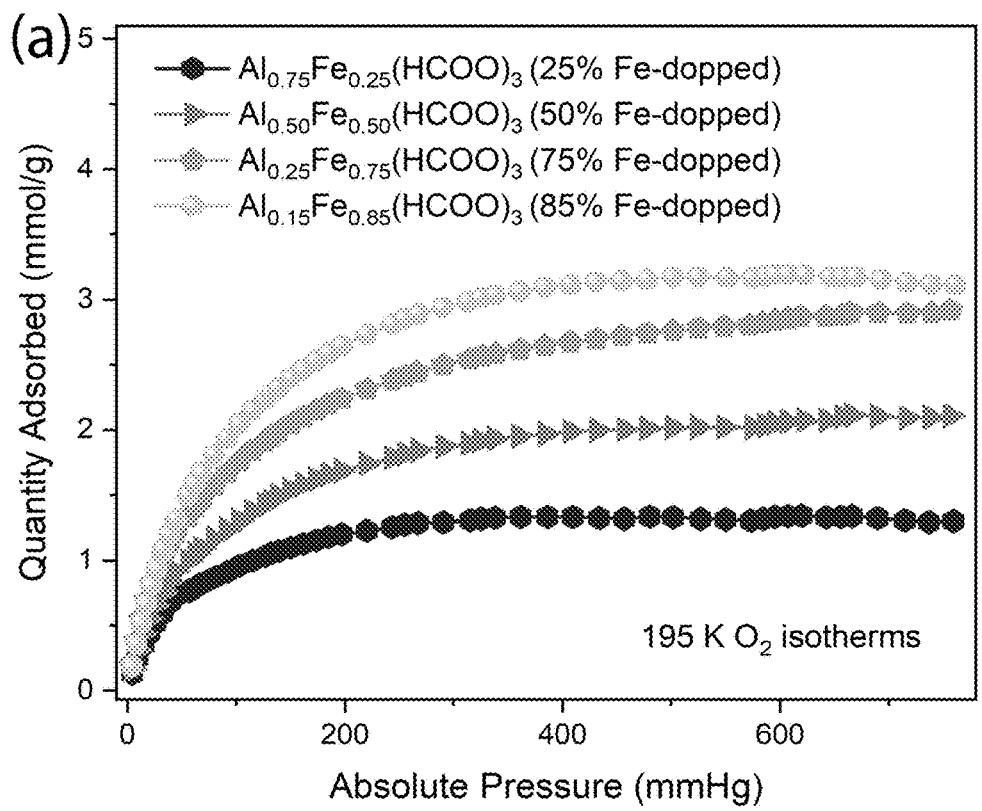
Figure 41B:
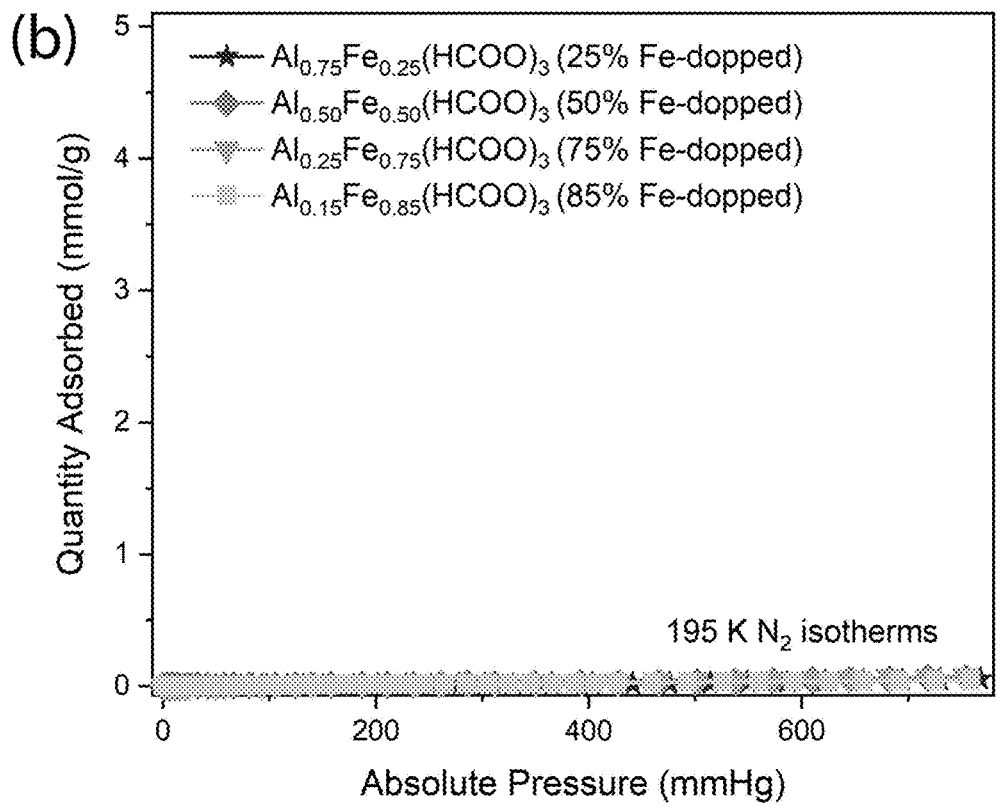

FIG. 41 depicts (a) $O_2$ adsorption isotherms of Fe-doped activated MOFs ($Al_{1-x}Fe_x(COOH)_3$) measured at 195 K; and (b) $N_2$ adsorption isotherms of Fe-doped activated MOFs ($Al_{1-x}Fe_x(COOH)_3$) measured at 195 K.

Figure 42:
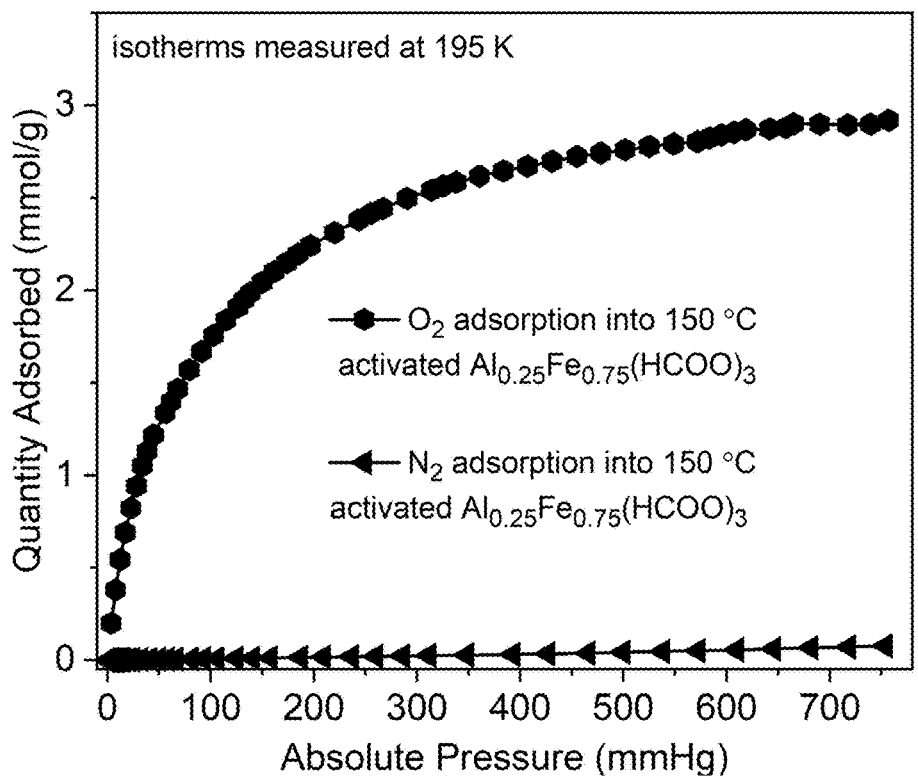

FIG. 42 depicts the comparison of the adsorption of $O_2$ and $N_2$ into activated $Al_{1-x}Fe_x(COOH)_3$ at 195 K. The capacity is greater in the Fe-doped material than in the pure, activated $Al(COOH)_3$.

Figure 43:
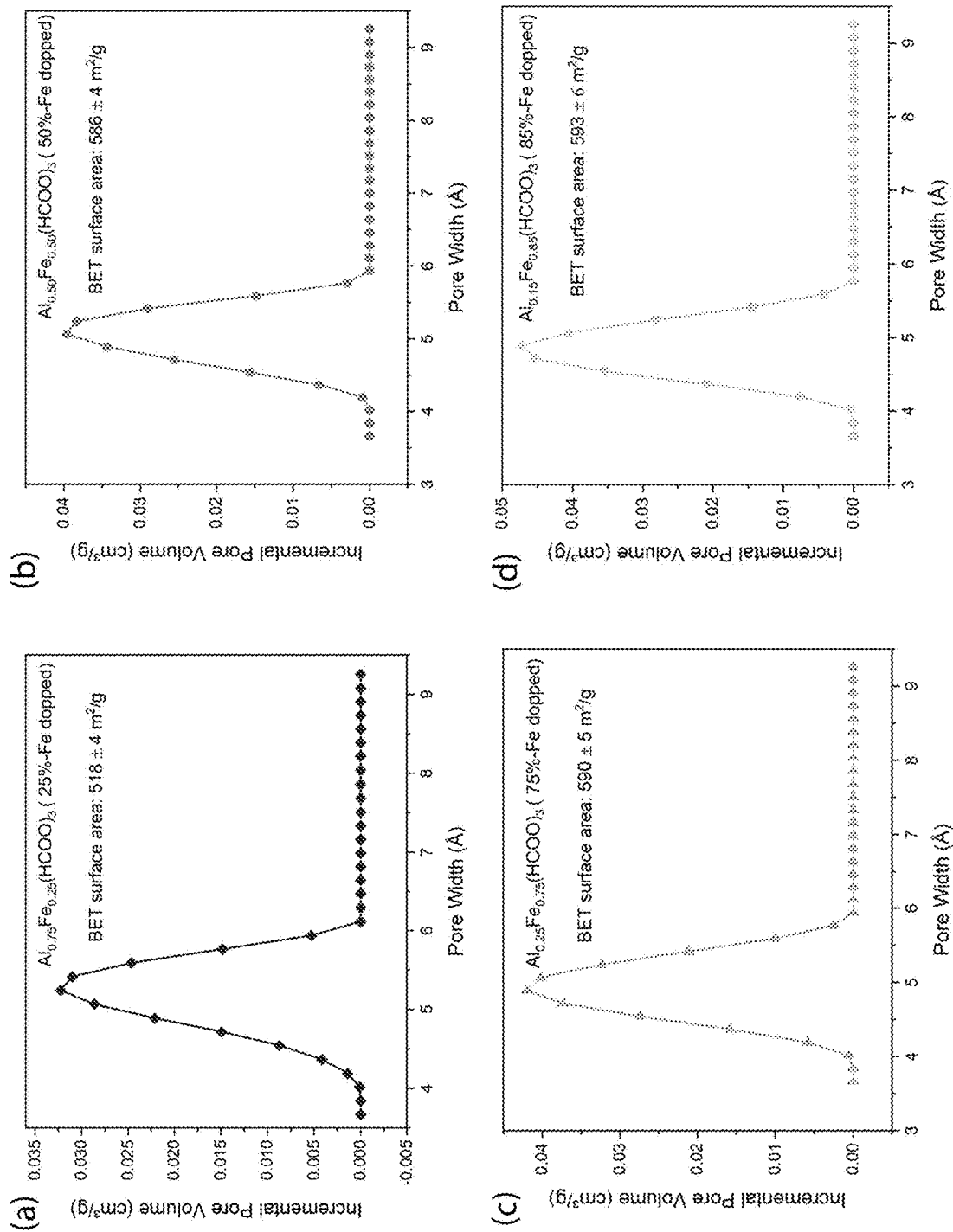

FIG. 43 depicts pore size distribution curves of Fe-doped activated MOFs ($Al_{1-x}Fe_x(COOH)_3$) obtained by fitting the DFT model to the 298 K $CO_2$ adsorption isotherms: (a) x=0.25; (b) x=0.5; (c) x=0.75; and (d) x=0.85.

Figure 44:
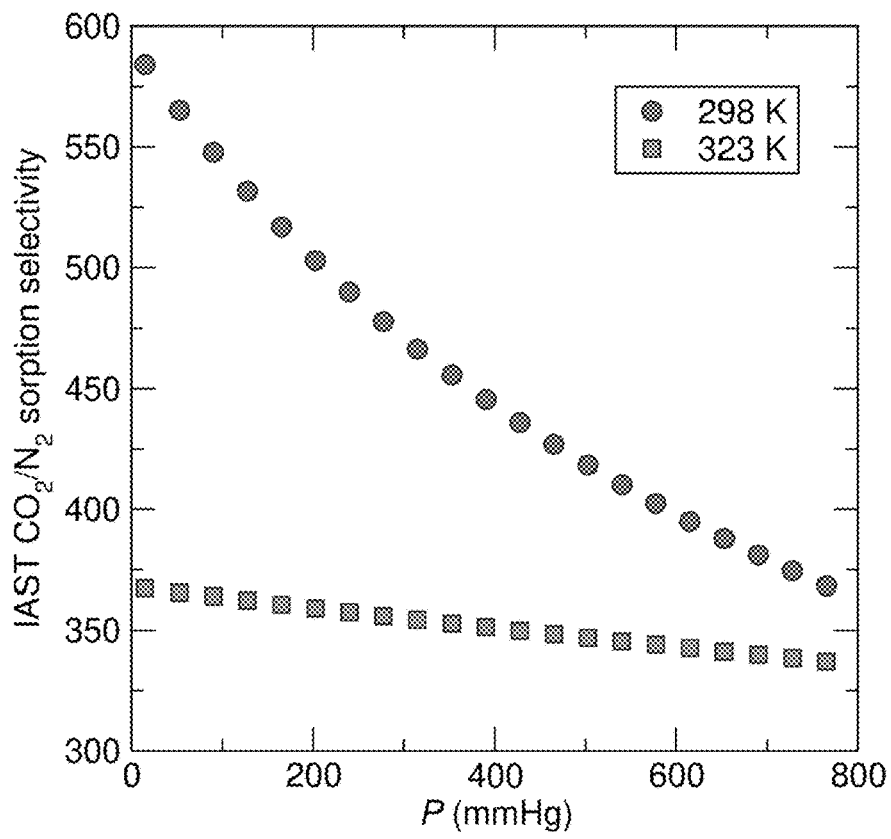

FIG. 44 depicts the IAST $CO_2/N_2$ sorption selectivity for a 15/85 $CO_2/N_2$ mixture at 298 K (circle) and 323 K (square).

Figure 45:
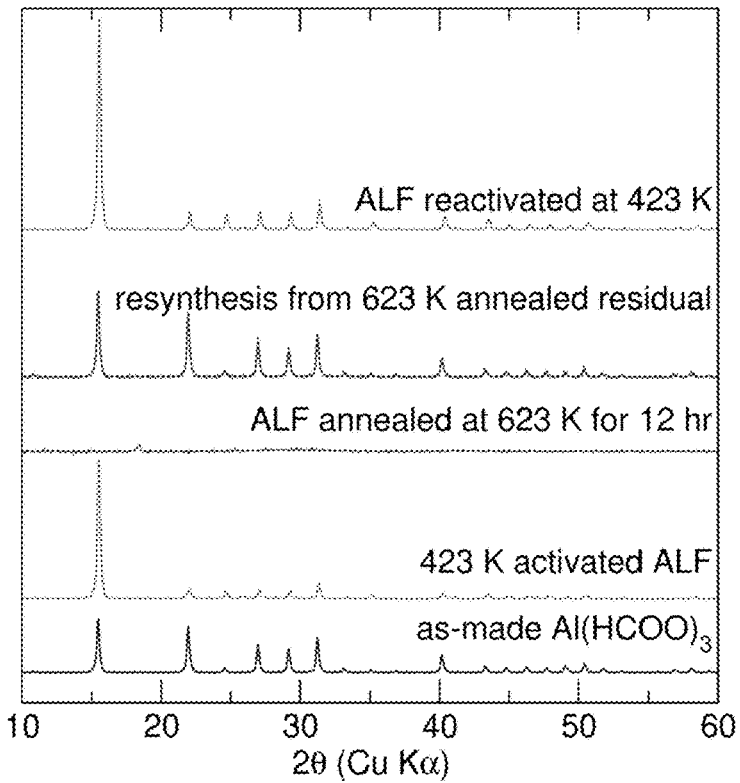

FIG. 45 depicts the PXRD plots showing resynthesis of ALF from 623 K annealed residual material in formic acid. The full cycle is show in FIG. 38.

Figure 46:
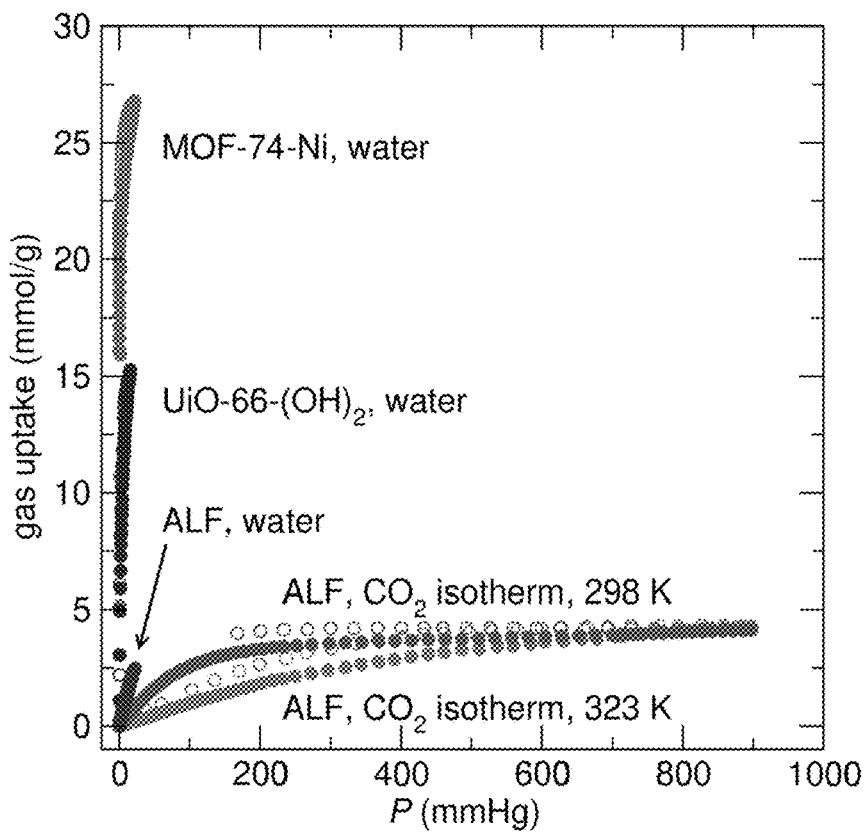

FIG. 46 depicts the water isotherms at 298 K of the MOFs and $CO_2$ sorption isotherm of ALF at 298 K and 323 K. This figure directly indicates that under the separation conditions (e.g, adsorption at near 100% RH and 15 kPa (112 mmHg)), the single component uptakes of $CO_2$ and $H_2O$ are very similar. Furthermore, the DFT-modelled adsorption enthalpies are also similar (Table 9). It is important to note that these two observations do not contradict a substantial $CO_2$ loading in a multinary separation system. To quantitatively illustrate this point, we modelled the competitive uptake of $CO_2$ and $H_2O$ at 298 K and 91% RH for aluminum formate using IAST as a representative co-adsorption model (see FIG. 22).

Figure 47A:
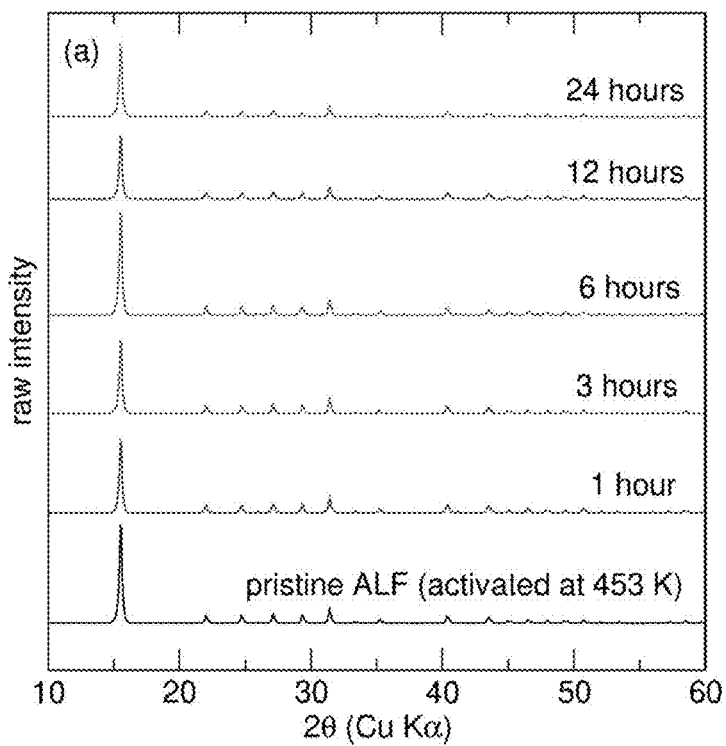
Figure 47F:
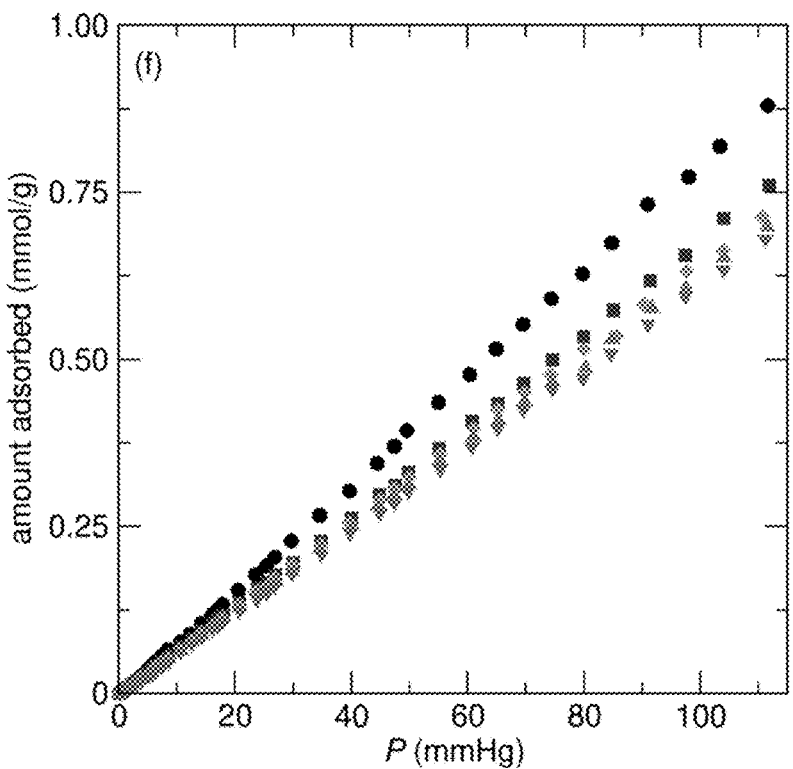

FIG. 47 depicts the hydrolytic stability studies of ALF. (a) PXRD of ALF after exposure to 85 percent humidity at 85° C. (358 K) between 1 h and 24 h; (b) TGA runs of ALF samples after exposure to 85 percent humidity at 85° C. (358 K) between 1 hour and 24 hours; (c) $CO_2$ adsorption isotherms of ALF samples after exposure to 85 percent humidity at 85° C. (358 K) between 1 hour and 24 hours. The box in the lower left-hand corner is the graphed range for (d); (d) zoomed-in area of the $CO_2$ adsorption isotherms from (c). Graph legend same as (c); (e) $CO_2$ adsorption isotherms for four separate samples of ALF exposed to 85 percent humidity at 85° C. (358 K) for 24 hours. The box in the lower left-hand corner is the graphed range for (f); and (f) zoomed-in area of the $CO_2$ isotherms from (e). Graph legend same as (e).

Figure 48:
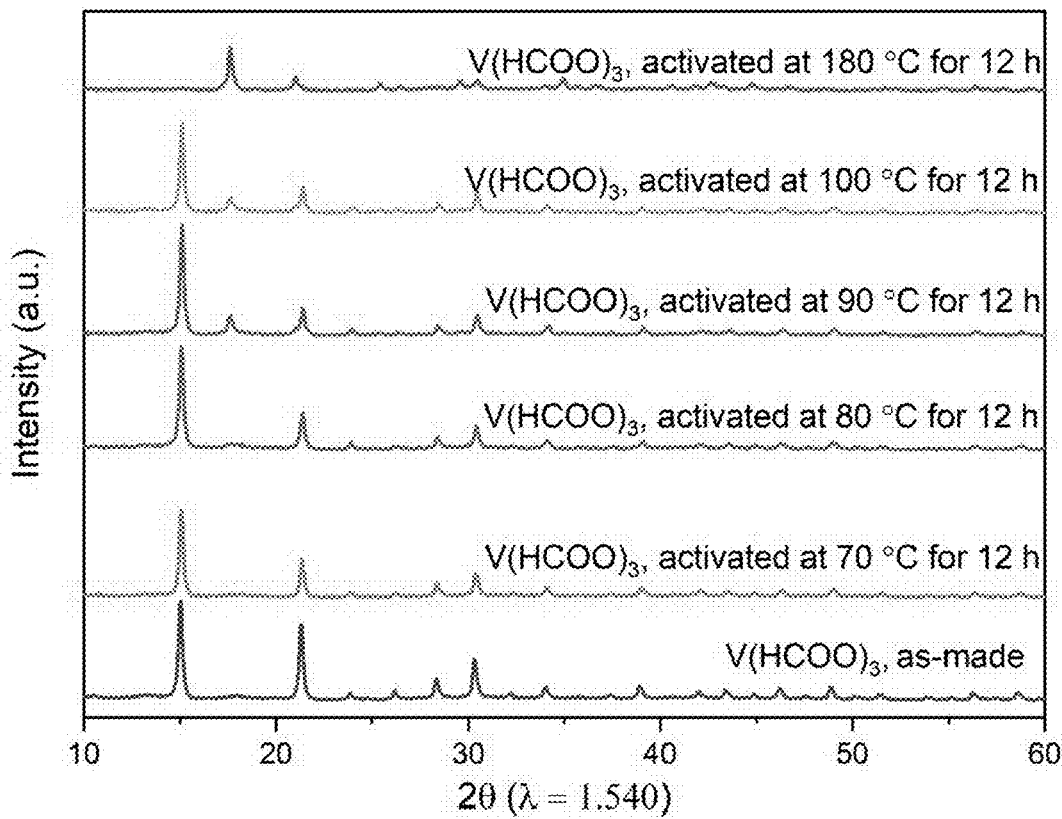

FIG. 48 depicts PXRD patterns of as-made $V(HCOO)_3$ and activated $V(HCOO)_3$.

Figure 49:
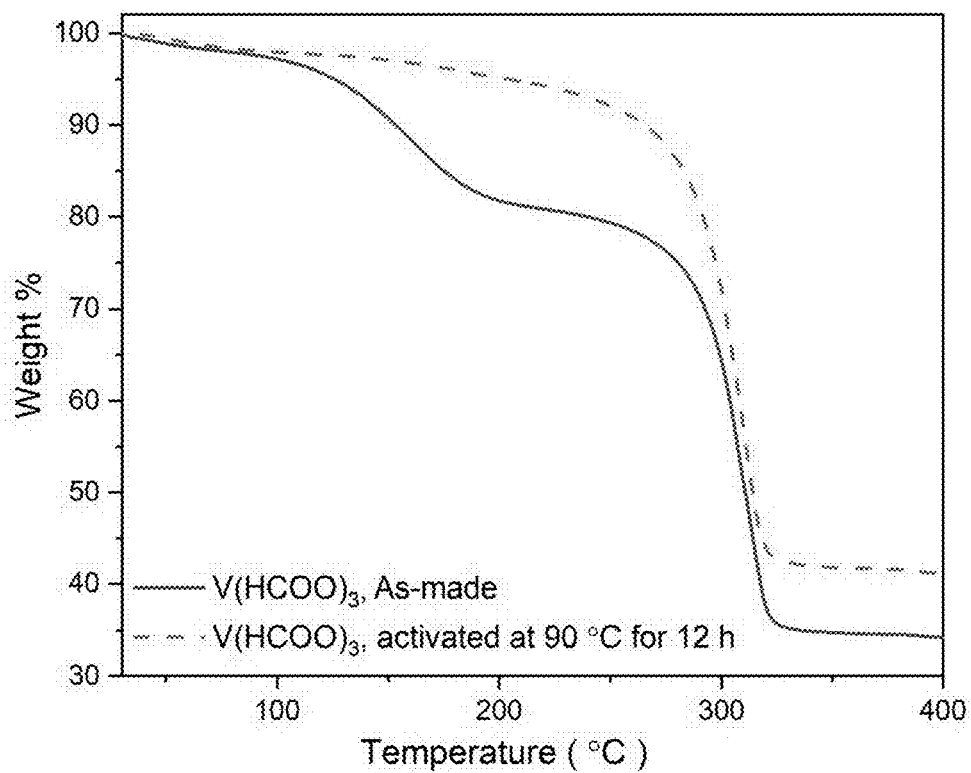

FIG. 49 depicts TGA of as-made $V(HCOO)_3$ and activated $V(HCOO)_3$ performed under a $N_2$ atmosphere.

Figure 50:
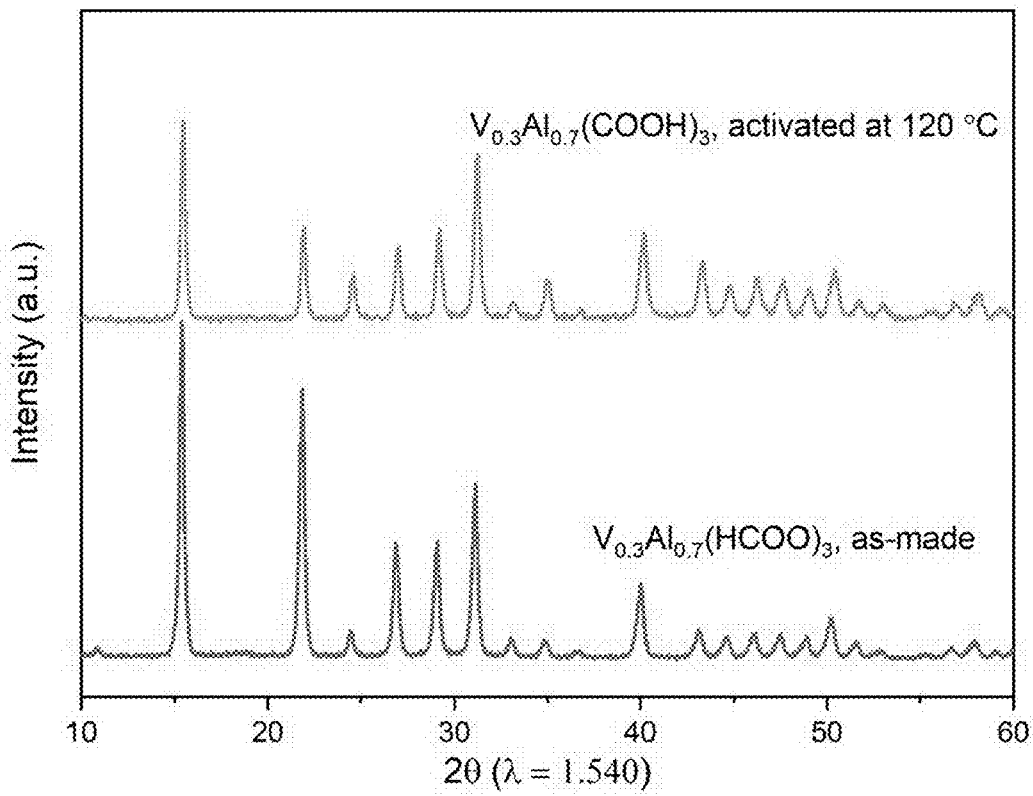

FIG. 50 depicts PXRD patterns of as-made $V_{0.3}Al_{0.7}(HCOO)_3$ and activated $V_{0.3}Al_{0.7}(HCOO)_3$.

Figure 51:
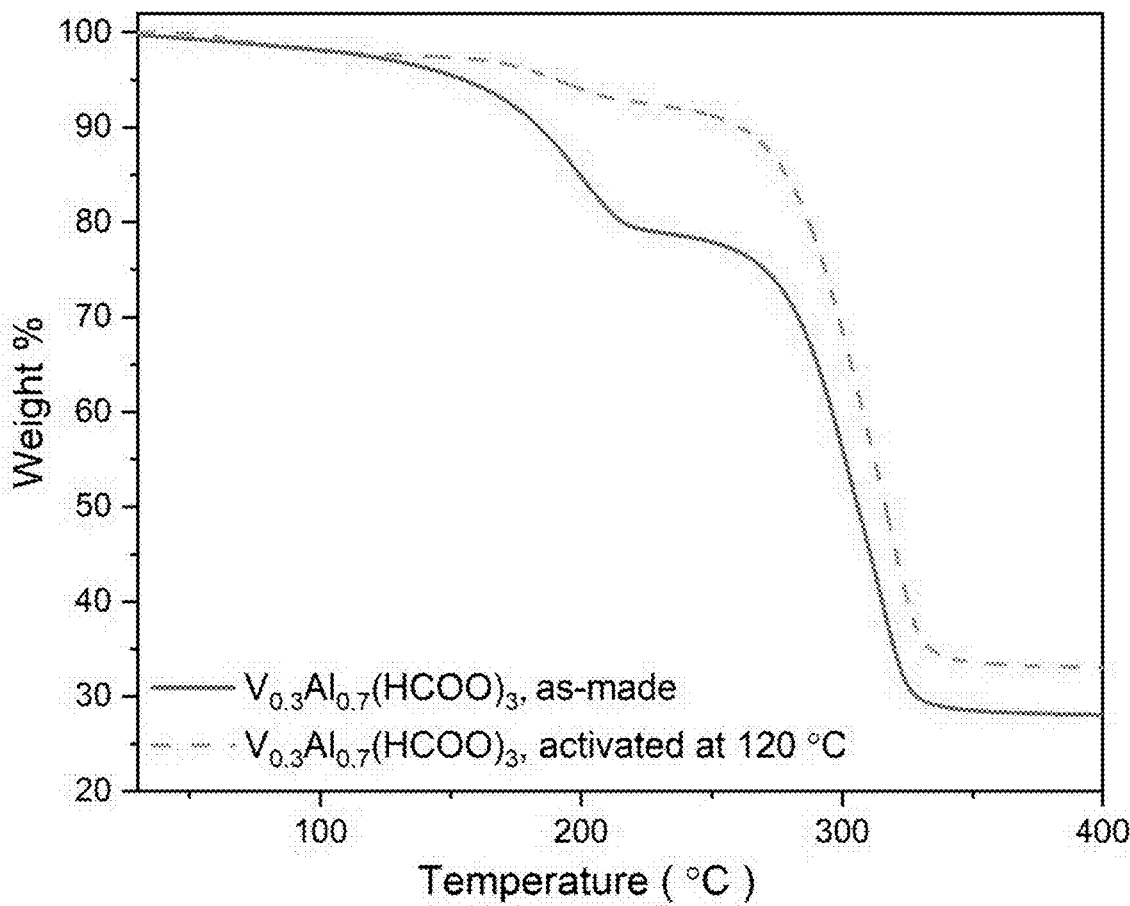

FIG. 51 depicts TGA of as-made $V_{0.3}Al_{0.7}(HCOO)_3$ and activated $V_{0.3}Al_{0.7}(HCOO)_3$ performed under a $N_2$ atmosphere.

Figure 52:
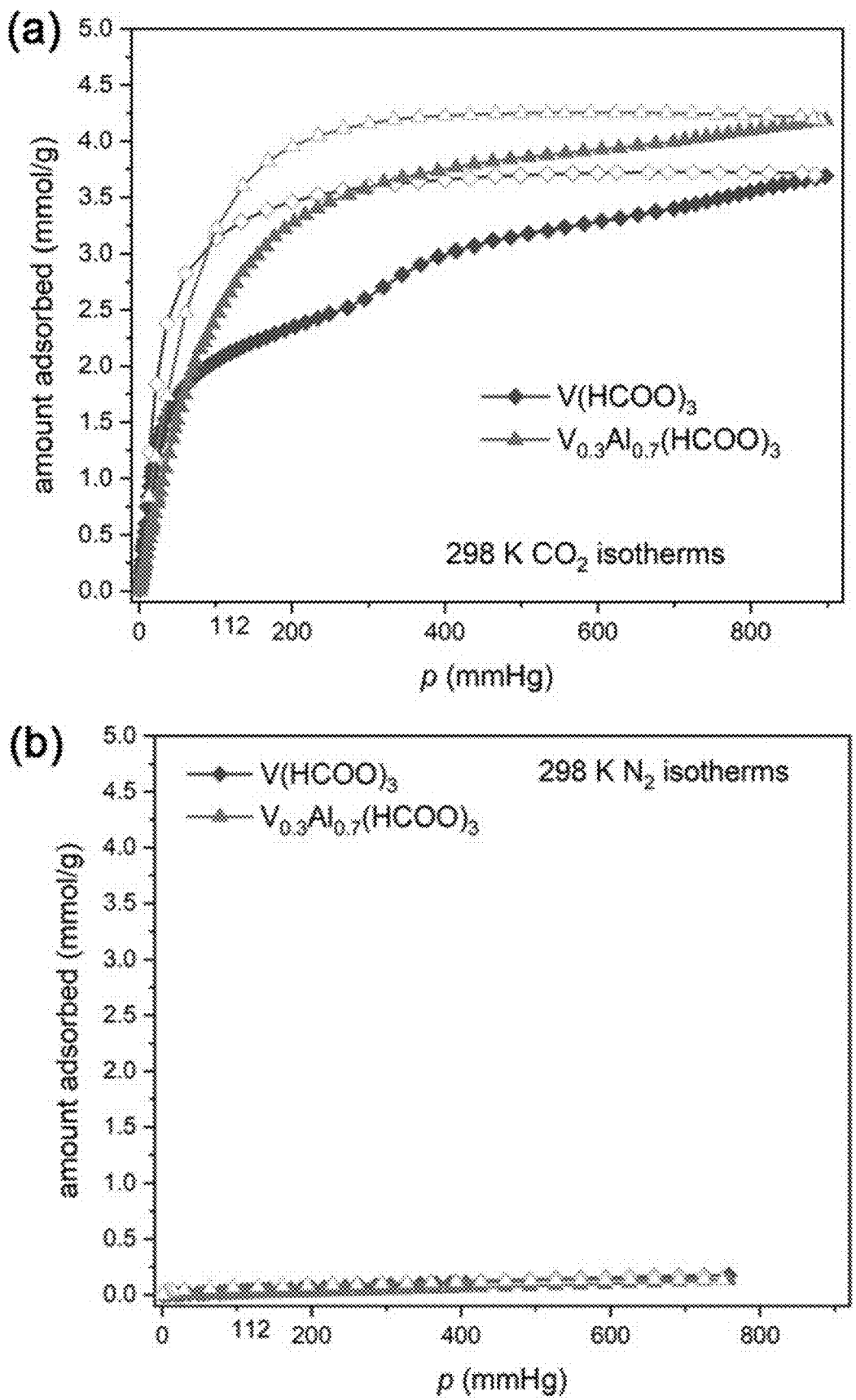

FIG. 52 depicts (a) $CO_2$ adsorption isotherms of $V(HCOO)_3$ and V-doped activated Al(HCOO) ($V_{0.3}Al_{0.7}(COOH)_3$) measured at 298 K; and (b) $N_2$ adsorption isotherms of $V(HCOO)_3$ and V-doped activated Al(HCOO) ($V_{0.3}Al_{0.7}(COOH)_3$) measured at 298 K.

Figure 53:
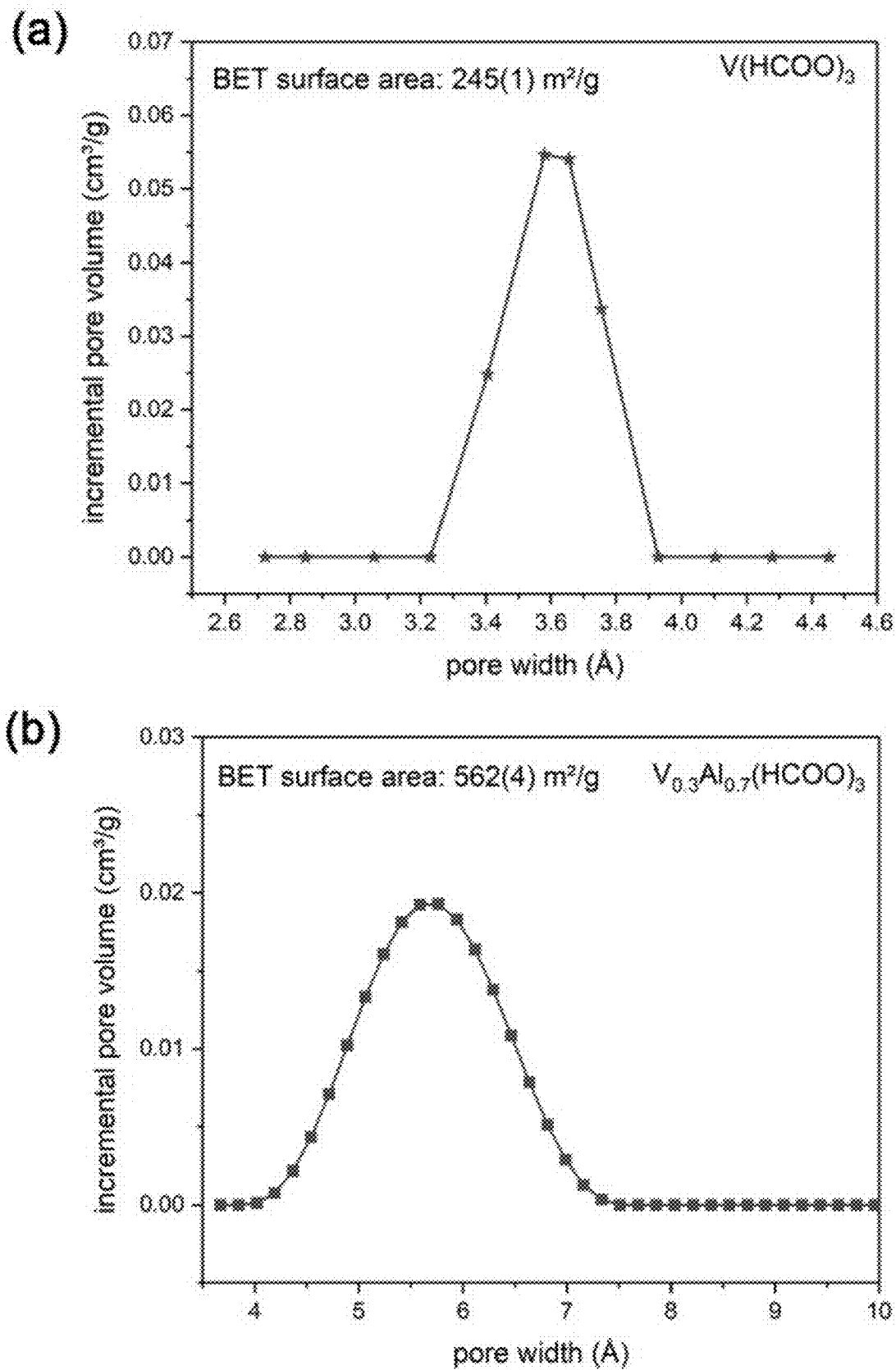

FIG. 53 depicts (a) pore size distribution curves of $V(HCOO)_3$ and $V_{0.3}Al_{0.7}(COOH)_3$ MOFs obtained by fitting the DFT model to the 298 K $CO_2$ adsorption isotherms.

Figure 54:
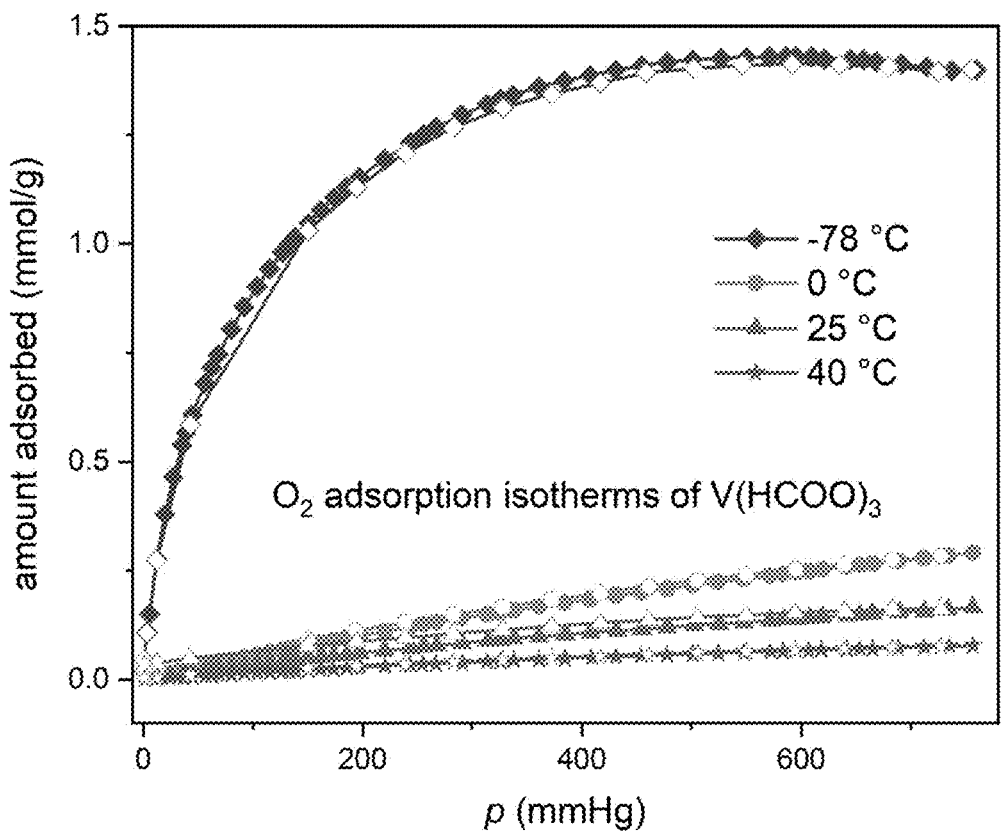

FIG. 54 depicts $O_2$ adsorption isotherms of $V(HCOO)_3$ MOFs measured at various temperatures.

Figure 55:
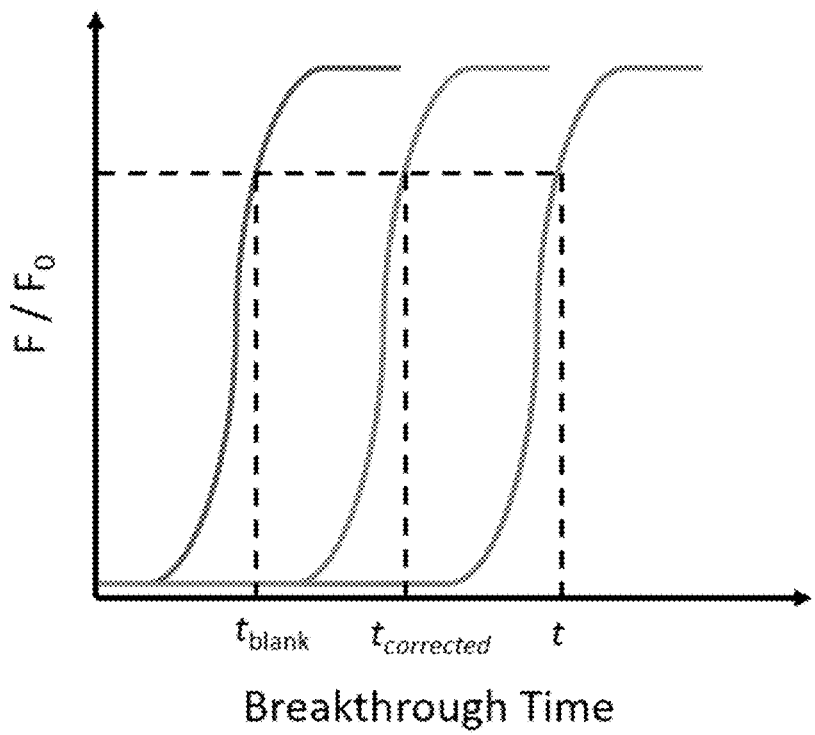

FIG. 55 depicts a scheme showing the point by point correction of a breakthrough curve.

DESCRIPTION

Some or all of the problems have been surprisingly solved through the use of some of the simplest metal-organic frameworks possible. Thus, in a first aspect of the invention, there is provided an activated metal-organic framework of formula I:

where:
X is a metal in the +3 oxidation state;
Y is one or more metals in the +3 oxidation state, provided that each of the metals that represent X are different to each of the one or metals that represent Y;
x is from 0 to 0.9999, wherein
Z is selected from the group consisting of: $NO_2^-$ and, more particularly, $HCOO^-$, $R^1COO^-$, $H_2PO_2^-$,

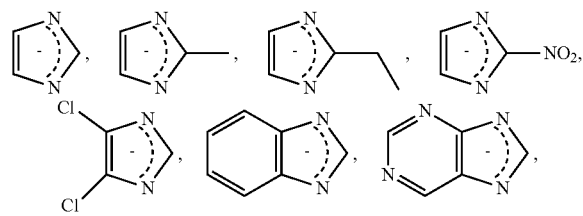

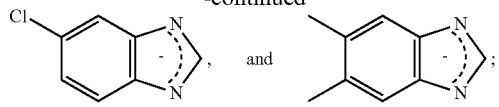

$R^1$ is $C_1$ to $C_6$ alkyl; and
the metal-organic framework has a BET surface area of from 250 to 1,000 $m^2/g$ as obtained from a 298 K $CO_2$ sorption isotherm.

The metal-organic frameworks disclosed herein have been surprisingly found to provide a stable and affordable adsorbent material that can capture $CO_2$ from a flue gas (e.g., a flue-gas having water vapour in the range of from less than or equal to 25% to 90% relative humidity). Similarly, the metal-organic frameworks disclosed herein have been surprisingly found to provide a simple sorbent material for the selective adsorption of $O_2$ from air (e.g., relative to nitrogen).

In embodiments herein, the word "comprising" may be interpreted as requiring the features mentioned, but not limiting the presence of other features. Alternatively, the word "comprising" may also relate to the situation where only the components/features listed are intended to be present (e.g., the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

The phrase, "consists essentially of" and its pseudonyms may be interpreted herein to refer to a material where minor impurities may be present. For example, the material may be greater than or equal to 90% pure, such as greater than 95% pure, such as greater than 97% pure, such as greater than 99% pure, such as greater than 99.9% pure, such as greater than 99.99% pure, such as greater than 99.999% pure, such as 100% pure.

As used herein, the singular forms "a," "an," and "the" include plural referents unless the context clearly dictates otherwise. Thus, for example, reference to "a composition" includes mixtures of two or more such compositions, reference to "an oxygen carrier" includes mixtures of two or more such oxygen carriers, reference to "the catalyst" includes mixtures of two or more such catalysts, and the like.

Unless otherwise stated, the term "alkyl" refers to an unbranched or branched, acyclic and saturated hydrocarbyl radical. The alkyl group is preferably $C_{1-6}$ alkyl (such as ethyl, propyl (e.g., n-propyl or isopropyl), butyl (e.g., branched or unbranched butyl), pentyl or, more preferably, methyl). More particularly when alkyl is $C_{3-6}$ alkyl, it may be a branched alkyl chain.

The activated metal-organic framework of formula I as disclosed herein can be shaped into pellets, spheres, cylinders, or other architectures, and packed into adsorption beds for pressure or temperature swing adsorption. The activated metal-organic framework of formula I as disclosed herein can also be coated onto substrates such as polymers, ceramics, or metals for adsorption purposes. The activated metal-organic framework of formula I as disclosed herein can also be incorporated into polymer matrices for adsorption or membrane processes. The activated metal-organic framework of formula I as disclosed herein can also be synthesized directly on any substrate or surface. The metal-organic framework of formula I can be processed into different 3D shapes or architectures.

The term "activated metal-organic framework" when used herein refers to a metal-organic framework where materials that block the MOF's channels (e.g., from formation and/or sorption) are removed. As noted this may be achieved through the application of heat alone or by the application of vacuum and heat for a suitable period of time. The exact conditions can be readily determined by a person skilled in the art considering the entire disclosure of the application as filed.

The activated nature of the metal-organic framework may be established by measuring the resulting BET surface area of metal-organic framework as-made (or after use in sorption) and following the treatments described above. If the BET surface area has increased, then the metal-organic framework may be considered to have been activated. Additionally or alternatively, the unit-cell parameters of the metal-organic framework may be used for this purpose too.

The BET surface area may be obtained using a $CO_2$ sorption isotherm at 298 K. The BET surface area may range from 250 to 1,000 $m^2/g$, which can be tuned through pore configurations and/or surface modifications. Examples of particular BET surface areas that may be mentioned herein include, but are not limited to 500 to 600 $m^2/g$, such as from 514 to 599 $m^2/g$, such as, from 582 to 599 $m^2/g$. A skilled person will understand how to conduct a $CO_2$ sorption isotherm at 298 K and further details may be found in the examples section below.

At least some of the metal-organic frameworks disclosed herein may have the following unit-cell parameters: a=b=c=from 11.303 to 11.894 Å, $\alpha=\beta=\gamma=90°$, Volume=from 1562 to 1600 $Å^3$, space group: I m–3. As will be appreciated, the crystal system or space group may change depending on ligand and metal combination.

Any suitable metal in the +3 oxidation state may be used herein. Examples of such metals include, but are not limited to Al, Fe, Mn, Y, Sc, Ga, In, Ti, Fe, Mn, V, Cr, Co, Tl, Bi, Ru, Os, Re, Ir, Rh, Ce, La, Pr, Nd, Sm, Eu, Gd, Tb, Dy, Ho, Er, Tm, Yb and Lu.

The value of x may range from 0 to 0.9999. For example, x may be from 0 to 0.99, such as, from 0.25 to 0.85. Particular point values of x that may be mentioned herein include 0.25, 0.50, 0.75 and 0.85. As will be appreciated, this approach essentially results in X being doped by Y (or vice versa, depending on the relative amounts of X and Y). It is believed that such doped metal-organic frameworks may display enhanced adsorption for $CO_2$, $O_2$ etc.

For the avoidance of doubt, it is explicitly contemplated that where several numerical ranges related to the same feature are cited herein, that the end points for each range are intended to be combined in any order to provide further contemplated (and implicitly disclosed) ranges.

Thus, for the values of x mentioned herein, there is disclosed the following ranges for x:
from 0 to 0.25, from 0 to 0.50, from 0 to 0.75, from 0 to 0.85, from 0 to 0.99, from 0 to 0.9999;
from 0.25 to 0.50, from 0.25 to 0.75, from 0.25 to 0.85, from 0.25 to 0.99, from 0.25 to 0.9999;
from 0.50 to 0.75, from 0.50 to 0.85, from 0.50 to 0.99, from 0.50 to 0.9999;
from 0.75 to 0.85, from 0.75 to 0.99, from 0.75 to 0.9999;
from 0.85 to 0.99, from 0.85 to 0.9999; and
from 0.99 to 0.9999.

As noted herein, the lists of metals for X and Y may be the same list of metals. However, it is explicitly contemplated that when X is a metal, Y is not the same metal.

As noted herein, Y may be one or more metals (e.g., two metals). When Y is one or more metals, any suitable proportion of said metals may be used. For example, when there are two metals, Y may be represented by $Y'_{1-y}Y''_y$, where the values of y may be the same as the values of x discussed above.

In particular embodiments that may be mentioned herein, Y may be a single metal (that differs from the metal of X).

In particular embodiments of the invention, X may be selected from Al, Fe, Mn, Y, Sc, Ga, In, Ti, Fe, Mn, V, Cr, Co, Tl, Bi, Ru, Os, Re, Ir, Rh, Ce, La, Pr, Nd, Sm, Eu, Gd, Tb, Dy, Ho, Er, Tm, Yb and Lu. In particular embodiments that may be mentioned herein, X may be Al.

In particular embodiments of the invention, Y may be selected from Al, Fe, Mn, Y, Sc, Ga, In, Ti, Fe, Mn, V, Cr, Co, Tl, Bi, Ru, Os, Re, Ir, Rh, Ce, La, Pr, Nd, Sm, Eu, Gd, Tb, Dy, Ho, Er, Tm, Yb and Lu, with the caveat that Y is not the same metal as X. For example, when present, Y may be selected from
(a) one or more of the group consisting of Al, Tl, Fe, Ga, In, Mn, V and Cr;
(b) one or more of the group consisting of Fe, Ga, In, Mn, V and Cr;
(c) from the group consisting of Al, Tl, Fe, Ga, In, Mn, V and Cr; or
(d) from the group consisting of Fe, Ga, In, Mn, V and Cr.

As will be appreciated, (a) and (b) above allow for the presence of 2 or more (e.g., 2, 3 or 4 metals as Y), while (c) and (d) only allow for the presence of one metal as Y.

In particular embodiments that may be mentioned herein, Y, when present, may be Fe.

In certain embodiments, Z may be selected from the group consisting of: $HCOO^-$, $R^1COO^-$, $H_2PO_2^-$, and $NO_2^-$. In particular embodiments, Z may be selected from the group consisting of: $HCOO^-$, $R^1COO^-$, and $H_2PO_2^-$. In particular embodiments of the invention Z may be $HCOO^-$.

The metal-organic framework of formula I disclosed herein may display a $CO_2$ adsorption value of from 3 to 6 (e.g., from about 4 to about 5) mmol/g at 298 K and under 1 atmosphere of $CO_2$. In certain embodiments, this $CO_2$ adsorption value may be obtainable with a gas that has a relative humidity of from less than or equal to 25% to 90%.

In certain embodiments, the metal-organic framework of formula I disclosed herein may display a $CO_2$ adsorption value of from 2 to 3 (e.g., about 2.3) mmol/g and from 90 to 150 (e.g., about 100) selectivity over $N_2$ at 298 K and under 1 atmosphere of total pressure provided by a gas stream of 15% $CO_2$ and 85% $N_2$ vol:vol. In certain embodiments, this $CO_2$ adsorption value and selectivity may be obtainable with a gas that has a relative humidity of from less than or equal to 25% to 90%.

In certain embodiments, the metal-organic framework of formula I disclosed herein may display an $O_2$ adsorption value of from 0.5 to 4 (e.g., from about 1 to about 3) mmol/g at 298 K and under 1 atmosphere of $O_2$. In certain embodiments, this $O_2$ adsorption value may be obtainable with a gas that has a relative humidity of from less than or equal to 25% to 90%.

In embodiments of the invention mentioned herein, the metal-organic framework of formula I may be one or more (e.g., one) selected from:
(a) $Al(HCOO)_3$;
(b) $Al_{0.75}Fe_{0.25}(HCOO)_3$;
(c) $Al_{0.5}Fe_{0.5}(HCOO)_3$;

(d) $Al_{0.25}Fe_{0.75}(HCOO)_3$;
(e) $Al_{0.15}Fe_{0.85}(HCOO)_3$;
(f) $V(HCOO)_3$ and;
(g) $V_{0.3}Al(HCOO)_3$.

In more particular embodiments of the invention mentioned herein, the metal-organic framework of formula I may be one or more (e.g., one) selected from:
(a) $Al(HCOO)_3$;
(b) $Al_{0.75}Fe_{0.25}(HCOO)_3$;
(c) $Al_{0.5}Fe_{0.5}(HCOO)_3$;
(d) $Al_{0.25}Fe_{0.75}(HCOO)_3$; and
(e) $Al_{0.15}Fe_{0.85}(HCOO)_3$.

Aluminium formate, $Al(HCOO)_3$, an earth-abundant, inexpensive and highly porous metal-organic framework (MOF), can be obtained from a non-porous precursor. $Al(HCOO)_3$ is thermally stable to around 250° C. and is also stable in the presence of water, acids, alkalis and organic solvents. $Al(HCOO)_3$ has excellent and highly selective adsorption capacity for carbon dioxide gas in the presence of nitrogen gas and water vapour, at and above room temperature. It can be applied in the removal of carbon dioxide from flue gases in industrial combustion processes. It could also be used for the selective adsorption of molecular oxygen from air.

As noted above, $Al(HCOO)_3$ is very easy to make from readily available starting materials comprising an aqueous solution of aluminium oxide and formic acid (this also holds true for the other materials listed above, particularly those including iron and vanadium with aluminium (e.g. iron and aluminium)). $Al(HCOO)_3$ is very inexpensive compared to other metal-organic frameworks or solid sorbents that have been proposed for carbon dioxide capture.

As disclosed herein (e.g. see the examples below), $Al(HCOO)_3$ can selectively adsorb carbon dioxide from a flue gas that also contains nitrogen and water vapour. It is highly selective for $CO_2$ compared with $N_2$. It is also selective for the adsorption of oxygen from air. In contrast, sorbates for air separation (e.g., lithium-containing zeolites) are based upon the selective adsorption of $N_2$ rather than $O_2$. This requires removing the largest component in air ($N_2$: 80%; $O_2$ 19%). It is believed that these properties also apply to the other metal-organic frameworks of formula I disclosed herein.

As disclosed herein (e.g., see the examples), $Al(HCOO)_3$ can be used with water-containing flue gases above room temperature, e.g. at 50° C., while maintaining high $CO_2$ uptake and sorption selectivity. As noted herein, this may be particularly the case when the relative humidity of the water vapour is from less than or equal to 25% to 90%, such as less than or equal to 25% relative humidity. It is noted that many other metal-organic frameworks or solid sorbents are unstable in the presence of water vapour or lose significant $CO_2$ uptake capacity above room temperature.

The MOFs used herein (e.g. $(HCOO)_3$) have excellent stability against corrosive gases (e.g., $SO_2$ and $NO_2$), while maintaining high $CO_2$ uptake and sorption selectivity. Details of this stability may be found in the examples section below.

The metal-organic frameworks of formula I (e.g., $Al(HCOO)_3$) may be a mechanically robust material that is not particularly sensitive to water. This contrasts with other metal-organic frameworks, which tend to have poor mechanical properties and are sensitive to humidity.

In a second aspect of the invention that may be mentioned herein, there is provided a method of adsorbing $CO_2$ and/or $O_2$ from a gas, comprising subjecting a metal-organic framework of formula I as described herein to a flow of a gas comprising one or both of $CO_2$ and $O_2$, optionally wherein the gas further comprises nitrogen and water vapour. In embodiments of the invention where water vapour is present, this may be present in an amount less than or equal to 25% to 90% relative humidity.

As noted herein, while the gas used may contain water vapour in some circumstances (including up to 90% relative humidity), it may be preferred that the relative humidity of the gas is maintained at less than or equal to 25%. If this relative humidity is preferred, then for a postcombustion flue gas saturated with moisture, a drying means or apparatus may be situated upstream from the adsorbent material of formula I. For example, the drying technology may be a cooling means or apparatus and/or a condensation means or apparatus. In any event, it is noted that the compounds of formula I disclosed herein are resilient in the presence of water, meaning that they do not need special handling and storage, which makes their use in an industrial scale more practical than the conventional sorbents, which are highly hygroscopic.

The metal-organic frameworks described herein are also capable of releasing the adsorbed materials, such as $CO_2$ and/or $O_2$. Thus, in a third aspect of the invention, there is provided a method of releasing $CO_2$ and/or $O_2$ from a metal-organic framework of formula I as described herein to which $CO_2$ and/or $O_2$ has been adsorbed, the process comprising:
(a) providing a metal-organic framework of formula I to which $CO_2$ and/or $O_2$ has been adsorbed; and
(b) activating it by subjecting it to:
(i) a temperature of from 90 to 160° C. (e.g., from 100 to 150° C., such as 120° C.) under reduced pressure for a period of time (e.g. from 1 to 2 hours); or
(ii) a temperature of from 170 to 250° C. (e.g., from 175 to 185° C., such as about 180° C.) under 1 atmosphere pressure for a period of time (e.g. from 1 to 2 hours).

As an example, the metal-organic framework $Al(HCOO)_3$ containing adsorbed carbon dioxide can release the $CO_2$ on mild heating, enabling the regeneration of the $Al(HCOO)_3$. In contrast, other metal-organic frameworks or solid sorbents are relatively unstable on heating, making their regeneration more difficult.

In a fourth aspect of the invention, there is provided a method of obtaining an activated metal-organic framework of formula I as described herein, the method comprising the steps of:
(a) providing an unactivated metal-organic framework of formula I; and
(b) activating it by subjecting it to:
(i) a temperature of from 90 to 160° C. (e.g., from 100 to 150° C., such as 120° C.) under reduced pressure for a period of time (e.g. from 1 to 2 hours); or
(ii) a temperature of from 170 to 250° C. (e.g., from 175 to 185° C., such as about 180° C.) under 1 atmosphere pressure for a period of time (e.g. from 1 to 2 hours).
for a period of time, whereby the BET surface area of the metal-organic framework of formula I is increased to a value of from 500 to 600 $m^2/g$ as obtained from a 298 K $CO_2$ sorption isotherm following step (b).

Any parameters for measurement disclosed herein may be derived from the experimental section below. Further details of the methods of preparation and use may be found in the experimental section below.

Further aspects and embodiments of the invention will now be discussed by reference to the following non-limiting examples below.

EXAMPLES

Materials

The gas cylinders of Ar (99.95%), 15/85 $CO_2/N_2$ mixed gas, $N_2$ (99.95%), and He (99.95%) were purchased from Air Liquide Singapore Pte Ltd. Aluminium hydroxide (Al(OH)$_3$), formic acid (>96%), $FeCl_3 \cdot 6H_2O$, $VCl_3$, vanadium acetylacetonate, ethanol, dihydroxyterephthalic acid, nickel acetate tetrahydrate, 2,5-dihydroxyterephthalic acid, $ZrOCl_2 \cdot 8H_2O$, acetic acid, methanol, acetonitrile, tetrahydrofuran, acetone, $H_2SO_4$, HCl, $HNO_3$, and NaOH were purchased from Sigma-Aldrich, Singapore. Formic acid (>98%) was purchased from TCI-Chemicals, Japan.

Analytical Techniques

Inductively Coupled Plasma Mass Spectrometry (ICP-MS)

ICP analysis was carried out on Perkin Elmer Avio 500 Inductively Coupled Plasma-Optical Emission Spectrometer (ICP-OES). Sample was digested with $HNO_3$/HCl (1:3) on a hotplate for 1 h and topped up to 10 mL with $H_2O$. A clear solution was observed prior to analysis.

CHNS Elemental Analysis

CHNS elemental analysis was carried out on ThermoFisher Scientific FlashSmart CHNS Elemental Analyser. Sample was digested with $HNO_3$/HCl (1:3) on a hotplate for 1 h and topped up to 10 mL with $H_2O$, a Clear solution was observed prior to analysis.

XRD for Stability Analysis

PXRD patterns were measured on a Bruker D8 ADVANCED diffractometer with Cu Kα radiation (λ=1.5418 Å, 40 kV and 40 mA). All the PXRD patterns were recorded from 10° to 60° (2θ) with a step of 0.02° and a scan speed of 1 s/step under ambient condition.

TGA

TGA measurements were carried out on Q500 Thermogravimetry Analyzer. The TGAs analysis was performed under a $N_2$ gas flow (60 mL/min+40 mL/min, purge+protective). Both the samples (as-made Al(HCOO)$_3$ and ALF (≈15 mg) were heated from room temperature to 400° C. (673 K) with a heating rate of 10° C./min.

TGA on 85/85 Humid Water Treated ALFs

TGA was carried out on a Q500 Thermogravimetry Analyzer. All the TGA analyses were done under the $N_2$ gas flow (60 mL/min+40 mL/min, purge+protective). Post 85/85 humid water treated ALFs (≈15 mg) were heated from room temperature to 400° C. (673 K) with a heating rate of 5° C./min.

Single-Crystal X-Ray Diffraction (SC-XRD)

SC-XRD data were measured on the sample at 200° C. (473 K) using a Bruker AXS D8 Venture Mo microfocus source equipped with a Photon 100 CMOS active pixel sensor detector. The data collection and integration were achieved through the APEX3 software. The structures were solved by direct methods, and refinement of the structure was performed by least squares procedures on weighted F2 values using the SHELXL-2014 program package included in the WinGx system programs for Windows (G. M. Sheldrick, *Acta Cryst.* 2015, 71, 3-8).

General Procedure for Density-Functional Theory (DFT) Calculations

DFT calculations were performed using the Vienna ab initio Simulation Package (VASP) code (G. Kresse & J. Furthmüller, *Phys. Rev. B.* 1996, 54, 11169; and G. Kresse & J. Furthmüller, *Comput. Mater. Sci.* 1996, 6, 15-50) with the projected augmented wave (PAW) pseudopotentials (P. E. Blöchl, *Phys. Rev. B.* 1994, 50, 17953; and G. Kresse & J. Hafner, J. Condens. *Matter Phys.* 1994, 6, 8245-8257), where the following electrons were treated explicitly: H $1s^1$, C $2s^22p^2$, O $2s^22p^4$, and Al $3s^23p^1$. The exchange-correlation functional was calculated using the generalized gradient approximation (GGA) (J. P. Perdew, K. Burke & M. Ernzerhof, *Phys. Rev. Lett.* 1996, 77, 3865), and the van der Waals interactions were treated using the Grimme's method (DFT+D3, S. Grimme et al., *J. Chem. Phys.* 2010, 132, 154104). A plane wave kinetic energy cutoff of 520 eV and a 3×3×3 Monkhorst-Pack (J. D. Pack & H. J. Monkhorst, *Phys. Rev. B.* 1977, 16, 1748) k-point mesh were used. Structural relaxations were performed until the interatomic forces were less than 0.01 eV/A. The adsorption energy of adsorbate M (M=$CO_2$, $N_2$ and $H_2O$) inside ALF was calculated as:

$$E_{adsorption} = (E[Al(HCOO)_3, nM] - E[Al(HCOO)_3] - nE[M])/n$$

where E is the DFT total energies and n is the number of the adsorbate molecule in the cubic unit cell. The total energy of the adsorbate molecule was calculated by putting a single molecule at the center of a 15×15×15 Å$^3$ box. The energy landscape of ALF was calculated by putting an adsorbate molecule at the center of the cavities (SCs and LCs), aligned along the [001] direction, and moved along a translation vector t=(x, y, z) where x, y and z=−0.1, −0.05, 0, 0.05 and 0.1 in fractional units. Then, all of the oxygen atoms of $CO_2$ were relaxed using DFT, whereas other atoms and the unit cell were kept fixed. For $N_2$ calculations, one of the nitrogen atoms in $N_2$ was kept fixed whereas for $H_2O$ adsorption, oxygen atoms of $H_2O$ were fixed.

For the calculation of the mechanical properties, the same method as discussed above was used. Geometry optimization was performed based on the primitive cell of the experimental crystal structure until the interatomic forces are less than 0.01 eV/A. Then, the structure of Al(HCOO)$_3$ was re-optimized under following strains:

$$\begin{pmatrix} 1+\delta & 0 & 0 \\ 0 & 1 & \delta/2 \\ 0 & \delta/2 & 1 \end{pmatrix}$$

where δ=±0.5% and ±1%. The elastic constants were extracted from stress-strain relationship using the method in a previous paper (Z. Deng et al., *J. Mater. Chem. A* 2016, 4, 12025-12029).

Example 1. Preparation of MOFs

We describe the $CO_2$ adsorption behaviour of arguably the simplest of all MOFs, aluminium formate, Al(HCOO)$_3$, which can be made from inexpensive and widely available starting materials, such as Al(OH)$_3$ and HCOOH. Metal(III) formates, M$^{III}$(HCOO)$_3$, where M=Al, Fe, Ga, In, and Mn (Y.-Q. Tian et al., *Inorg. Chem.* 2007, 46, 1612-1616), for small molecular separations and gas capture applications have not been reported previously. The parent structure of these compounds is of the ReO$_3$-type (H. A. Evans et al., *Nat. Rev. Mater.* 2020, 5, 196-213), but they have only hitherto been reported as their $CO_2$/water adducts, e.g., Al(HCOO)$_3$·(CO$_2$)$_{3/4}$(H$_2$O)$_{1/4}$(HCOOH)$_{1/4}$ with CO$_2$, water and/or formic acid filling the perovskite A-site cavities. This material, referred to here as the as-made Al(HCOO)$_3$, (Y.-Q. Tian et al., *Inorg. Chem.* 2007, 46, 1612-1616) was prepared by reacting aluminium hydroxide with a solution of formic acid.

Reflux Synthesis and Activation of as-Made Al(HCOO)$_3$
Preparation of Al(HCOO)$_3$(CO$_2$)$_{0.75}$(H$_2$O)$_{0.25}$(HCOOH)$_{0.25}$ (as-made Al(HCOO)$_3$)

As-made aluminium formate was synthesized by modifying a reported procedure (Y.-Q. Tian et al., *Inorg. Chem.* 2007, 46, 1612-1616). In a typical synthesis, formic acid (100 mL) and aluminium hydroxide (1.2 g, 0.015 mol) were refluxed in a 250 mL three-necked round-bottomed flask at 100° C. (373 K) for 48 h. Upon completion of the reaction, excess formic acid was extracted by centrifugation, and the white solid was rinsed with a copious amount of ethanol and separated using vacuum filtration. The air-dried sample provided a white solid product of Al(HCOO)$_3$(CO$_2$)$_{0.75}$(H$_2$O)$_{0.25}$(HCOOH)$_{0.25}$/(guest included/as-made Al(HCOO)$_3$) (yield=95%). Based on our chemical analysis, it is likely that the actual as-made compound was Al(HCOO)$_3$(CO$_2$)$_{0.75}$(H$_2$O)$_{0.50}$, with two molecules in the LCs. Analytical CHN data for AlC$_{3.75}$H$_4$O$_8$ (molecular weight: 204 g/mol): calculated weight percentages C: 22.06%, H: 1.96% and observed C: 22.58%, H: 2.32%.

Hydrothermal Synthesis of Al(HCOO)$_3$ Single Crystals

In a typical synthesis, formic acid (7 mL) and aluminium hydroxide (50 mg, 0.234 mmol) were added into a Teflon liner and stirred at room temperature for 30 min until they formed a homogeneous suspension. Then, the contents were placed in a 23 mL Teflon lined Parr stainless steel autoclave and heated at 130° C. (403 K) for three days, followed by slow cooling to room temperature, giving colorless cubic crystals of aluminium formate (Al(HCOO)$_3$(CO$_2$)$_{0.75}$(H$_2$O)$_{0.25}$(HCOOH)$_{0.25}$). The resulting crystals were washed with a copious amount of ethanol and separated using vacuum filtration. The air-dried sample gave a yield of 83% of as-made Al(HCOO)$_3$ single crystals.

Activation of Al(HCOO)$_3$

Activation (removal of the guest species) of the as-made Al(HCOO)$_3$ material, which is reported here for the first time, can be done either in vacuo at temperatures between at 423 K, or by heating at 453 K in air at ambient pressure. The air-dried, as-made Al(HCOO)$_3$(CO$_2$)$_{0.75}$(H$_2$O)$_{0.25}$(HCOOH)$_{0.25}$ (0.5 g, 2.16 mmol) prepared above was heated at 150° C. (423 K) for 24 h under high vacuum [1×10$^{-4}$ torr (mmHg)] or heated in air/ambient conditions at 180° C. (453 K) for 24 h to yield 0.39 g of the guest-free ALF. Analytical CHN data for AlC$_3$H$_3$O$_6$ (molecular weight: 162.03 g/mol): calculated. C: 22.24, H: 1.87, and observed C: 21.23, H: 1.93.

Reflux Synthesis and Activation of as-Made V(HCOO)$_3$
Preparation of as-Made V(HCOO)$_3$ In a typical synthesis, 150 mL of formic acid and vanadium acetylacetonate (8.0 g, 0.023 mol) was refluxed in a 250 mL two-necked round-bottomed flask at 90° C. for 48 h. After completion of the reaction, excess formic acid was extracted using centrifugation. The green solid product was rinsed with a copious amount of ethanol and separated using vacuum filtration. The vacuum dried sample gave a yield of 95% of as-made V(HCOO)$_3$. Analytical CHN data for as-made V(HCOO)$_3$ (molecular weight: 235.0079 g/mol): calculated weight percentages C: 20.44%, H: 1.72% and observed C: 20.19%, H: 2.13%.

Hydrothermal Synthesis of V(HCOO)$_3$ Single Crystals

In a typical synthesis, formic acid (7.0 mL) and vanadium acetylacetonate (100 mg, 0.287 mmol) were added into a Teflon liner and stirred at room temperature for 30 min until they formed a homogeneous green suspension. Then, the contents were placed in a 23 mL Teflon lined Parr stainless steel autoclave and heated at 130° C. for three days followed by slow cooling to room temperature, giving green colour cubic crystals of vanadium formate (V(HCOO)$_3$(CO$_2$)$_{0.75}$(H$_2$O)$_{0.25}$(HCOOH)$_{0.25}$). The resulting crystals were washed with a copious amount of ethanol and separated using vacuum filtration. The vacuum dried sample gave a yield of 90% of V(HCOO)$_3$(CO$_2$)$_{0.75}$(H$_2$O)$_{0.25}$(HCOOH)$_{0.25}$ (guest included/as-made V(HCOO)$_3$) single crystals.

Activation of V(HCOO)$_3$

As-made V(HCOO)$_3$(CO$_2$)$_{0.75}$(H$_2$O)$_{0.25}$(HCOOH)$_{0.25}$ (0.5 g, 0.0026 mol) was heated at 90° C. under high vacuum [1×10$^{-4}$ mmHg] for 24 h, yielding quantitative amounts of the guest-free V(HCOO)$_3$ (VF). Analytical CHN data for VC$_3$H$_3$O$_6$ (molecular weight: 185.993 g/mol): calculated. C: 19.37%, H: 1.63%, and observed C: 15.45%, H: 2.26%.

Synthesis of MOF-74-Ni

MOF-74-Ni was synthesized based on a literature method (S. Cadot et al., *J. Mater. Chem.* 2014, 2, 17757-17763). In a 100 mL round-bottom flask equipped with a condenser, a suspension of dihydroxyterephthalic acid (1.03 g, 5.1 mmol) in deionized water (40 mL) was heated to reflux under strong magnetic stirring. In a separate flask, nickel acetate tetrahydrate (2.51 g, 10 mmol) was dissolved in deionized water (10 mL) at 80° C. (353 K). The obtained light green nickel solution was added in one portion to the boiling ligand suspension under continuous stirring. The reaction mixture was further refluxed for 1 h. The final suspension was filtered, and the yellow microcrystalline powder was washed with warm deionized water (50×3 mL) and methanol (20×2 mL) before being dried overnight at 80° C. (353 K). The powder was degassed at 150° C. (423 K) for 20 h before the measurement of gas sorption isotherms.

Synthesis of UiO-66-(OH)$_2$

UiO-66-(OH)$_2$ was prepared according to a literature method (Z. Hu et al., *AIChE J.* 2017, 63, 4103-4114; and Y. Wang et al., *ACS Sustain. Chem. Eng.* 2018, 6, 11904-11912). Briefly, 2,5-dihydroxyterephthalic acid (1 g, ≈5 mmol) and ZrOCl$_2$·8H$_2$O (1.7 g, ≈5.2 mmol) were added in a 50 mL water/acetic acid (20/30, v/v) mixture and heated under reflux (≈105° C., ≈378 K) for 1 day to afford a dark khaki powder. The powder was washed with deionized water three times before soaking in water and methanol each for 3 days at room temperature, during which the solvent was refreshed every day. After the final removal of methanol by decanting, the sample was activated under vacuum at 120° C. (393 K) overnight for further modifications and characterizations.

Example 2. Characterization of as-Made Al(HCOO)$_3$ and ALF

NPD of ALF and CO$_2$-Dosed ALF

Neutron diffraction measurements were performed on ALF powder (1.23 g) at the National Institute of Standards and Technology Center for Neutron Research (NCNR). Data were collected at the high-resolution neutron powder diffractometer, BT-1, utilizing a Ge(311) monochromator with an in-pile 60' collimator, corresponding to a neutron wavelength of 2.079 Å. The sample was loaded into a vanadium sample can in a He environment glove box and sealed with a soldered lead O-ring onto a copper heating block containing a valved outlet for gas loading. After mounting the sample onto a bottom-loaded closed cycle refrigerator (CCR), the sample was reactivated at elevated temperatures under vacuum to remove possible residual helium. The sample was cooled to base temperature, and measured at various temperatures upon heating for sufficient time to be able to perform high-quality Rietveld refinements (the scans were on average 4 hours' worth of scan time), or with 1-hour scans to obtain unit cell values on heating. For $CO_2$ dosing data sets, a custom calibrated gas dosing manifold setup with a known volume and an attached pressure gauge were used to either maintain static pressure or deliver specific stoichiometric equivalents. NPD data were analyzed using the TOPAS 6 software suite (A. A. Coelho, *J. App. Cryst.* 2018, 51, 210-218). For consistency, Pawley refinement of the activated sample at 15 K was used to establish the peak shape used for all subsequent Pawley (G. S. Pawley, *J. App. Cryst.* 1981, 14, 357-361) and Rietveld refinements. Due to the high symmetry and quality of the NPD data, the $CO_2$ molecules did not require rigid body modelling. The $CO_2$ molecules were refined as atoms with the thermal parameter of the large $CO_2$ atoms fixed to the SC $CO_2$ atom values.

Variable Temperature XRD

Variable temperature PXRD patterns were measured on a PanAlytical X'pert PRO MRD X-ray diffractometer with Cu Kα radiation (λ=1.5418 Å, 30 kV and 40 mA). PXRD patterns were recorded on pelletized (10 mm×10 mm) as-made $Al(HCOO)_3$ at various temperatures between 25° C. to 280° C. (298 K to 553 K) with a heating rate of 5° C./min, a step of 0.025° and a scan speed of 1 s/step.

Stability of Material Monitored from PXRD

As-made $Al(HCOO)_3$ (0.5 g) was soaked in water (10 mL), 12 M $H_2SO_4$, 12 M HCl and 12 M $HNO_3$ acidic solutions (10 mL), and 0.5 M NaOH basic solutions (10 mL) for 24 h at room temperature. For chemical stability tests, 0.5 g of ALF was soaked in methanol, acetonitrile, ethanol and tetrahydrofuran organic solvents (10 mL) and heated on a hot plate set at 323 K (50° C.) for 7 days. The vacuum-filtered samples of tested ALF were dried at 323 K (50° C.) for 1 h before PXRD analysis.

Results and Discussion

Figure 1:
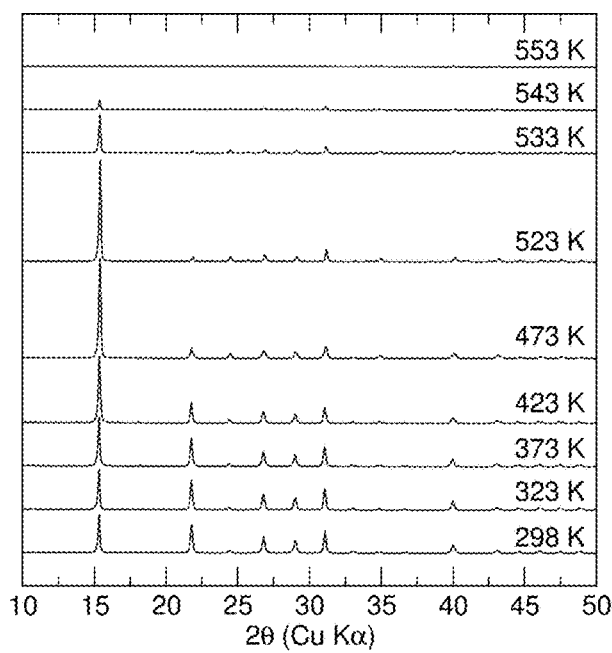
Figure 2:
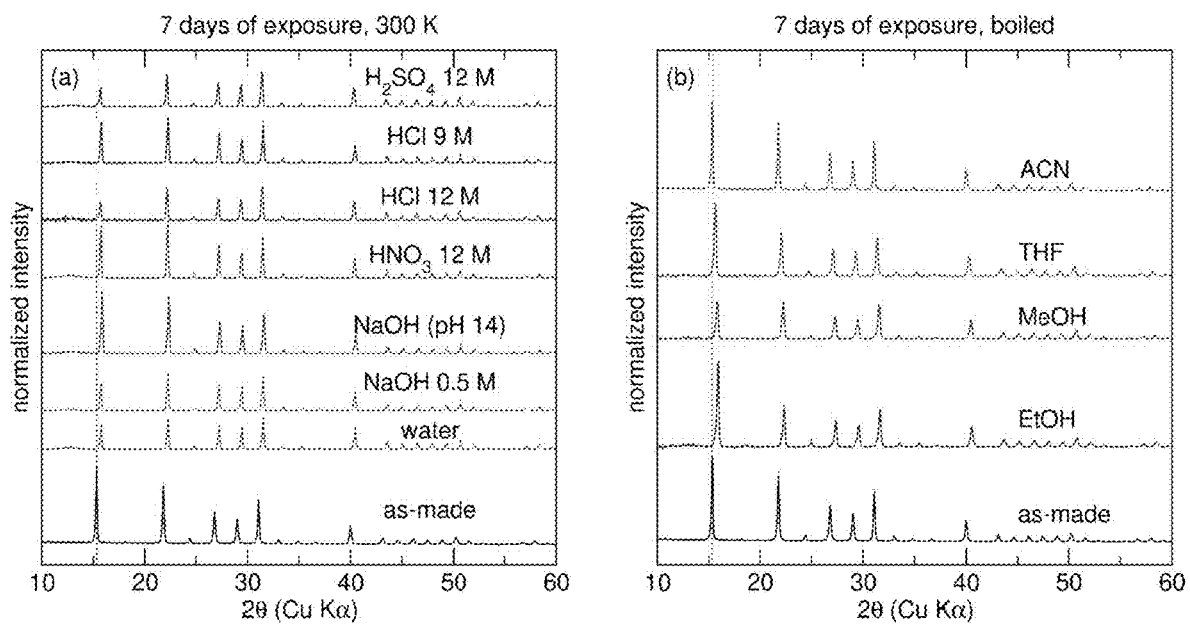
Figure 3:
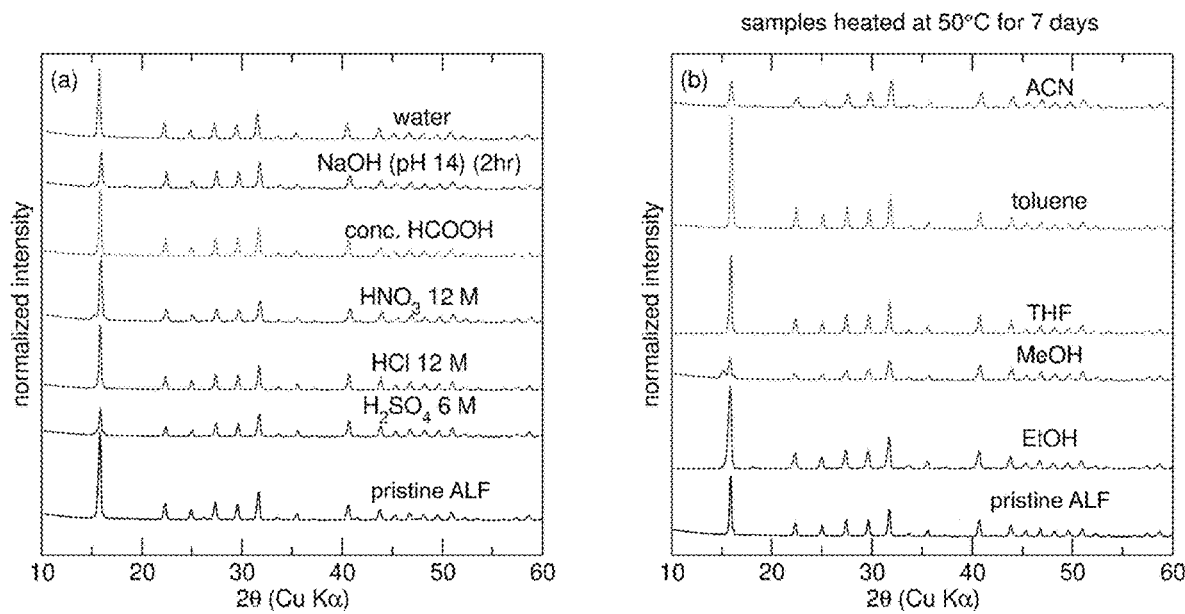
Figure 4:
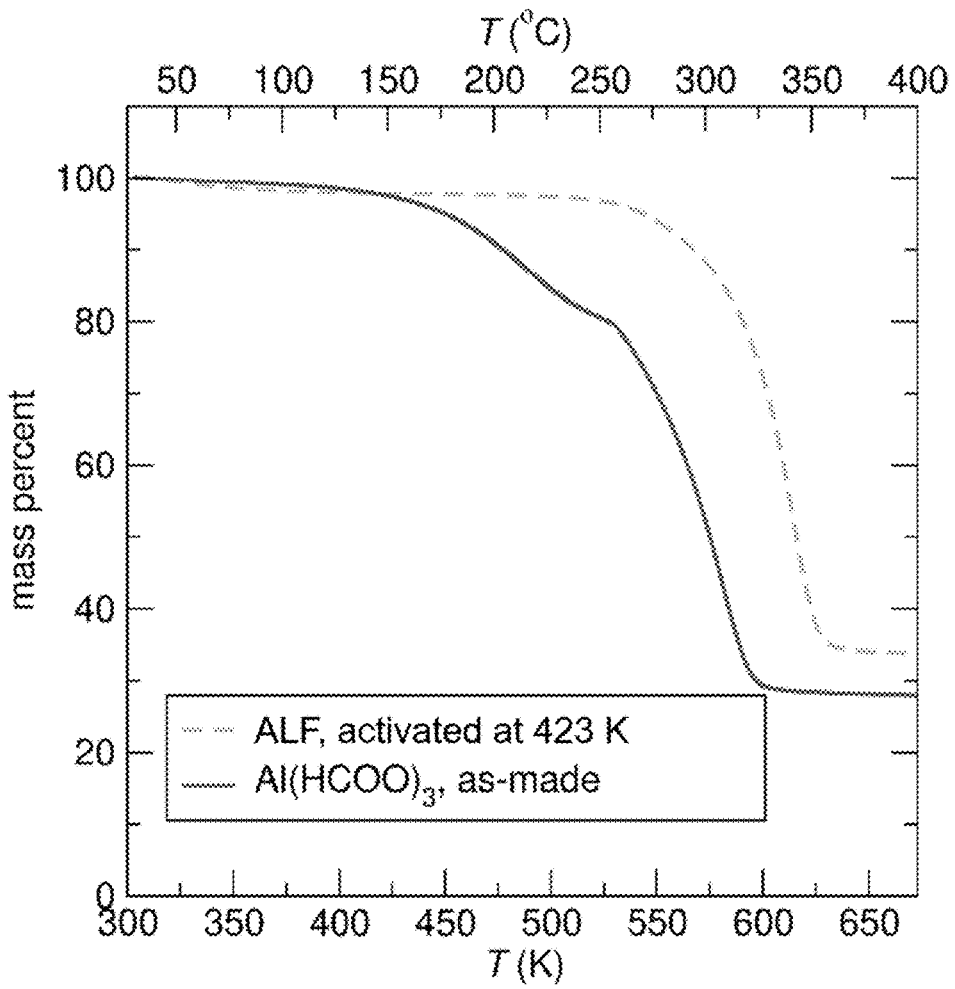

ALF displayed remarkable resilience to air/solvents/corrosive media, and was thermally stable up to ~523 K in air (FIG. 1-4). Both as-made $Al(HCOO)_3$ and ALF retained crystallinity well in concentrated acid, base, and pure water environments, as seen in FIG. 2-3. However, the stability of both the as-made $Al(HCOO)_3$ and ALF fared better in basic or acid environments for extended periods. If soaked in water at room temperature for more than 12 h, the crystallinity of the activated material gradually begins to degrade. We believe this is related to the slow kinetics of $H_2O$ adsorption into the material. The as-made material is slightly more robust than the activated one, and we believe this is related to the hydrophobic nature of the $CO_2$ within the SCs.

Figure 5:
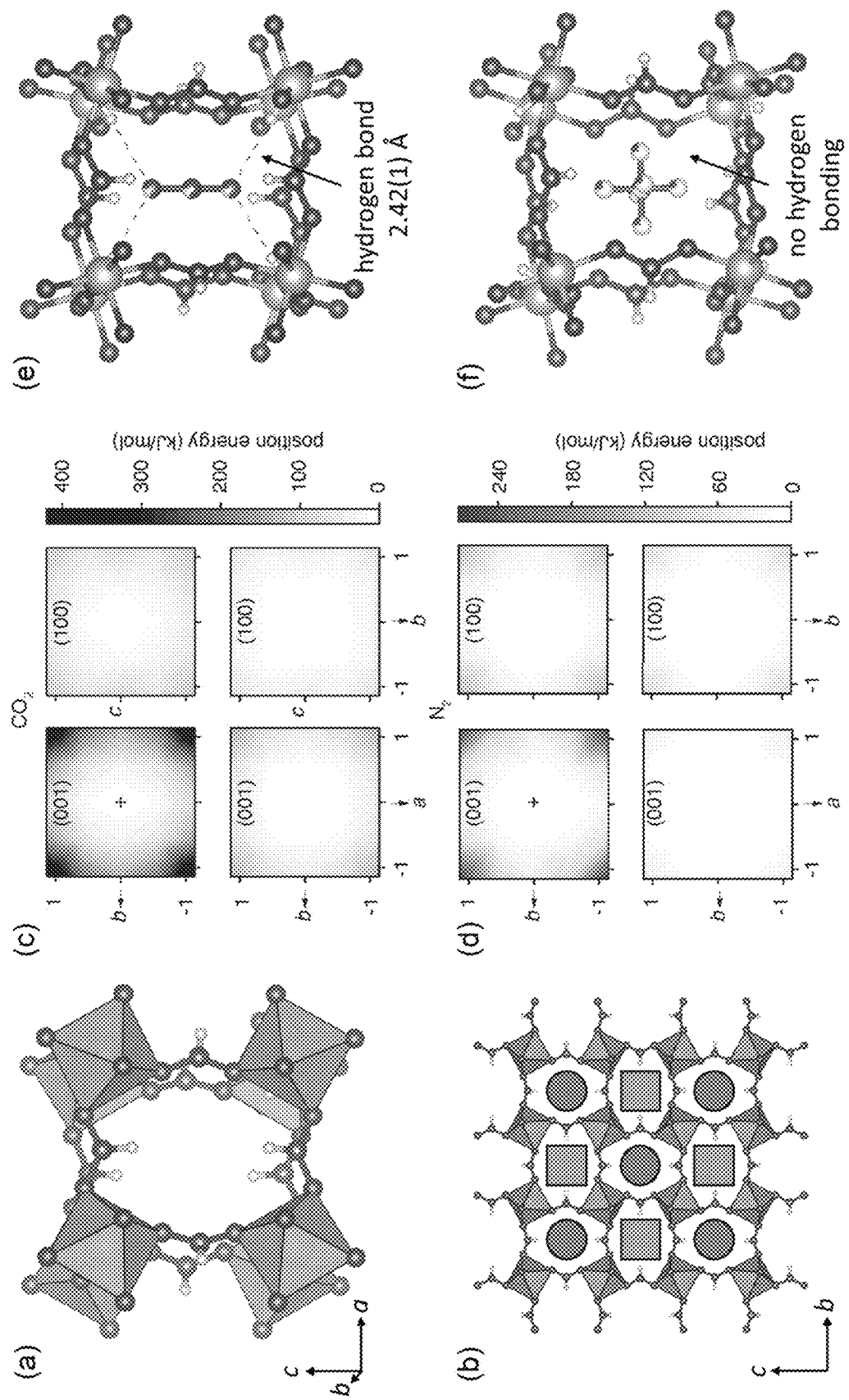

FIG. 5a shows the crystal structure of ALF, obtained from Rietveld refinement with NPD data; the fractional coordinates agree with the structure obtained by SC-XRD (Table 1) and energy minimization using DFT calculations (Tables 2-3). The crystal structure of ALF has two types of cavities, which are referred to as the SCs and the LCs. There are three times as many SCs as LCs, and the SC and LC pore volumes at 300 K are 43(3) Å$^3$ and 79(9) Å$^3$, respectively (obtained using PLATON, A. L. Spek, *J. Appl. Cryst.* 2003, 36, 7-13). For the SCs, four of the twelve formate ligands point their hydrogens inward (FIG. 5a), and for the LCs, all twelve of the formate ligand point their hydrogens outward.

Figure 6:
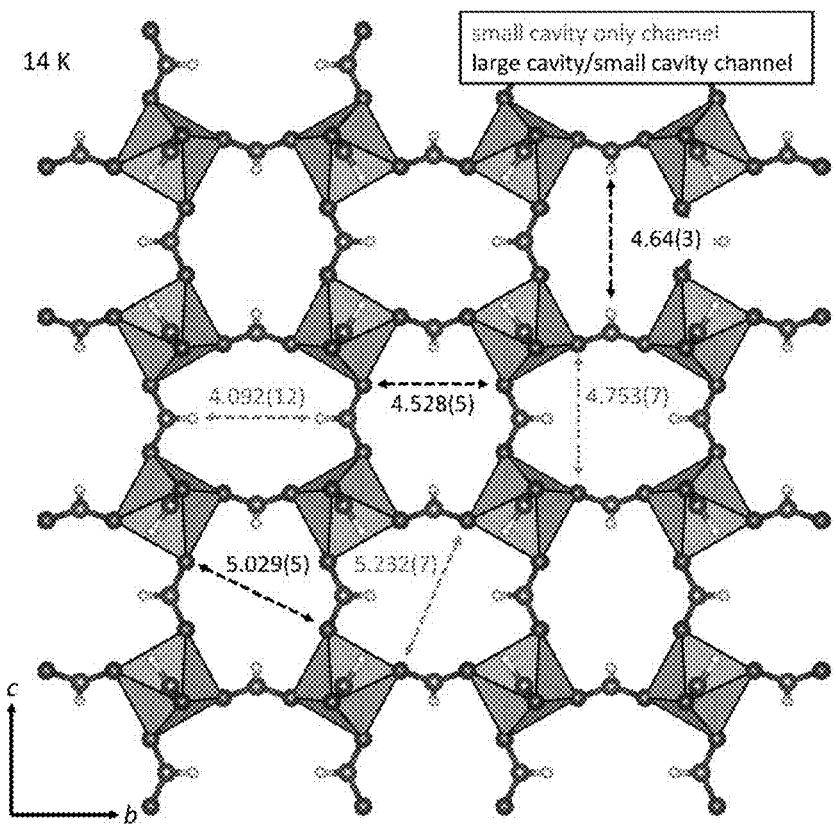
Figure 7:
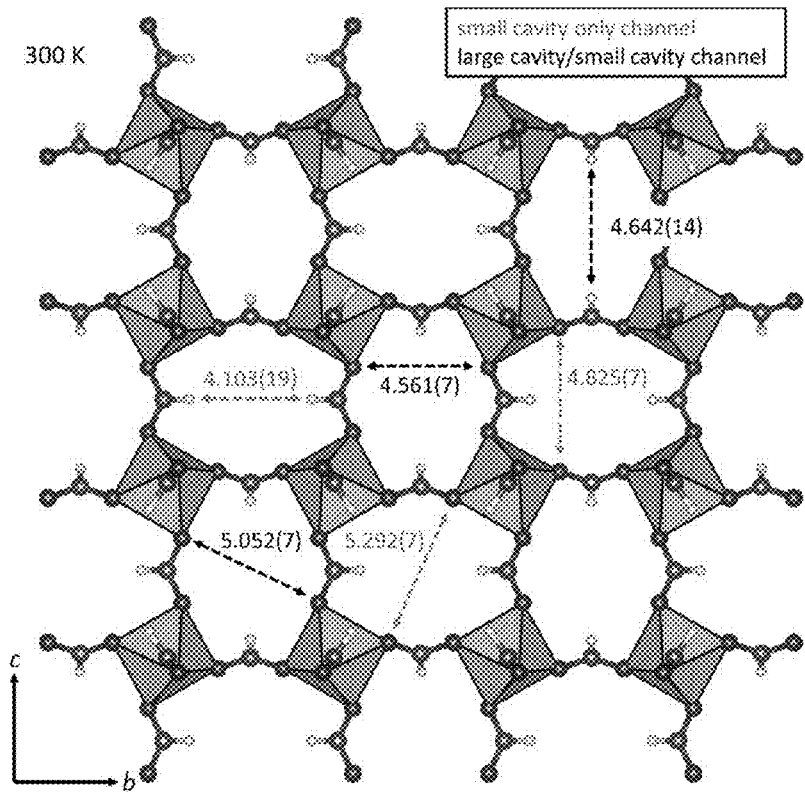
Figure 8:
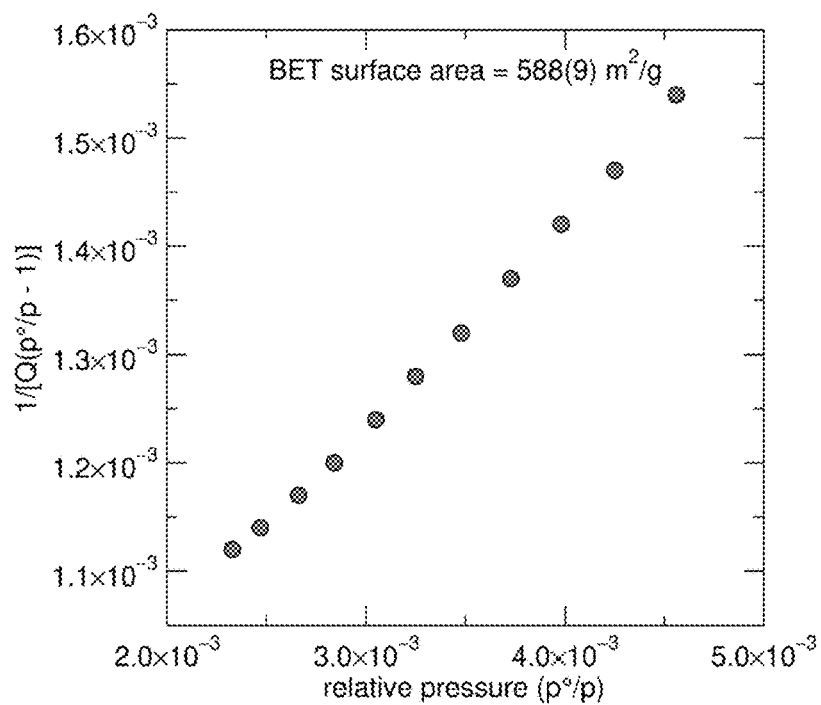
FIG. 8 depicts the Brunauer-Emmett-Teller (BET) fits obtained from 298 K CO$_2$ isotherms of ALF.

The inward-pointing formate hydrogens facilitated a favorable hand-in-glove relation between $CO_2$ and the SCs. Furthermore, the crystal structure contained two types of interpenetrating channels (FIG. 5b). One channel comprised only SCs (squares), and the other comprised alternating SCs and LCs (circles). Due to a favourable window size along the SC/LC channels relative to the SC/SC channels [4.561(7) Å and 4.103(19) Å, respectively (FIG. 6-7)], favored $CO_2$ adsorption in the SC/LC channels. The adsorption energy was ~50 kJ/mol per $CO_2$ for the small pore and ~37 kJ/mol per $CO_2$ for the large pore, matching well with the experimental isosteric heat of adsorption (HOA) of $CO_2$, ~48 kJ mol$^{-1}$, determined from variable temperature $CO_2$ adsorption isotherms. This HOA value is comparable to other well-studied MOFs. The BET surface area of ALF was estimated to be 588±8 m$^2$ g$^{-1}$ (error is 16; FIG. 8).

TABLE 1

Details of X-ray data collection and the structure refinement of ALF. Values in parentheses indicate 1σ. CCDC Number 2075733.

| | |
|---|---|
| Empirical formula | $AlC_3H_3O_6$ |
| Formula weight | 162.03' |
| Temperature | 473(2) K |
| Wavelength | 0.71073 Å |
| Crystal system | Cubic |
| Space group | Im-3 |
| Unit cell dimensions (a = b = c) | 11.4305(6) Å |
| Unit cell angle (alpha = beta = gamma) | 90° |
| Volume | 1493.5(2) Å$^3$ |
| Z | 8 |
| Density (calculated) | 1.441 Mg/m$^3$ |
| Absorption coefficient | 0.247 mm$^{-1}$ |
| F(000) | 656 |
| Crystal size | 0.096 × 0.091 × 0.070 mm$^3$ |
| Theta range for data collection | 2.520 to 28.264°. |
| Index ranges | −15 <= h <= 10, −13 <= k <= 15, −15 <= l <= 14 |
| Reflections collected | 2730 |
| Independent reflections | 359 |
| R(int) | 0.0386 |
| Completeness to theta = 25.242° | 100.0% |
| Absorption correction | Semi-empirical from equivalents |
| Max. and min. transmission | 0.7457 and 0.6729 |
| Refinement method | Full-matrix least-squares on F$^2$ |
| Data/restraints/parameters | 359/0/19 |
| Goodness-of-fit on F$^2$ | 1.104 |
| Final R indices [I > 2sigma(I)] | R1 = 0.0687, wR2 = 0.1782 |
| R indices (all data) | R1 = 0.0772, wR2 = 0.1923 |
| Extinction coefficient | n/a |
| Largest diff. peak and hole | 2.105 and −0.292 Å$^{-3}$ |

TABLE 2

Details of X-ray data collection and the structure refinement of $V(HCOO)_3$. Values in parentheses indicate 1σ. CCDC Number 2174485.

| | |
|---|---|
| Molecular formula | $VC_{3.75}H_4O_{7.75}$ |
| Formula weight | 224.007 |
| Temperture | 298(2) K |
| Wavelength | 0.71073 Å |
| Crystal system | Cubic |
| Space group | Im-3 |
| Unit cell dimensions (a = b = c) | 11.7910(4) Å |
| Unit cell angle (α = β = γ) | 90° |
| Volume | 1639.28(2) Å$^3$ |
| Z | 2 |
| Density (calculated) | 1.807 Mg/m$^3$ |
| Absorption coefficient | 1.219 mm$^{-1}$ |
| F(000) | 884.0 |
| Crystal size | 0.096 × 0.091 × 0.070 mm$^3$ |
| Theta range for data collection | 2.520 to 28.264°. |

TABLE 2-continued

Details of X-ray data collection and the structure refinement of V(HCOO)$_3$. Values in parentheses indicate 1σ. CCDC Number 2174485.

| | |
|---|---|
| Index ranges | −11 <= h <= 16, −13 <= k <= 16, −14 <= l <= 16 |
| Reflections collected | 3160 |
| Independent reflections | 472 |
| R(int) | 0.0442 |
| Completeness to theta = 25.242° | 100.0% |
| Absorption correction | Semi-empirical from equivalents |
| Max. and min. transmission | 0.918 and 0.890 |
| Refinement method | Full-matrix least-squares on F$^2$ |
| Data/restraints/parameters | 457/0/27 |
| Goodness-of-fit on F$^2$ | 1.252 |
| Final R indices [I > 2sigma(I)] | R1 = 0.0766, wR2 = 0.1826 |
| R indices (all data) | R1 = 0.0872, wR2 = 0.2000 |
| Extinction coefficient | n/a |
| Largest diff. peak and hole | 1.759 and −0.561 Å$^{-3}$ |

TABLE 3

DFT calculated lattice parameters (Å) of the ALF compared to experiments. It was noticed that the symmetry of the ALF will be reduced when CO$_2$ is adsorbed at the LC site. Therefore, the arithmetic averages were taken as the lattice parameters here. Experimental value from 14K NPD data on ALF. Values are in units of Å.

| DFT, empty | Exp (14K, neutron) | DFT, CO$_2$@SCs | DFT, CO$_2$@SCs + LCs |
|---|---|---|---|
| 11.410 | 11.360 | 11.430 | 11.430 |

TABLE 4

DFT relaxed atomic fractional coordinates of ALF compared with low temperature NPD results obtained at 14K. The NPD results are shown in brackets. Values in [ ] denote 1σ

| | x | y | z | Site |
|---|---|---|---|---|
| Al | 0.25000 | 0.25000 | 0.25000 | 8c |
| | (0.25000) | (0.25000) | (0.25000) | |
| C | 0.26089 | 0.24107 | 0.00000 | 24g |
| | (0.2584[3]) | (0.2437[3]) | (0.00000) | |
| H | 0.20649 | 0.32109 | 0.00000 | 24g |
| | (0.2043[6]) | (0.3199[5]) | (0.00000) | |
| O | 0.29084 | 0.19622 | 0.09719 | 48h |
| | (0.2908[3]) | (0.1993[2]) | (0.09628[17]) | |

Example 3. Isotherm and Breakthrough Adsorption of ALF

To validate the CO$_2$/N$_2$ separation performance of ALF, dynamic breakthrough experiments have been performed by flowing CO$_2$/N$_2$ (15/85) mixtures through the packed column of ALF pre-activated at 473 K. NPD experiments were carried out on ALF by following the protocol in Example 2.

Breakthrough Measurements

Figure 9:
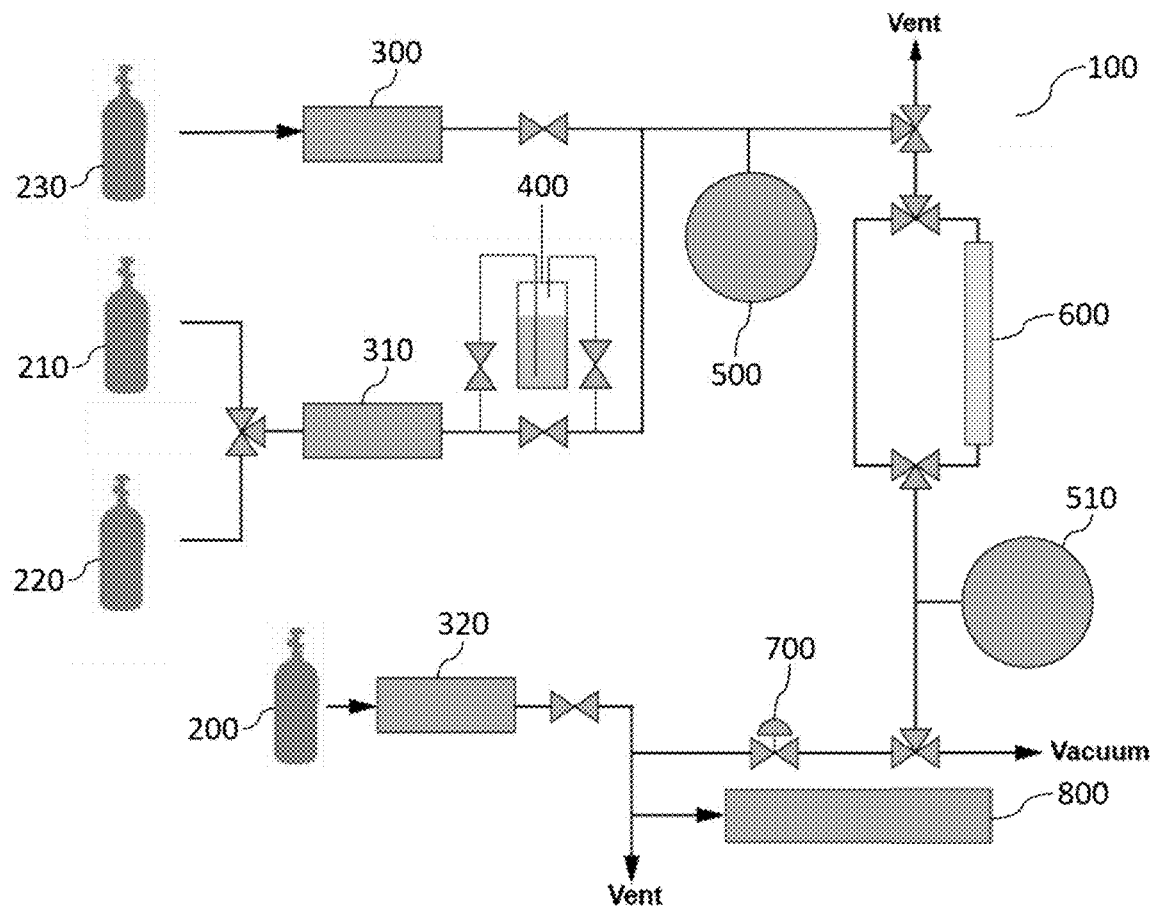
FIG. 9 depicts the scheme of the breakthrough setup used in this study.

The breakthrough experiments were conducted using a home-built setup shown in FIG. 9. As shown, there is an experimental setup 100 that includes a gas cylinder of Ar (99.95%) 200, a gas cylinder of 15/85 CO$_2$/N$_2$ mixed gas 210, a gas cylinder of N$_2$ (99.95%) 220, a gas cylinder of He (99.95%) 230, mass flow controller (MFC)-1 300, MFC-2 310, MFC-3 320, a water reservoir 400, pressure gauges 500 and 510, a ¾ stainless steel column 600, a back pressure regulator 700, and a mass spectrometer 800. The stainless-steel columns used for loading MOF powders were 4 cm long, and their internal column diameter was 0.3 cm. Metal mesh and cotton wool were placed at both ends of the column to prevent the system from being contaminated by sample powders/pellets. A glass fibre heating tape was used for controlling the setup temperature for column activation, regeneration, and breakthrough experiments at a temperature above room temperature. The temperature of the heating tape (Omega DHT102040LD) was detected and controlled by an Omega thermocouple (5SC-TT-K-30-36) and a microcontroller (Omron E5CC), respectively. Gas composition at the exit of the column was determined by mass spectrometer 800 (Hiden QGA quantitative gas analysis system). The flow rate of each component gas was calculated by an internal Ar flow reference with a fixed flow rate of 5±0.05 sccm (standard cubic centimeter per min).

Before the breakthrough experiments, the adsorption columns were activated by purging a constant He flow (5±0.1 sccm) through the column at pre-determined temperatures (180° C., 150° C., and 120° C. [453 K, 423 K, and 393 K] for ALF, MOF-74-Ni, and UiO-66-(OH)$_2$, respectively) for at least 12 h until no solvent or moisture signal could be detected by the mass spectrometer. For dry gas breakthrough experiments, a 15/85 premixed CO$_2$/N$_2$ flow with a total flow rate of 2±0.05 sccm was stabilized for 40 min before being introduced into the column. As for the experiments of wet gas breakthrough, a N$_2$ flow (2±0.05 sccm) purging through the water reservoir (relative humidity (RH)) 80.5% at 25° C. (298 K) as determined by Omega RH318 hygrothermometer) was used to saturate the adsorption columns before introducing the 15/85 CO$_2$/N$_2$ mixed gas (2±0.05 sccm) into the column.

Adsorption Capacity and Selectivity Calculations Based on Breakthrough Data

Based on the mass balance of certain gas component in the mixed gas across the whole packed column (In-Out=Accumulation) including the dead volume of the setup (volume inside the setup excluding the column), it can be derived that, $$\varepsilon v_0 C_0 A t_c - \int_0^{\tau_c} \varepsilon v_t C_t A dt = LA\varepsilon C_e + LA(1-\varepsilon)q_e + V_d C_e \quad \text{Equation 1}$$

where ε is the bed porosity estimated based on the crystal density of the adsorbents, $v_0$ is the total interstitial gas velocity (m s$^{-1}$) at the column inlet; $C_0$ is the inlet gas concentration (mol m$^{-3}$), A is the cross sectional area of column (m$^2$), $t_c$ is the elution time (s), $v_t$ is the interstitial gas velocity (m s$^{-1}$) at the exit of the column, $C_t$ is the exit gas concentration (mol m$^{-3}$), $C_e$ is the average gas concentration in the column (mol m$^{-3}$), $V_d$ is the dead volume of the setup (m$^3$), L is the column length (m), and $q_e$ is the equilibrium concentration of adsorbate in the adsorbent (mol m$^{-3}$) corresponding to the average column pressure $P_e$ (calculated vide infra).

By dividing both sides of Equation 1 with the gas molar flow rate of this component at the column inlet, Equation 1 is rearranged to $$\int_0^{\tau_c}\left(1 - \frac{F_t}{F_0}\right)dt = \frac{L}{v_0}\left(\frac{C_e}{C_0} + \frac{1-\varepsilon}{\varepsilon}\frac{q_e}{C_0}\right) + \frac{V_d C_e}{F_0} \quad \text{Equation 2}$$

The gas concentration at the inlet of the column can be calculated by the following equation, $$C_0 = \frac{y_0 P_{in}}{R \times T} \qquad \text{Equation 3}$$

where $y_0$ and $P_{in}$ are the gas composition and pressure (kPa) at the inlet (upstream) of the column, respectively.

According to Darcy's law, a linear pressure profile in the bed was assumed. Therefore, the average column pressure ($P_e$) and average gas concentration ($C_e$) can be calculated as below:

$$P_e \approx \frac{P_{in} + P_{out}}{2} \qquad \text{Equation 4}$$

$$C_e \approx \frac{y_t P_e}{RT} = \frac{y_t (P_{in} + P_{out})}{2RT} \qquad \text{Equation 5}$$

where $y_t$ and $P_{out}$ are the gas composition and pressure (kPa) at the outlet (downstream) of the column, respectively. Equation 2 can be further rearranged as $$\int_0^{t_c} \left(1 - \frac{F_t}{F_0}\right) dt = \frac{L}{v_0}\left(\frac{P_{in} + P_{out}}{2P_{in}} + \frac{1-\varepsilon}{\varepsilon}\frac{q_e}{C_0}\right) + \frac{V_d C_e}{F_0} \qquad \text{Equation 6}$$

The dead volume item in the above equation can be obtained by performing dead volume breakthrough experiments using the bypass of the setup, and perform the integration as follows:

$$\int_0^{t_c'} \left(1 - \frac{F_t}{F_0}\right) dt = \bar{t}_{blank} = \frac{V_d C_e}{F_0} \qquad \text{Equation 7}$$

where $t_c'$ is the elution time of the dead volume breakthrough experiments, and $\bar{t}_{blank}$ is the mean residence corresponding to the setup dead volume.

Breakthrough selectivity was calculated using Equation 8, $$S = \frac{q_{e1}/c_{e1}}{q_{e2}/c_{e2}} \qquad \text{Equation 8}$$

where $C_{ei}$ is the equilibrium concentration of component i in gas phase, and $q_{ei}$ is the gas concentration of component i in the adsorbent.

Point by Point (PBP) Correction of Breakthrough Curves of Wet $CO_2$ (FIG. 55)

Because the dead volumes of dry gas and wet gas breakthrough experiments are different, it is necessary to employ the PBP correction method (A. Rajendran, V. Kariwala & S. Farooq, *Chem. Eng. Sci.* 2008, 63, 2696-2706) to calibrate the breakthrough curves before comparing the breakthrough time of $CO_2$ under dry and wet conditions. In this method, the corrected breakthrough time was calculated as, $$t_{corrected} = t - t_b \qquad \text{Equation 9}$$

where t is the breakthrough time of a specific normalized flow rate $F/F_0$ in the breakthrough of adsorption column, and $t_b$ be the breakthrough time of the same normalized flow rate in the breakthrough experiment of a bypass column.

Gas Adsorption Experiments

Single component gas sorption isotherms were measured on a Micromeritics 3-FLEX surface area and porosity analyzer instrument. For all the analysis, as-made $Al(HCOO)_3$ (100 mg) was heated at 150° C. (423 K) for 24 h using smart VacPrep Micromeritics high vacuum degas instrument. After 24 h, the sample tubes were transferred into the analysis chamber and continued further in-situ activation at 150° C. (423 K) for additional 6 h using in-situ pre-heating Micromeritics 3-FLEX vacuum chamber. The temperature on the analysis bath was precisely controlled using a custom-made Heidolph magnetic stirrer Hei-Tec hotplate with Pt 1000 temperature sensor control system. A saturated solution of dry-ice and acetone mixture was used for the 195 K isotherms and liquid $N_2$ was used for the 77 K $N_2$ isotherms measurements.

Calculation of $CO_2/N_2$ Sorption Selectivity

The gas adsorption isotherms of $CO_2$ and $N_2$ were firstly fitted to the Langmuir (Equation 10) and Henry model (Equation 11), respectively, $$q = \frac{q_{sat} b p}{1 + bp} \qquad \text{Equation 10}$$

$$q = K_H p \qquad \text{Equation 11}$$

where q is the amount of adsorbed gas (mmol $g^{-1}$), p is the bulk gas phase pressure (kPa), $q_{sat}$ is the saturation amount (mmol $g^{-1}$), $K_H$ is the Langmuir-Freundlich parameter ($kPa^{-1}$), and is the Henry constant (mmol $g^{-1}$ $kPa^{-1}$).

Ideal adsorbed solution theory starts from the Raoults' Law type of relationship between fluid and adsorbed phase, $$P_i = P y_i = P_i^0 x_i \qquad \text{Equation 12}$$

$$\sum_{i=1}^n x_i = \sum_{i=1}^n \frac{P_i}{P_i^0} = 1 \qquad \text{Equation 13}$$

where $P_i$ is partial pressure of component i (kPa), P is total pressure (kPa), $y_i$ and $x_i$ represent mole fractions of component i in gas and adsorbed phase (dimensionless). $P_i^0$ is equilibrium vapour pressure (kPa).

In IAST, $P_i^0$ is defined by relating to spreading pressure $\pi$, $$\frac{\pi S}{RT} = \int_0^{P_i^0} \frac{q_i(P_i)}{P_i} dP_i = \prod(\text{Constant}) \qquad \text{Equation 14}$$

where $\pi$ is spreading pressure, S is specific surface area of adsorbent ($m^2$ $g^{-1}$), R is gas constant (8.314 J $K^{-1}$ $mol^{-1}$), T is temperature (K), $q_1(P_i)$ is the single component equilibrium obtained from isotherm (mmol $g^{-1}$).

For a Langmuir model, we have an analytical expression for the integral, $$\int_0^{P_i^0} \frac{q_i(P_i)}{P_i} dP_i = \prod (\text{Constant}) = q_{sat} \ln(1 + b_A P_0^i) \quad \text{Equation 15}$$

For a Henry model, the analytical expression for the integral is $$\int_0^{P_i^0} \frac{q_i(P_i)}{P_i} dP_i = \prod (\text{Constant}) = K_H P_i^0 \quad \text{Equation 16}$$

The isotherm parameters will be known from the previous fitting. For a binary component system, the unknowns will be $\Pi$, $P_1^0$, and $P_2^0$, which can be obtained by simultaneously solving Equation 12 and 14 via the Python package pyIAST (C. M. Simon, B. Smit & M. Haranczyk, *Comput. Phys. Commun.* 2016, 200, 364-380).

The adsorbed amount for each component in a mixture is $$q_i^{mix} = x_i q_T \quad \text{Equation 17}$$

$$\frac{1}{q_T} = \sum_{i=1}^n \frac{x_i}{q_i(P_i^0)} \quad \text{Equation 18}$$

Where $q_i^{mix}$ is the adsorbed amount of component i (mmol g$^{-1}$), $q_T$ is the total adsorbed amount (mmol g$^{-1}$).

The adsorption selectivity $S_{ads}$ can be calculated using Equation 19.

$$S_{IAST} = \frac{q_1/q_2}{p_1/p_2} \quad \text{Equation 19}$$

TGA CO$_2$ Cycling

TGA cycling experiments were measured on Q500 Thermogravimetry Analyzer. Cycling experiments were carried out under CO$_2$ gas flow (60 mL/min) with protective N$_2$ gas (40 mL/min) for mass balance. For analysis, fresh ALF (12 mg) was loaded on to the aluminium pan and equilibrated at 40° C. (313 K) for 120 min then heated up to 120° C. (393 K) with a heating rate of 2° C./min and then cooled down to 40° C. (313 K) with a cooling rate of 25° C./min. The same experimental condition was repeated for 5 conjugative cycles without changing the sample amount and material from the TGA chamber.

For humid CO$_2$/N$_2$ experiments, TGA cycling tests between 40° C. (313 K) to 80° C. (353 K) were conducted for 50 cycles using 3% humid CO$_2$/N$_2$(15/85). CO$_2$/N$_2$(15/85) gas flow rate was 20.0 mL/min, and CO$_2$/N$_2$(15/85) gas was exposed to the sample at 313 K for 30 min in each cycle before activation at 353 K.

DFT Calculated Lattice Parameters

Thermal expansion coefficients were calculated by performing the phonon calculations at different volumes (±1% and ±2%) using the finite displacement method with the Phonopy code (A. Togo & I. Tanaka, *Scr. Mater.* 2015, 108, 1-5) at the quasi-harmonic approximation (QHA) level. A higher kinetic energy cutoff of 800 eV and a denser 4×4×4 Monkhorst-Pack were used for all calculations. Interatomic forces were further relaxed until smaller than 0.001 eV/A.

Hydrolytic Stability Tests

Humidity studies were conducted on ALF samples made from as-made Al(HCOO)$_3$ (100 mg) samples that were activated for 24 h at 180° C. (453 K). Each ALF sample during the humidity stability studies was exposed to 85% humid water at 85° C. (85/85) for time periods in between 1 h to 24 h in a Labec QHT-30 temperature and humidity chamber with a relative humidity (RH) range of 25-98% and a temperature range of 20-120° C. After completion of respective exposure times (1 h to 24 h), each sample was then analyzed with PXRD, TGA, and CO$_2$ sorption tests.

CO$_2$ adsorption isotherms were measured following the hydrolytic treatment described above. Prior to the measurements, the samples (≈70 mg) were re-activated at 180° C. (453 K) for 24 h using smart VacPrep Micromeritics high vacuum degas instrument. All the isotherms were measured at 50° C. (323 K) on a Micromeritics 3-FLEX surface area and porosity analyzer instrument. After 24 h, the sample tubes were transferred into the analysis chamber and underwent further in-situ activation at 150° C. (423 K) for an additional 6 h using in-situ pre-heating Micromeritics 3-FLEX vacuum chamber. The temperature on the analysis bath was precisely controlled using Heidolph magnetic stirrer Hei-Tec hotplate with Pt 1000 temperature sensor control system.

DVS Experiments

Dynamic water vapor sorption measurements were performed on a gravimetric instrument (Hiden IGAsorp-CT, Warrington, UK) using CO$_2$ or N$_2$ as the carrier gas. The sample was first loaded at laboratory ambient conditions (21° C. (294 K), 40% RH) and dried in situ by flowing dry nitrogen gas through the sample chamber at 120° C. (393 K) for 6 h. After drying, the temperature was lowered to 50° C. (323 K). When CO$_2$ was used as the carrier gas, the inlet gas was switched at this point and the sample equilibrated for at least 2 h until the mass was stable within 0.01 mg/min. Thereafter, the sample chamber was regulated to the measurement temperature (either 313 K, 323 K, or 333 K) and held for another 2 h.

An adsorption-desorption cycle was performed by sequentially ramping the relative humidity (RH) from 0% to 90%/95%, and back to 0% in fixed increments no more than 10% RH. RH is controlled by varying the proportion of dry and wet gas flowing into the sample chamber. For runs with CO$_2$ as carrier, direct measurement of RH is not possible due to sensor incompatibility and hence the RH is approximated by the relative proportion of wet gas, which is termed "wet concentration". The mass change of the sample was recorded in real time and normalized against the initial (dry) weight. Cycles were repeated at least two times at each temperature, and the data for the second run are reported in FIG. 10.

Due to mass loss of the samples throughout the measurements, only the run at 30° C. (313 K) and CO$_2$ as carrier is reflective of multicomponent equilibria in ALF sorbent. The equilibrium uptake was estimated by instrument-accompanying analysis method, which regresses real time kinetic data against an exponential uptake function. Isothermal uptake data for this run were reported as % mass change against 'wet concentration' analogous to the DVS runs.

Results and Discussion

As shown in FIG. 11a-b, despite the microporosity of ALF, it did not adsorb N$_2$ at 298 K, and indeed at all practically useful temperatures (see FIG. 17), but readily adsorbed CO$_2$ at and above 273 K. Interestingly, the low-pressure CO$_2$ uptake was substantial, and persisted to 323 K with noticeable desorption hysteresis loops, suggesting appreciable diffusion barriers for CO$_2$ in the SC/SC channels of ALF (see FIG. 18). ALF's affinity for water was much reduced compared with other leading MOFs that are known to be hydrophilic, such as MOF-74-Ni and UiO-66-(OH)$_2$ (FIG. 11c), but it is not negligible, as discussed below.

Although most experimental screening efforts concentrate on CO$_2$ uptake at near-ambient temperature (298 K), the practical implementation favors a slightly higher operating temperature due to other pretreatment units for post-combustion flue gas. ALF performed well under these conditions, as shown by our dynamic column breakthrough experiments at 323 K using a simulated feed (15/85 mixture of CO$_2$ and N$_2$). The CO$_2$ concentration front was substantially delayed compared to that of N$_2$ because of selective adsorption by ALF packed within the column (FIG. 11d). The calculated capacity of CO$_2$ coadsorption was 0.9 mmol g$^{-1}$, whereas the N$_2$ counterpart was barely detectable (<0.1 mmol g$^{-1}$). Furthermore, these characteristics are largely retained in the presence of SO$_2$ and NO (FIG. 11k, suggesting excellent stability of ALF against corrosive gases. In terms of the system's cyclability, the guest-free MOF could be regenerated by heating to 353 K under a CO$_2$ atmosphere and was stable over more than 100 cycles (FIG. 19, top panel). At 298 K, N$_2$ eluted through the column a few min before CO$_2$ broke through (FIG. 11g), which confirms the feasibility of capturing CO$_2$ from N$_2$. The coadsorption CO$_2$ uptake of ALF was about 2.3 mmol/g (3.3 mmol/cm$^3$). At 323 K, the column was still able to separate CO$_2$ from N$_2$ as shown in FIG. 11h, maintaining an impressive CO$_2$ uptake of 0.89 mmol g$^{-1}$ (1.3 mmol/cm$^3$) and a CO$_2$/N$_2$ sorption selectivity of about 100 based on 4 repeated experiments (FIG. 11i).

Considering that water vapor in post-combustion flue gas may not only compete with CO$_2$ for gas sorption sites in MOFs but also amorphize the crystalline frameworks, it is crucial to study water sorption in ALF and investigate how moisture in the feeding gas will compromise the CO$_2$ capture performance of the column. Therefore, we explored the performance of ALF under wet flue gas conditions. Experiments in which columns were pre-saturated by moisture (RH=80.5%) maintained 70% of their CO$_2$ dynamic capacity (FIG. 11e). In addition, CO$_2$ broke through the column slightly earlier than the dry scenario, and the reduction in CO$_2$ uptake capacity was only about 17% compared to the uptake of the dry column. This suggests that CO$_2$ is capable of out-competing H$_2$O guests for sites within ALF. Usually, this level of CO$_2$-preference versus H$_2$O in MOFs requires chemisorption sites like alkyl amine moieties (Table 5). In FIG. 11f, the performance of ALF was compared with other leading MOFs, and it was shown that ALF outperformed MOF-74-Ni and UiO-66-(OH)$_2$ under wet conditions. While these results suggest that ALF exhibits promising physisorptive CO$_2$ capture characteristics under wet post-combustion flue gas conditions, further experiments have shown that the system is nevertheless sensitive to moisture under certain circumstances. As can be seen from DVS experiments performed on ALF at 303 K, 313 K, and 323 K with N$_2$ or CO$_2$ carrier gases (FIG. 10), at 303 K, ALF could withstand water concentrations up to 90% saturation without degradation with CO$_2$ carrier gas. However, at 313 K and 323 K, there was =2% mass loss with CO$_2$ carrier gas. Under N$_2$, degradation occurred at all tested temperatures. A noticeable difference between the N$_2$ and CO$_2$ experiments is that the degradation of ALF is approximately 3 to 4-fold less when CO$_2$ is used as the carrier gas. This indicates that the presence of CO$_2$ imparts a partial defence against water-induced material degradation. These DVS experiments indicate that although ALF likely cannot be used to directly treat post combustion flue gas saturated with moisture, it shows promise when coupled with a suitable upstream drying technology. Drying to ALF's stability envelope (≈25% RH at 323 K) may be realised by relatively cheap and facile approaches such as cooling and condensation (K. T. Leperi, R. Q. Snurr & F. You, *Ind. Eng. Chem. Res.* 2016, 55, 3338-3350), contrasting the necessity for deep drying to as low as <100 ppm [dew point: −40° C. (233 K)] to circumvent binding site poisoning for highly hygroscopic sorbents. Isothermal uptake data for the DVS run at 30° C. (313 K) were reported as % mass change against 'wet concentration' analogous to the DVS runs and shown in FIG. 20. Furthermore, ALF's resilience to humidity near room temperature facilitates easy handling and storage without inert atmosphere or other cumbersome precautions if used on an industrial scale.

Interestingly, ALF only adsorbed 55 cm$^3$/g (2.4 mmol/g or 3.5 mmol/cm$^3$) of water at 90% RH and 298 K, which is much lower than the water uptake of other MOF materials for CO$_2$ capture such as MOF-74-Mg (D.-A. Yang et al., *Energy Environ. Sci.* 2012, 5, 6465-6473) and UiO-66(Zr)—(OH)$_2$ (Z. Hu et al., *AIChE J.* 2017, 63, 4103-4114). Moreover, the linear isotherm (FIG. 11j) contrasts noticeably with the type I H$_2$O sorption isotherms of those hydrophilic MOFs, suggesting a much weaker water affinity of ALF. These CO$_2$ capture results along with the ready availability of ALF promise unlimited potential of the material for industrial CO$_2$ capture applications.

TABLE 5

A summary of CO$_2$ capture properties of selected porous adsorbents in literature.

| Adsorbents | BET Surface Area/m$^2$ g$^{-1}$ | Pore Size/Å (Å$^2$) | CO$_2$ Uptake/ mmol g$^{-1}$ [a] | CO$_2$ Uptake/ mmol cm$^{-3}$ [b] | Low Coverage $Q_{st}$/kJ mol$^{-1}$ | CO$_2$/N$_2$ Selectivity [c] | Water Competition Studied | CO$_2$ Uptake after Contact with Water/ mmol g$^{-1}$ (Percentage of Retained CO$_2$ Uptake; RH) | Reference |
|---|---|---|---|---|---|---|---|---|---|
| Physisorbents - MOFs | | | | | | | | | |
| ALF | 588 | 4.1, 4.5 | 2.7 | 3.9 | 47.9 | 368 | Yes [d] | 0.56 (70.0%; 80%) at 323 K | This work |
| MOF-74-Ni | 941 | 10 | 3.4 | 4.1 | 38 | 32 | Yes [d] | 0.06 (3.8%; 80%) at 323 K | This work, Inorg. Chem. 2019, 58, 2717-2728 |

TABLE 5-continued

A summary of $CO_2$ capture properties of selected porous adsorbents in literature.

| Adsorbents | BET Surface Area/m$^2$ g$^{-1}$ | Pore Size/Å (Å$^2$) | $CO_2$ Uptake/ mmol g$^{-1}$ $^{a)}$ | $CO_2$ Uptake/ mmol cm$^{-3}$ $^{b)}$ | Low Coverage $Q_{st}$/kJ mol$^{-1}$ | $CO_2/N_2$ Selectivity $^{c)}$ | Water Competition Studied | $CO_2$ Uptake after Contact with Water/ mmol g$^{-1}$ (Percentage of Retained $CO_2$ Uptake; RH) | Reference |
|---|---|---|---|---|---|---|---|---|---|
| UiO-66-(OH)$_2$ | 1230 | 3.9 × 5.8 | 2.5 | 3.4 | 33 | 105 | Yes $^{d)}$ | 0.10 (11.5%; 80%) at 323 K | This work, AIChE J. 2017, 63, 4103-4114 |
| MOF-74-Mg | 1640 | 10 | 5.8 | 5.3 | 52 | 182 | Yes $^{e)}$ | Degraded after contact with moisture | Nat. Commun. 2012, 3, 1-9; Proc. Nat. Acad. Sci. U.S.A. 2009, 106, 20637-20640; Angew. Chem. Int. Ed. 2015, 54, 14372-14377; and Energy Environ. Sci. 2011, 4, 3030-3040 |
| ZnF(daTZ) | 479 | 4.2 | 0.96 | 1.8 | 33 | 120 | Yes $^{e)}$ | 0.94 (98%; 99%) at 298 K | J. Am. Chem. Soc. 2020, 142, 2750-2754 |
| IISERP-MOF2 | 470 | 4.7 | 1.6 $^{f)}$ | 2.0 | 33 | 1800 | Yes $^{e)}$ | 3.7 (92.7%; 50%) at 298 K | J. Am. Chem. Soc. 2017, 139, 1734-1737 |
| MUF-16 | 214 | 3.6 × 7.6 | 1.2 $^{g)}$ | 1.9 | 32.3 | 631 $^{h)}$ | Yes $^{e)}$ | N.A. (N.A.; 82%) at 293 K | ACS Appl. Mater. 2021, 13, 2141-12148 |
| SIFSIX-2-Cu-i | 734 | 5.2 | 1.7 $^{g)}$ | 2.1 | 31.9 | 140 $^{i)}$ | Yes $^{e)}$ | 1.6 (≈81%; 74%) at 298 K | Nature 2013, 495, 80-84 |
| UTSA-16 | 687 | 4.3 × 9.5 | 2.1 | 3.5 | 39.7 | 315 | Yes $^{j)}$ | N.A. | Nat. Commun. 2012, 3, 1-9; Phys. Chem. Chem. Phys. 2016, 18, 220-227; and Chem. Eng. J. 2020, 402, 126166 |
| NbOFIVE-1-Ni | 280 | 3.2 | 2.2 | 3.9 | 50 | N.A. | Yes $^{j)}$ | N.A. (N.A.; 75%) at 298 K | J. Am. Chem. Soc. 2016, 138, 9301-9307 |
| SIFSIX-3-Cu | 300 | 3.5 | 2.5 | 4.0 | 54 | N.A. | Not studied | N.A. | Nat. Commun. 2014, 5, 1-7 |

TABLE 5-continued

A summary of CO₂ capture properties of selected porous adsorbents in literature.

| Adsorbents | BET Surface Area/m$^2$ g$^{-1}$ | Pore Size/Å (Å$^2$) | $CO_2$ Uptake/ mmol g$^{-1}$ [a] | $CO_2$ Uptake/ mmol cm$^{-3}$ [b] | Low Coverage $Q_{st}$/kJ mol$^{-1}$ | $CO_2/N_2$ Selectivity [c] | Water Competition Studied | $CO_2$ Uptake after Contact with Water/ mmol g$^{-1}$ (Percentage of Retained $CO_2$ Uptake; RH) | Reference |
|---|---|---|---|---|---|---|---|---|---|
| Qc-5-Cu-sql-b | 222 | 3.3 | 0.8 [g] | 1.2 | 36 | 40000 | Not studied | N.A. | Angew. Chem. Int. Ed. 2016, 128, 10424-10428 |
| Physisorbents - Covalent Organic Frameworks (COFs) ||||||||||
| [HO$_2$C]$_{100\%}$-H$_2$P-COF | 364 | 14 | 4.0 [k] | 1.0 | 43.5 | 77 | Not studied | N.A. | Angew. Chem. Int. Ed. 2015, 127, 3029-3033 |
| ATFG-COF | 520 | 6, 13 | 0.89 | 0.84 | ≈50 | 65 | Not studied | N.A. | Chem. Mater. 2015, 27, 7874-7881 |
| JUC-505 | 1584 | 16.8 | 4.3 | 3.9 | N.A. | 65.6 [l] | Not studied | N.A. | Nat. Chem. 2019, 11, 587-594 |
| Physisorbents - Zeolites ||||||||||
| Zeolite 13X | 570 | 10 | 2.7 | 3.1 | 54 | 146 | Yes [j] | 0.01 (0.18%; 74%) at 294 K | Energy Environ. Sci. 2011, 4, 3030-3040; and Adsorption 2020, 26, 765-779 |
| Fe-MOR(0.25) | 282 | 5.3 | 3.2 | 7.4 | 11 | 10$^{132}$ | Yes [e] | N.A. (N.A.; 73%) at 298 K | Science 2021, 373, 315-320 |
| SGU-29 | N.A. | 4.5 × 7.3 | 3.5 | 6.9 | 51.3 | 3515 [i] | Yes [e] | 2.6 (98%; 90%) at 298 K | Science 2015, 350, 302-306 |
| Chemisorbents ||||||||||
| MOF-74-Mg-(N$_2$H$_4$)$_{1.8}$ | 1012 | N.A. | 5.2 | 6.1 | 118 | N.A. | Yes [d] | 4.8 (98%; 82%) at 313 K | Chem. Sci. 2016, 7, 6528-6533 |
| Co$_2$Cl$_2$(bbta)(OH) | 1286 | ≈11 | 4.0 | 5.4 | 110 | 262 | Yes [d] | 2.5 (≈100%; 82%) at 313 K | Energy Environ. Sci. 2015, 8, 1011-1016 |
| mmem-Mg$_2$(dobpdc) | 675 | N.A. | 3.5 | 3.8 | 70 | N.A. | Yes [e] | 2.7 (N.A.; N.A.) at 313 K | Nature 2015, 519, 303-308 |
| mmen-CuBTTri | 870 | N.A. | 2.4 | 2.5 | 96 | 327 [m] | Not studied | N.A. | Chem. Sci. 2011, 2, 2022-2028 |

TABLE 5-continued

A summary of $CO_2$ capture properties of selected porous adsorbents in literature.

| Adsorbents | BET Surface Area/m$^2$ g$^{-1}$ | Pore Size/Å (Å$^2$) | $CO_2$ Uptake/ mmol g$^{-1}$ [a] | $CO_2$ Uptake/ mmol cm$^{-3}$ [b] | Low Coverage $Q_{st}$/kJ mol$^{-1}$ | $CO_2/N_2$ Selectivity [c] | Water Competition Studied | $CO_2$ Uptake after Contact with Water/ mmol g$^{-1}$ (Percentage of Retained $CO_2$ Uptake; RH) | Reference |
|---|---|---|---|---|---|---|---|---|---|
| Mg$_2$(dobpdc)(3-4-3) | N.A. | N.A. | 3.5 [n] | N.A. | 99 | N.A. | Yes [d] | 2.0 (N.A.; N.A.) at 373 K | Science 2020, 369, 392-396 |
| (PEI-25-APTES-25)-PQCS2129 | <319 | <316 | 3.1 [o] | N.A. | 56 | N.A. | Yes [p] | 2.4 (86%; N.A.) at 333 K | Energ. Fuel 2012, 26, 2483-2496 |

[a] Unless otherwise stated, the uptake was measured at 298 K and 0.15 bar.
[b] Calculated based on the gravimetric uptakes on the left and crystallographic density of the sorbents.
[c] Determined by IAST theory for a 15/85 $CO_2/N_2$ mixture at 298 K and 1 bar.
[d] Wet gas breakthrough after column pre-saturation.
[e] Wet gas breakthrough without column pre-saturation.
[f] $CO_2$ uptake at 303 K and 0.15 bar.
[g] $CO_2$ uptake at 293 K and 0.1 bar.
[h] The IAST selectivity is derived based on a flue gas composition of 15% $CO_2$ and 85% $N_2$ at a total pressure of 1 bar at 293 K.
[i] The IAST selectivity is derived based on a flue gas composition of 10% $CO_2$ and 90% $N_2$ at a total pressure of 1 bar at 298 K
[j] Wet gas breakthrough experiment without column pre-saturation but $CO_2$ being replaced by H2O was observed.
[k] The uptake was measured at 273 K and 1 bar.
[l] The selectivity was estimated by the ratio of the Henry's constants of $CO_2$ and $N_2$ at 295 K.
[m] The IAST selectivity is derived based on a flue gas composition of 15% CO2, 75% N2 and 10% other gases, at a total pressure of 1 bar at 298 K
[n] $CO_2$ uptake at 373 K and 0.1 bar
[o] $CO_2$ uptake at 313 K and 0.1 bar
[p] Wet gas breakthrough without column pre-saturation but $CO_2$ concentration level reached the baseline level at the end of breakthrough experiment.

TABLE 6

Data obtained from breakthrough experiments of the columns packed with ALF using dry 15/85 $CO_2/N_2$ mixed gas at 50° C. (323K).

| Cycles | 1 | 2 | 3 | 4 |
|---|---|---|---|---|
| $CO_2$ Corrected Mean Residence Time/s | 959 | 1011 | 1036 | 977 |
| $N_2$ Corrected Mean Residence Time/s | 21 | 13.2 | 27 | 22 |
| $CO_2$ $q_e/C_0$ | 178.8 | 188.5 | 189.1 | 185.8 |
| $N_2$ $q_e/C_0$ | 3.6 | 2.1 | 4.6 | 3.8 |
| $CO_2/N_2$ Selectivity | 50 | 89 | 41 | 48 |
| $CO_2$ specific capacity/ mmol g$^{-1}$ | 0.79 | 0.81 | 0.81 | 0.80 |
| $N_2$ specific capacity/mmol g$^{-1}$ | 0.089 | 0.052 | 0.11 | 0.094 |

TABLE 7

Data obtained from breakthrough experiments of the columns packed with ALF using wet 15/85 $CO_2/N_2$ mixed gas at 50° C. (323K).

| Cycles | 1 | 2 | 3 |
|---|---|---|---|
| $CO_2$ Corrected Mean Residence Time/s | 737 | 807 | 745 |
| $CO_2$ $q_e/C_0$ | 125.4 | 137.4 | 126.8 |
| $CO_2$ specific capacity/mmol g$^{-1}$ | 0.57 | 0.62 | 0.57 |

TABLE 8

Data obtained from breakthrough experiments of the columns packed with MOF-74-Ni and UiO-66-(OH)$_2$ using wet 15/85 $CO_2/N_2$ mixed gas at 50° C. (323K).

| Cycles | $CO_2$ Corrected Mean Residence Time/s | $CO_2$ $q_e/C_0$ | $CO_2$ specific capacity/ mmol g$^{-1}$ |
|---|---|---|---|
| MOF-74-Ni | 84.7 | 50.9 | 0.062 |
| UiO-66-(OH)$_2$ | 93.5 | 56.3 | 0.10 |

To probe why ALF adsorbs $CO_2$ so effectively, DFT calculations were performed to map the energy landscapes of both $CO_2$ and $N_2$ inside the two cavities (SCs and LCs) of ALF (FIG. 5c-d, N. Nijem et al., *J. Am. Chem. Soc.* 2012, 134, 15201-15204). The DFT adsorption energies of $CO_2$, $N_2$, and $H_2O$ were computed within the generalized gradient approximation, where the exchange-correlation functional was approximated as proposed by Perdew-Burke-Ernzerhof (J. P. Perdew, K. Burke & M. Ernzerhof, *Phys. Rev. Lett.* 1996, 77, 3865). Van der Waals forces were accounted for with the DFT-D3 correction scheme proposed by Grimme et al. (S. Ehrlich et al., *Chem. Phys. Chem.* 2011, 12, 3414-3420).

ALF showed excellent adsorption of $CO_2$ at room temperature, giving a loading of ~4 mmol/g (~5.7 mmol/cm$^3$) at 1 atm, but virtually no adsorption of nitrogen (FIG. 21a). The capacity can be fine-tuned by doping the Al(COOH)$_3$ with other trivalent metal ions such as Fe, V, i.e., Al$_{1-x}$Fe$_x$(HCOO)$_3$V$_{1-x}$Al$_x$(HCOO)$_3$. The remarkable selectivity is a consequence of the smaller diameter of $CO_2$ compared with $N_2$ and provides the basis for the separation of $CO_2$ from flue gas, as described below. For comparison, FIGS. 21b and 52 show that there was no adsorption of $CO_2$ into the as-made Al(HCOO)$_3$; nor was there any adsorption of $N_2$ into the as-made Al(HCOO)$_3$ (FIG. 21c).

From the adsorption energies of $CO_2$ and $N_2$ in ALF presented in Table 9, two main conclusions were drawn: i) the adsorption energy was greater for $CO_2$ than $N_2$ in both cavities, and ii) $CO_2$ preferentially adsorbed in the SC of ALF, whereas $N_2$ showed no preference for either cavity. These results are further emphasized in FIGS. 5c and 5d which show that in the SCs, $CO_2$ preferred to orient along the c-axis toward the inward-pointing hydrogens, whereas the energy landscape was flat in the LC with a slight preference for the center of the cavity. For $N_2$, the energy landscape was flat for both the SC and LC, with a slight preference to the center of the cavity. DFT calculations (Table 9) also showed that $H_2O$ (−51.3 kJ/mol) adsorption was slightly more favorable than $CO_2$ (−48.4 kJ/mol) in the SC, whereas the $CO_2$ adsorption was strongly preferred in the LC. The similarity in adsorption energies of $CO_2$ and $H_2O$ implies less adverse competition for binding sites between $CO_2$ and $H_2O$, compared to other hydrophilic materials (−60 kJ/mol<$\Delta H$<−100 kJ/mol) where $H_2O$ binding energies/enthalpies are substantially higher. This is initially suggested by the substantial retention of dynamic capacity in the wet gas breakthrough experiments and modelled mixture adsorption profiles (FIG. 22).

TABLE 9

Adsorption energies from first-principles calculations (in kJ/mol) and experimental isosteric enthalpy of adsorption. The isosteric enthalpy of adsorption is measured at low molecular loadings (≈1 mmol/g) from the $CO_2$ gas adsorption isotherms (FIG. 23), and is in good agreement with the DFT results for the SC.

| Molecule | SC (kJ/mol) | LC (kJ/mol) | Isosteric enthalpy of adsorption (kJ/mol) |
|---|---|---|---|
| $CO_2$ | −48.4 | −36.2 | −47.7 |
| $N_2$ | −28.4 | −28.6 | — |
| $H_2O$ | −51.3 | −28.8 | — |

FIG. 24a illustrates the Rietveld refinement fits of ALF with and without $CO_2$. Non-deuterated samples of ALF were used for all NPD experiments, which led to a sloping background because of the incoherent scattering of hydrogen. As seen in FIG. 25, with increasing temperature, the unit cell of ALF increased monotonically between 60 K and 320 K with a near-constant unit cell value between 15 K and 60 K. As ALF has an $ReO_3$-type structure (H. A. Evans et al., Nat. Rev. Mater. 2020, 5, 196-213), it would reasonably be expected to observe negative thermal expansion. However, only approximate zero thermal expansion (ZTE) was seen below 50 K. The volumetric thermal expansion coefficient for ALF between 60 K and 300 K was =33×10$^{-6}$ K$^{-1}$ (FIG. 29).

FIG. 24a-b show selected results from NPD experiments on $CO_2$ adsorbed into ALF performed at 320 K with various partial pressures of $CO_2$. This temperature was chosen based on the isotherms of pure $CO_2$ (FIG. 18), which indicated that, relative to 300 K, $CO_2$ adsorption at 320 K had improved kinetics. It can be seen from the top panel of FIG. 24b that when ALF was exposed to increasing pressures of $CO_2$, the lattice parameter of ALF gradually contracted. We note that the increased $CO_2$ adsorption seen between 273 K and 323 K (FIG. 11a) is likely due to the expansion of the ALF unit cell over this temperature range, as well as the increased dynamics of the formate groups.

The bottom panel of FIG. 24b shows the increasing crystallographic occupancies of $CO_2$ in both the SCs and LCs as the pressure increases. It was noted that the occupancy of $CO_2$ in the SCs was consistently higher than that in the LCs (FIG. 24b), which was consistent with the adsorption energies from DFT (Table 9). At the highest $CO_2$ loading in FIG. 24b, the occupancy of the SC was ≈90%, whereas that of the LC was =50%, giving an approximate overall composition of $Al(HCOO)_3 \cdot (CO_2)_{0.78}$ (recalling that there are three times as many SCs than LCs). This occupancy corresponds to a $CO_2$ loading of =4.8 mmol/g. The $CO_2$ loading into ALF under these conditions is slightly increased when compared with the initial level of $CO_2$ present in the as-made $Al(HCOO)_3$ as the latter only accommodated $CO_2$ in the SCs (Y.-Q. Tian et al., Inorg. Chem. 2007, 46, 1612-1616).

Example 4. Comparison Between the SCs Hand-In-Glove Hydrogen Bonding Association with $CO_2$ Equilibrium-Based Process Modelling for ALF and Comparison with Literature-Reported Sorbents The essential principle behind adsorption separation is to exploit the difference in interactions of various components of the gas mixture with the porous media. A typical process will involve an adsorption phase where the feed gas is contacted with the porous media and $CO_2$ is preferentially sequestered, as well as a desorption phase at a different condition permitting the release of the trapped $CO_2$ from the sorbent. In general, regeneration is affected by decreasing the pressure (accordingly, pressure- or vacuum-swing adsorption, P/VSA) or increasing the temperature (accordingly, TSA).

The water affinity in ALF and a variety of other reported sorbents implies an uptake of water similar, if not exceeding, $CO_2$; hence, water is recovered alongside $CO_2$ as a heavy component. It is preferable to operate with part, if not all, of the cycle at an elevated temperature so as to circumvent the use of high vacuum (PL<<0.1 bar) for the sorbent regeneration. Since the saturation pressure of water is ~ 7 kPa at 313 K, it is impossible to extract water as a pure stream from the sorbent by applying vacuum higher than this level.

In light of the above consideration, we applied an equilibrium-based model of a TSA cycle with the purpose of estimating the process-level performance of ALF relative to other benchmark adsorbents. The model was described by Ajenifuja et al. (A. Ajenifuja, L. Joss & M. Jobson, Ind. Eng. Chem. Res. 2020, 59, 3485-3497) and covers a basic three-step process with adsorption, heating, and cooling steps (FIG. 30), with the following simplifying assumptions:
1. The bed is well-mixed during the heating and cooling steps;
2. During the adsorption step, a discontinuous profile separating the initial concentration from the feed concentration propagates through the bed until breakthrough;
3. The pressure drop in the bed is negligible;
4. The adsorbed and gas phases are in thermal and chemical equilibrium;
5. Heat-transfer resistances are negligible;
6. The specific heat capacity of the gas phase is negligible; and
7. The gas phase is accurately described by the ideal gas law.

The $CO_2$ capture performance was analyzed based on 4 performance indicators of the adsorbents, namely, product purity, product recovery, cyclic working capacity, and specific thermal energy requirement.

The $CO_2$ purity is defined as $$\text{Product purity} = \frac{N_{CO2,recovered}}{N_{CO2,recovered} + N_{N2,recovered}} \quad \text{Equation 20}$$

Where $N_{CO2/N2,recovered}$ is the molar amount of $CO_2$ or $N_2$ recovered in the heating step. The recovery is defined as $$\text{Recovery} = \frac{N_{CO2,recovered}}{y_{CO2,feed} N_{feed}} \quad \text{Equation 21}$$

Where $y_{CO2,feed}$ is the $CO_2$ composition in the feed, and $N_{feed}$ is the total molar amount of gases fed into the bed.

The cyclic working capacity, WC, is the molar amount of $CO_2$ recovered per unit mass of the adsorbent $$WC = \frac{N_{CO2,recovered}}{m} \quad \text{Equation 22}$$

The specific thermal energy requirement, $sp_{thermal}$, is the amount of heat required during the heating step per unit production of $CO_2$ $$sp_{thermal} = \frac{Q^{heat}}{N_{CO2,recovered} \cdot Mw_{CO2}} \quad \text{Equation 23}$$

Where $Q^{heat}$ is the total amount of energy input required by the heating step and $Mw_{CO2}$ is the molecular weight of $CO_2$.

FT-IR Spectroscopy

FT-IR spectra were obtained using an Agilent Technologies Cary 600 series FTIR spectrometer operating at ambient temperature. KBr was used as the window material for all the measurements. For the $CO_2$ reloaded experiments, $CO_2$ gas was passed into activated ALF (0.5 g) for 2 h at ambient conditions and the FT-IR spectra was measured by pressing it into a transparent thin pellet with KBr. For the water stability tests, 0.5 g of activated ALF was soaked in distilled water (7 mL) at room temperature for 12 h. The vacuum filtered air-dried ALF was directly taken for FT-IR analysis.

Results and Discussion

The comparison between the SCs hand-in-glove hydrogen bonding association with $CO_2$ relative to the LCs is shown in FIG. 5e-f. In our model, $CO_2$ moved through the LC/SC channel more efficiently because of the larger window size along the LC/SC channel. Thus, the distinctive feature of ALF is that these windows appeared to be just large enough to permit the facile adsorption of $CO_2$ but not large enough to permit the adsorption of $N_2$, noting that the kinetic diameter of $CO_2$ (≈3.3 Å) is slightly smaller than that of $N_2$ (≈3.64 Å) (A. F. Ismail, K. Khulbe & T. Matsuura, Gas Separation Membranes: Polymeric and Inorganic, Springer, 2015 ISBN 3319010956.). This subtle size difference enabled ALF to achieve the observed kinetic separation of $CO_2$ and $N_2$. It is also important to note that although ALF has a favourable HOA for $H_2O$ (FIG. 24b), in practice, it is not as hydrophilic as UiO-66-(OH)$_2$ and MOF-74-Ni (FIG. 11c). Even soaking of ALF in water did not present any diffraction (FIG. 3) or spectroscopic evidence (FIG. 31) for $H_2O$ being inside the material at 12 h of exposure. As can be seen from the different FT-IR spectra (FIG. 31), upon activation, there was a loss of the —OH signal near ≈3400 cm$^{-1}$ due to the loss of $H_2O$. Upon reloading ALF with $CO_2$, the asymmetric stretch of $CO_2$ near=2350 cm$^{-1}$ appeared. The inventors believe that the emergence of the asymmetric $CO_2$ stretch is due to the quenching of the asymmetric stretch by the hydrogen bonding in the SC, and only when $CO_2$ exists in the LC after $CO_2$ reloading does this stretch appear. This was also confirmed with a neutron experiment, where the material was exposed to air for over three weeks, with no observed increase to the incoherent background in the pattern (FIG. 32). These results indicate that water adsorption is kinetically inhibited, enabling ALF to adsorb $CO_2$ from a flue gas stream that is rich in both $N_2$ and water.

ALF has some other attractive features that set it apart from other MOF sorbents. Importantly, it is readily prepared on a kilogram scale in the laboratory (FIG. 33) with formic acid acting as both a reactant and a solvent, so no additional solvent is required. We estimated that the materials cost for obtaining ALF on the metric tonne scale from two commodity chemicals, aluminum hydroxide and formic acid, is only ≈$1000 per tonne, making it substantially cheaper than any of the other MOF alternatives. We proposed that this cost reduction could enable the inclusion of a drying step in the flue gas treatment process costing as low as $2 per tonne $CO_2$ captured in certain embodiments (M. M. F. Hasan et al., Ind. Eng. Chem. Res. 2012, 51, 15665-15682). Furthermore, ALF has excellent mechanical properties (Table 10) that are superior to those of most MOFs (J. C. Tan & A. K. Cheetham, Chem. Soc. Rev. 2011, 40, 1059-1080), wherein it can be pelletized and even ball-milled while retaining performance (FIG. 34). ALF also benefits from good volumetric performance on account of its relatively high density (Table 5). Lastly, preliminary process modelling indicates that ALF meets the purity and recovery requirements set forth by the US Department of Energy when operated in a simple heat-regenerated cycle. The performance, again, is favourable compared to that of other leading MOF systems (Table 11; FIG. 35-37).

TABLE 10

Calculated polycrystalline Young's modulus (E, in GPa), bulk modulus (B, in GPa), shear modulus (G, in GPa) and Poisson's ratio (v) from DFT. Exp. is for experiment.

| Compound | Work | E | B | G | v |
| --- | --- | --- | --- | --- | --- |
| ALF | DFT, this work | 30.56 | 18.32 | 12.51 | 0.22 |
| Mg—MOF-74 | DFT (Chem. Sci. 2018, 9, 5197-5206) | 8.97 | 10.05 | 3.32 | 0.35 |
| MOF-5 | DFT (Phys. Rev. B. 2007, 76, 184106) | 9.57 | 17.57 | 3.39 | 0.41 |
| ZIF-8 | Exp. (Phys. Rev. Lett. 2012, 108, 095502) | 3.15 | 7.75 | 1.10 | 0.43 |
| HKUST-1 | DFT (J. Phys. Chem. Lett. 2013, 4, 925-930) | 7.23 | 24.53 | 2.49 | 0.45 |
| UiO-66 | DFT (J. Phys. Chem. Lett. 2013, 4, 925-930) | 42.38 | 41.02 | 15.96 | 0.33 |
| MIL-47 | DFT (Phys. Rev. Lett. 2012, 109, 195502) | 25.31 | 20.18 | 9.80 | 0.29 |

TABLE 11

Ranking by working capacity of "top sorbents" as identified in Ajenifuja et al. (A. Ajenifuja, L. Joss & M. Jobson, Ind. Eng. Chem. Res. 2020, 59, 3485-3497), filtered using a minimum performance threshold of 83% purity and 80% recovery.

| Ranking | Pur | Rec | WC/mol $CO_2$ $kg^{-1}$ | SP_TH/MJ $kg^{-1}$ $CO_2$ | $T_a$/K | $T_d$/K |
|---|---|---|---|---|---|---|
| CaA | 0.925 | 1.000 | 2.946 | 2.075 | 298 | 418 |
| Mg-MOF-74 | 0.840 | 0.884 | 2.777 | 1.762 | 298 | 418 |
| NaX | 0.958 | 0.982 | 2.749 | 2.057 | 298 | 418 |
| Co-MOF-74 | 0.851 | 0.895 | 2.352 | 2.136 | 298 | 418 |
| PPN-6-CH2TETA | 0.989 | 0.922 | 2.313 | 2.382 | 298 | 418 |
| CaX | 0.921 | 0.936 | 2.238 | 2.139 | 298 | 418 |
| UTSA-16 | 0.957 | 0.843 | 2.204 | 2.232 | 298 | 418 |
| MgX | 0.939 | 0.931 | 2.153 | 2.241 | 298 | 418 |
| Al-rho-ZMOF | 0.964 | 0.955 | 1.891 | 2.566 | 298 | 418 |
| mmen-CuBTTri | 0.963 | 0.977 | 1.855 | 2.812 | 298 | 418 |

To validate the modelling procedure, we repeated the screening exercise in Ajenifuja et al. (A. Ajenifuja, L. Joss & M. Jobson, Ind. Eng. Chem. Res. 2020, 59, 3485-3497), using a feed of 12% $CO_2$ and 88% $N_2$ at operating pressure of 1 bar. The sorbents were screened for adsorption temperatures ($T_a$) ranging from 298 K to 358 K and desorption temperatures $T_d$ ranging from 318 K to 418 K, corresponding to the use of cooling water and low-pressure steam for the cold and hot utilities. The isotherm parameters for sorbents other than ALF were adopted from Khurana and Farooq (K. Maninder & S. Farooq, Ind. Eng. Chem. Res. 2016, 55, 2447-2460). Due to the limited availability of specific heat capacity data for the pool of sorbents considered, this parameter was set at 1070 J $kg^{-1}$ $K^{-1}$. The application of a performance filter of 83% purity and 80% recovery perfectly reproduces the ranking by working capacity in the study of Ajenifuja and coworkers (A. Ajenifuja, L. Joss & M. Jobson, Ind. Eng. Chem. Res. 2020, 59, 3485-3497). It is worth noting that 83% purity and 80% recovery threshold falls short of the often quoted 95% purity, 90% recovery DOE targets (Compendium of Carbon Capture Technology, U.S. Dept. of Energy, 2020), which have been proposed on the basis of capture unit efficiency and downstream processing considerations. Therefore, we repeated the evaluation using 95% purity and 90% recovery targets alongside ALF material. Only ALF and four other materials were capable of meeting these more stringent targets using 3-step configuration (FIG. 35). The remainder demand harsher regeneration conditions and/or cycle complexity, for which the cost increase may be substantial. Within this reduced pool, PPN-6-CH2TETA and mmen-CuBTTri operate on chemisorptive mechanism, whereas NaX (also known as zeolite 13X), ALF, and the hypothetical Al-rho-ZMOF are physisorbents.

From FIG. 36, the efficiency metrics of ALF, both in terms of mass and energy, compared favorably with the considered sorbents. This is due in part to a relatively large temperature operating window under which a sizeable quantity of pure product may be recovered (FIG. 37a-b), deriving in turn from the exceptional selectivity and facile regenerability of this material. The low isosteric heat of ALF is conducive to reduce the energy consumption relative to typical chemisorbents. Further, the compositional, structural, and synthetic simplicity of ALF presents a clear manufacturing cost and scalability advantage compared with other synthetic sorbents. While the impact of $H_2O$ sorption is challenging to estimate in the absence of more exhaustive thermodynamic and kinetic data collection, the clearly reduced hygroscopicity of ALF, in contrast to hygroscopic NaX, expands its scope of application in a multinary separation involving water in comparison to known physisorbents.

Taken together, the MOF, ALF, which can be synthesized from inexpensive and earth-abundant aluminum hydroxide and formic acid, has an excellent affinity for $CO_2$ compared with $N_2$. The origin of this remarkable behavior stems from the relative kinetic diameters of $CO_2$ (≈3.3 Å) and $N_2$ (≈3.64 Å). This minute difference of =0.34 Å is sufficient to permit $CO_2$ to adsorb into the pore structure while excluding the $N_2$. Furthermore, ALF is hydrophobic compared to most MOFs, so it is able to capture $CO_2$ from wet flue gas emissions under realistic operating conditions above room temperature. There is one other intriguing feature of this remarkable material, which is that ALF could offer a remarkably efficient vehicle for long-term $CO_2$ storage if the selective reduction of $CO_2$ to formic acid with solar hydrogen becomes more efficient (FIG. 38, D. Chen et al., J. Mater. Chem. A 2016, 4, 2657-2662). $CO_2$ could then be stored in the MOF framework itself, according to the overall reaction $Al_2O_3 + 6\ CO_2 + 3\ H_2 \rightarrow 2\ Al(HCOO)_3$. This reaction would yield a storage capacity for $CO_2$ of 81 wt % (not including additional $CO_2$ that could be stored in the channels).

Example 5. Preparation of ALF Doped with Other Trivalent Cations

ALF samples that have been doped with other trivalent cations, such as Fe, Ga, In, V, Mn, Co, Ru, and Cr, i.e $A_{1-x}B_x(COOH)_3$ (A and B are two different trivalent metals of Fe/Al/Ga/In/Mn/Cr/Co/Ru) were obtained.

Reflux Synthesis and Activation of $Al_{0.5}Fe_{0.5}(HCOO)_3(CO_2)_{0.75}(H_2O)_{0.25}(HCOOH)_{0.25}$ (as-Made $Al_{0.5}Fe_{0.5}(HCOO)_3$)

A mixture of aluminium hydroxide (3.0 g, 0.0384 mol), formic acid (150 mL), and $[Fe^{III}_3(m-O)(HCOO)_7(H_2O)_2]$ (3.0 g, 0.00561 mol) were refluxed in a 250 mL two-necked round-bottomed flask at 100° C. for 48 h. After completion of the reaction, excess formic acid was extracted by centrifugation, and the pale-greenish white solid product was rinsed with a copious amount of ethanol and separated via vacuum filtration. The vacuum dried sample gave a yield of 95% of $Al_{0.5}Fe_{0.5}(HCOO)_3(CO_2)_{0.75}(H_2O)_{0.25}(HCOOH)_{0.25}$ (as-made $Al_{0.5}Fe_{0.5}(HCOO)_3$). The air-dried $Al_{0.5}Fe_{0.5}(HCOO)_3(CO_2)_{0.75}(H_2O)_{0.25}(HCOOH)_{0.25}$ (0.5 g, 0.00229 mol) was heated at 150° C. under high vacuum [$1 \times 10^{-4}$ mmHg] for 24 h, yielding 0.38 g of the guest-free $Al_{0.5}Fe_{0.5}(HCOO)_3$.

Reflux Synthesis and Activation of as-Made $V_{0.3}Al_{0.7}(HCOO)_3(CO_2)_{0.75}(H_2O)_{0.25}(HCOOH)_{0.25}$ A mixture of vanadium acetylacetonate (0.5 g, 0.00143 mol), formic acid (75 mL), and aluminium hydroxide (0.5 g, 0.0064 mol) were refluxed in a 100 mL two-necked round-bottomed flask at 100° C. for 48 h. After completion of the reaction excess formic acid was extracted using centrifugation. The pale-green solid product was rinsed with a copious amount of ethanol and separated using vacuum filtration. The vacuum dried sample gave a yield of 93% of $V_{0.3}Al_{0.7}(HCOO)_3(CO_2)_{0.75}(H_2O)_{0.25}(HCOOH)_{0.25}$ (guest included/as-made $V_{0.3}Al_{0.7}(HCOO)_3$). The V:Al ratio in the MOF was confirmed by ICP-MS analysis. Analytical CHN data for as-made $V_{0.3}Al_{0.7}(HCOO)_3$ (M. Wt. 218.237 g/mol): calculated weight percentages C: 22.01%, H: 1.85% and observed C: 22.36%, H: 2.41%. As-made $V_{0.3}Al_{0.7}(HCOO)_3(CO_2)_{0.75}(H_2O)_{0.25}(HCOOH)_{0.25}$ (0.5 g, 0.0023 mol) was heated at 120° C. under high vacuum [$1 \times 10^{-4}$ mmHg] for 24 h, yielding quantitative amounts of the guest-free V$_{0.3}$Al$_{0.7}$(HCOO)$_3$. Analytical CHN data for V$_{0.3}$Al$_{0.7}$C$_3$H$_3$O$_6$ (M. Wt. 169.221 g/mol): calculated. C: 21.29%, H: 1.79%, and observed C: 22.36%, H: 2.41%.

Example 6. Characterization and Activity of ALF Doped with Other Trivalent Cations The activity of doped ALF was evaluated by following the protocol in Example 3.
Results and Discussion The level of metal atom doping and its relative atomic concentrations were confirmed with ICP-MS and SC-XRD analysis. PXRD patterns and crystal structures of Fe-doped and V-doped materials (Al$_{1-x}$Fe$_x$(COOH)$_3$ and V$_{1-x}$Al$_x$(COOH)$_3$)) reveal that all the V and Fe-doped materials are isostructural with the ALF structure (FIG. 39a).

Some of these doped materials, especially Al$_{1-x}$Fe$_x$(COOH)$_3$, showed enhanced adsorption properties (FIG. 39-41). Single component gas adsorptions isotherms clearly reveal that Fe-doped materials have higher CO$_2$ adsorption capacity and selectivities than neat ALF (FIGS. 11b, 21 and 40). In addition to the selective adsorption of CO$_2$ from wet flue gases, there is potential in using ALF for the adsorption of O$_2$ from air. The mechanism is the same as in the flue gas application: adsorption of the larger N$_2$ molecule is negligible compared with the adsorption of the smaller O$_2$. Preliminary results are shown in FIG. 42, where it is seen that the adsorption of O$_2$ was particularly favourable at 195 K (dry-ice temperature) and with an Fe-doped sample of ALF. These Fe-doped materials showed excellent affinity for O$_2$ over N$_2$ at 195 K (FIG. 41). Notably, 85% Fe-doped ALF displayed superior O$_2$ and CO$_2$ adsorption capacity over N$_2$ at relevant temperatures. The BET surface area of Al$_x$Fe$_{1-x}$(HCOO)$_3$ MOFs were estimated from 298 K CO$_2$ sorption isotherms, while pore size distribution profiles were obtained by fitting the DFT model to the CO$_2$ adsorption isotherms. The results suggest that all these materials have uniform micropores (FIG. 43).

The invention claimed is:

1. An activated metal-organic framework of formula I:

$$X_{1-x}Y_x(Z)_3 \qquad I$$

where:
X is a metal in the +3 oxidation state;
Y is one or more metals in the +3 oxidation state, provided that each of the metals that represent X are different to each of the one or metals that represent Y;
x is from 0 to 0.9999, wherein
Z is selected from the group consisting of: HCOO$^-$, R$^1$COO$^-$, H$_2$PO$_2^-$, NO$_2^-$,

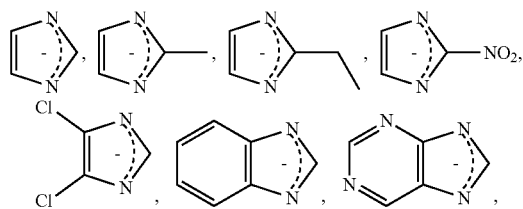

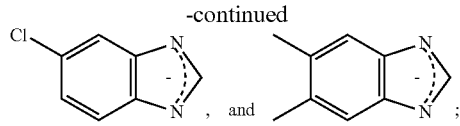

R$^1$ is C$_1$ to C$_6$ alkyl; and
the metal-organic framework has a BET surface area of from 250 to 1,000 m$^2$/g as obtained from a 298 K CO$_2$ sorption isotherm.

2. The metal-organic framework of formula I according to claim 1, wherein the BET surface area is from 500 to 600 m$^2$/g, such as from 514 to 599 m$^2$/g, such as from 582 to 599 m$^2$/g.

3. The metal-organic framework of formula I according to claim 1, wherein the metal-organic framework has a set of unit-cell parameters where a=b=c=from 11.303 to 11.894 Å, α=β=γ=90°, Volume=from 1562 to 1600 Å$^3$, space group: I m−3.

4. The metal-organic framework of formula I according to claim 1, wherein x is from 0 to 0.99, such as from 0.25 to 0.85.

5. The metal-organic framework of formula I according to claim 1, wherein X is selected from Al, Fe, Mn, Y, Sc, Ga, In, Ti, Fe, Mn, V, Cr, Co, Tl, Bi, Ru, Os, Re, Ir, Rh, Ce, La, Pr, Nd, Sm, Eu, Gd, Tb, Dy, Ho, Er, Tm, Yb and Lu.

6. The metal-organic framework of formula I according to claim 5, wherein X is Al.

7. The metal-organic framework of formula I according to claim 1, wherein Y, when present, is selected from one or more of the group consisting of Al, Fe, Mn, Y, Sc, Ga, In, Ti, Fe, Mn, V, Cr, Co, Tl, Bi, Ru, Os, Re, Ir, Rh, Ce, La, Pr, Nd, Sm, Eu, Gd, Tb, Dy, Ho, Er, Tm, Yb and Lu, optionally wherein:
(a) Y, when present, is selected from one or more of the group consisting of Al, Tl, Fe, Ga, In, Mn, V and Cr;
(b) Y, when present, is selected from one or more of the group consisting of Fe, Ga, In, Mn, V and Cr;
(c) Y, when present, is selected from the group consisting of Al, Tl, Fe, Ga, In, Mn, V and Cr; or
(d) Y, when present, is selected from the group consisting of Fe, Ga, In, Mn, V and Cr.

8. The metal-organic framework of formula I according to claim 7, wherein Y, when present, is Fe.

9. The metal-organic framework of formula I according to claim 1, wherein Z is selected from the group consisting of: HCOO$^-$, R$^1$COO$^-$, H$_2$PO$_2$, and NO$_2$.

10. The metal-organic framework of formula I according to claim 9, wherein Z is HCOO$^-$.

11. The metal-organic framework of formula I according to claim 1, wherein the metal-organic framework displays a CO$_2$ adsorption value of from 3 to 6 (e.g. from about 4 to about 5) mmol/g at 298 K and under 1 atmosphere of CO$_2$.

12. The metal-organic framework of formula I according to claim 1, wherein the metal-organic framework displays a CO$_2$ adsorption value of from 2 to 3 (e.g. about 2.3) mmol/g and from 90 to 150 (e.g. about 100) selectivity over N$_2$ at 298 K and under 1 atmosphere of total pressure provided by a gas stream of 15% CO$_2$ and 85% N$_2$ vol:vol.

13. The metal-organic framework of formula I according to claim 1, wherein the metal-organic framework displays an O$_2$ adsorption value of from 0.5 to 4 (e.g. from about 1 to about 3) mmol/g at 298 K and under 1 atmosphere of O$_2$.

14. The metal-organic framework of formula I according to claim 1, wherein it is selected from:
(a) Al(HCOO)$_3$;
(b) Al$_{0.75}$Fe$_{0.25}$(HCOO)$_3$;
(c) Al$_{0.5}$Fe$_{0.5}$(HCOO)$_3$;
(d) Al$_{0.25}$Fe$_{0.75}$(HCOO)$_3$; and
(e) Al$_{0.15}$Fe$_{0.85}$(HCOO)$_3$,
(f) V(HCOO)$_3$; and
(g) V$_{0.3}$Al$_{0.7}$(HCOO)$_3$.

15. A method of adsorbing $CO_2$ and/or $O_2$ from a gas, comprising subjecting a metal-organic framework of formula I according to claim 1 to a flow of a gas comprising one or both of $CO_2$ and $O_2$.

16. The method according to claim 15, wherein the gas further comprises nitrogen and water vapour.

17. The method according to claim 15, wherein the gas has a relative humidity of from less than or equal to 25% to 90%.

18. The method according to claim 17, wherein the gas has a relative humidity of less than or equal to 25%.

19. A method of releasing $CO_2$ and/or $O_2$ from a metal-organic framework of formula I according to claim 1 to which $CO_2$ and/or $O_2$ has been adsorbed, the process comprising:
(a) providing a metal-organic framework of formula I to which $CO_2$ and/or $O_2$ has been adsorbed; and
(b) activating it by subjecting it to:
(i) a temperature of from 90 to 160° C. (e.g. from 100 to 150° C. such as 120° C.) under reduced pressure for a period of time (e.g. from 1 to hours); or
(ii) a temperature of from 170 to 250° C. (e.g. from 175 to 185° C., such as about 180° C.) under 1 atmosphere pressure for a period of time (e.g. from 1 to hours).

20. A method of obtaining an activated metal-organic framework of formula I according to claim 1, the method comprising the steps of:
(a) providing an unactivated metal-organic framework of formula I; and
(b) activating it by subjecting it to:
(i) a temperature of from 90 to 160° C. (e.g. from 100 to 150° C., such as 120° C.) under reduced pressure for a period of time (e.g. from 1 to 2 hours); or
(ii) a temperature of from 170 to 250° C. (e.g. from 175 to 185° C., such as about 180° C.) under 1 atmosphere pressure for a period of time, (e.g. from 1 to 2 hours),
for a period of time, whereby the BET surface area of the metal-organic framework of formula I is increased to a value of from 500 to 600 m$^2$/g as obtained from a 298 K $CO_2$ sorption isotherm following step (b).

21. The activated metal-organic framework of formula I according to claim 1, wherein the activated metal-organic framework is incorporated into a polymeric matrix material.

22. The activated metal-organic framework of formula I according to claim 1, wherein the activated metal-organic framework is coated onto a substrate consisting of a polymer, a ceramic, or a metal.

* * * * *